(12) United States Patent
Reisser

(10) Patent No.: US 9,239,002 B2
(45) Date of Patent: Jan. 19, 2016

(54) ORBITING PLANETARY GEARING SYSTEM AND INTERNAL COMBUSTION ENGINE EMPLOYING THE SAME

(71) Applicant: Heinz-Gustav Reisser, Coshocton, OH (US)

(72) Inventor: Heinz-Gustav Reisser, Coshocton, OH (US)

( * ) Notice: Subject to any disclaimer, the term of this patent is extended or adjusted under 35 U.S.C. 154(b) by 184 days.

(21) Appl. No.: 14/036,694

(22) Filed: Sep. 25, 2013

(65) Prior Publication Data

US 2014/0020651 A1    Jan. 23, 2014

Related U.S. Application Data

(63) Continuation-in-part of application No. 12/849,406, filed on Aug. 3, 2010.

(60) Provisional application No. 61/705,490, filed on Sep. 25, 2012.

(51) Int. Cl.
| | |
|---|---|
| *F02B 53/00* | (2006.01) |
| *F01C 9/00* | (2006.01) |
| *F01C 1/07* | (2006.01) |
| *F01C 21/00* | (2006.01) |
| *F02B 53/02* | (2006.01) |
| *F01C 1/077* | (2006.01) |
| *F01C 17/02* | (2006.01) |

(52) U.S. Cl.
CPC .................. *F02B 53/00* (2013.01); *F01C 1/077* (2013.01); *F01C 9/002* (2013.01); *F01C 17/02* (2013.01); *F01C 21/008* (2013.01); *F02B 53/02* (2013.01); *Y02T 10/17* (2013.01)

(58) Field of Classification Search
CPC ............ F01C 1/063; F01C 1/02; F01C 1/077; F01C 21/008; F02B 53/00

USPC ............ 123/245, 200, 241, 43 R, 45 R, 18 R, 123/18 A
See application file for complete search history.

(56) References Cited

U.S. PATENT DOCUMENTS

| | | | | |
|---|---|---|---|---|
| 3,886,908 | A * | 6/1975 | Ruzic ............................. | 123/213 |
| 6,641,499 | B1 * | 11/2003 | Willmot ........................ | 475/172 |
| 8,033,265 | B2 * | 10/2011 | Reisser ......................... | 123/245 |

(Continued)

FOREIGN PATENT DOCUMENTS

| | | |
|---|---|---|
| EP | 1620229 A1 | 2/2006 |
| EP | 2138740 A1 | 12/2009 |

OTHER PUBLICATIONS

Marie-Claude Schlemmer, Notification of Transmittal of the International Search Report and the Written Opinion of the International Searching Authority, or the Declaration, May 9, 2014, 14 pages.

*Primary Examiner* — Jorge Pereiro
*Assistant Examiner* — Deming Wan
(74) *Attorney, Agent, or Firm* — Kegler Brown Hill & Ritter; James J. Pingor

(57) ABSTRACT

The innovation concerns an orbiting planetary gearing system and an internal-combustion engine employing the same. In aspects, the engine can comprise an engine housing having a first wall delimiting a first combustion chamber, a first primary member having a first piston and a second primary member having a second piston. The pistons can also delimit the first combustion chamber. The first wall defines at least a section of a toroid, and the pistons are guided along a curved path defined by the section of the toroid. The primary members can be coupled to an intermediate member. In various embodiments, the intermediate member can couple motion of the primary members to a crankshaft via an orbiting planetary gearing system.

16 Claims, 57 Drawing Sheets

(56) References Cited

U.S. PATENT DOCUMENTS

2002/0100452 A1\*  8/2002  Bozdog ........................ 123/245
2006/0225691 A1\*  10/2006  McCoin et al. ............... 123/241
2008/0188340 A1    8/2008  Al-Bannai
2008/0314350 A1   12/2008  Reisser \* cited by examiner

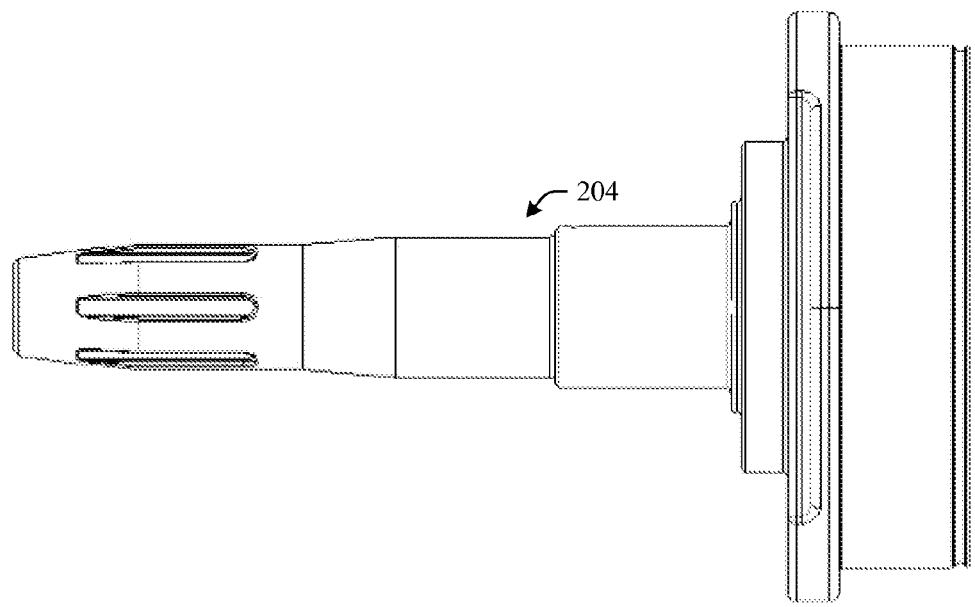
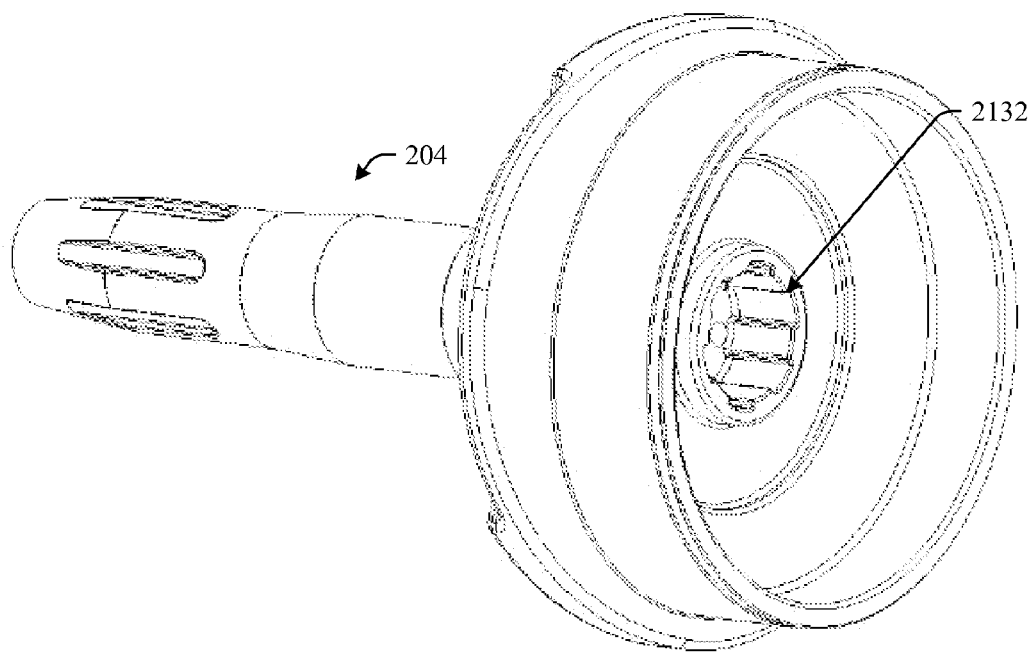
FIG. 7

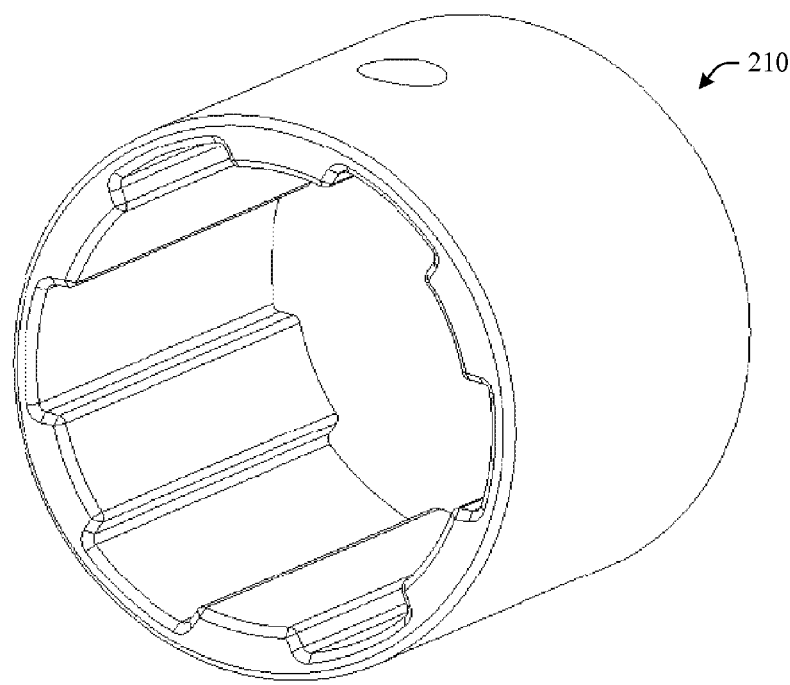
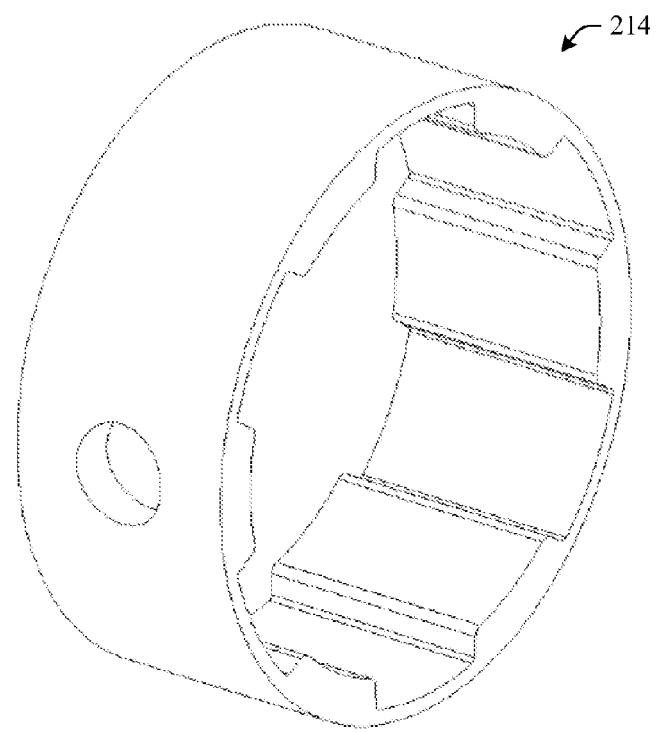
FIG. 13

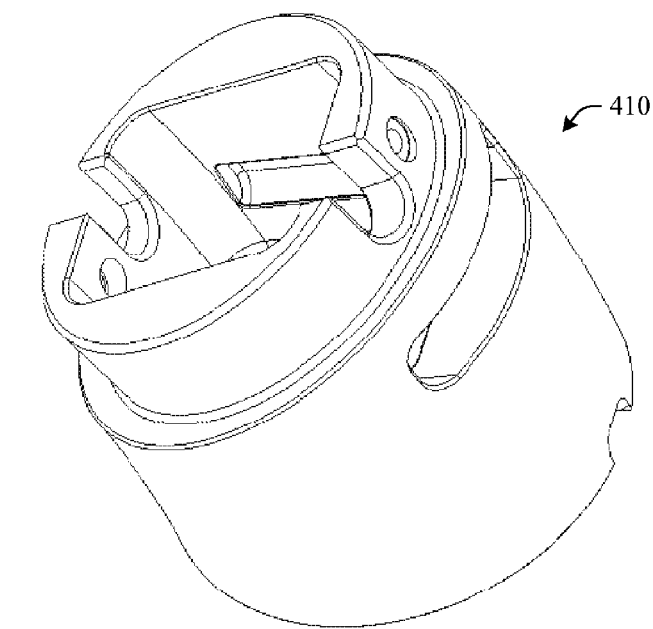
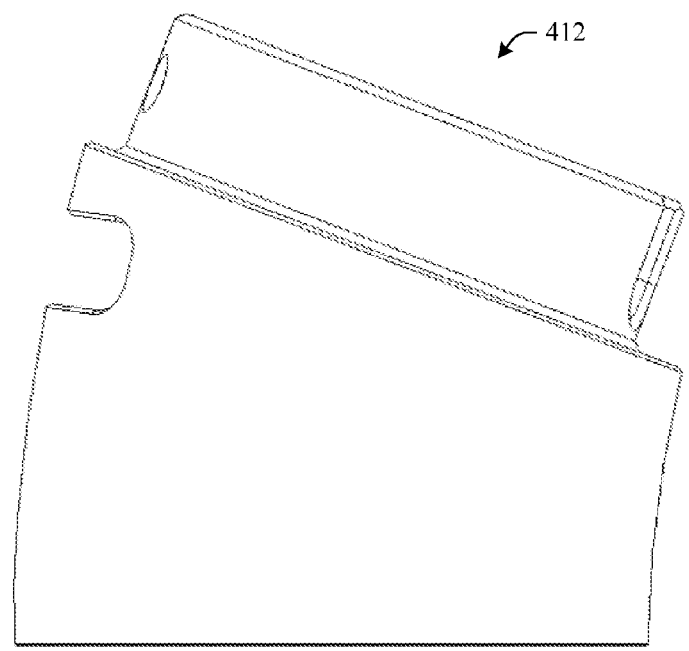
FIG. 28

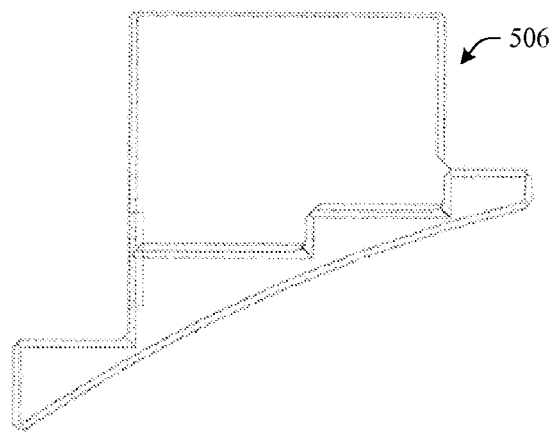
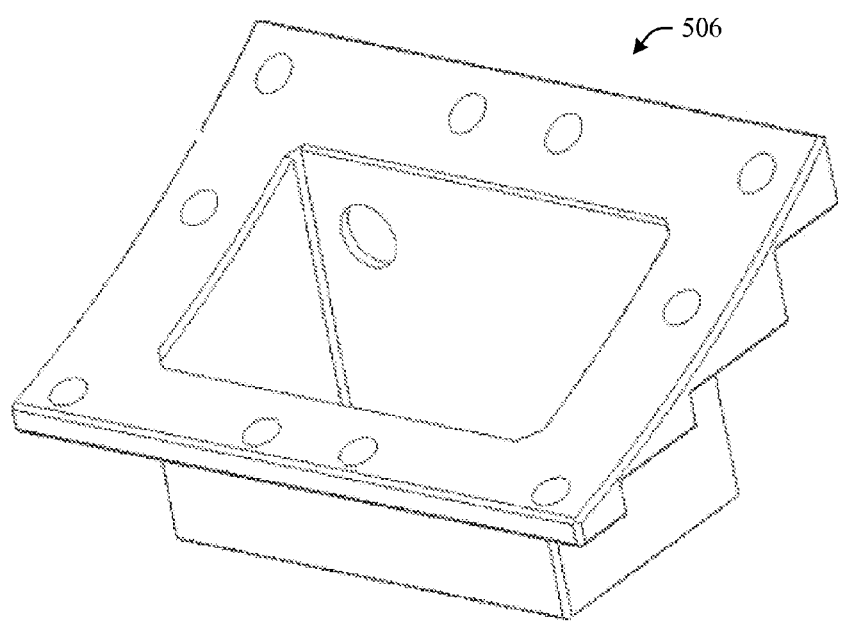
FIG. 37

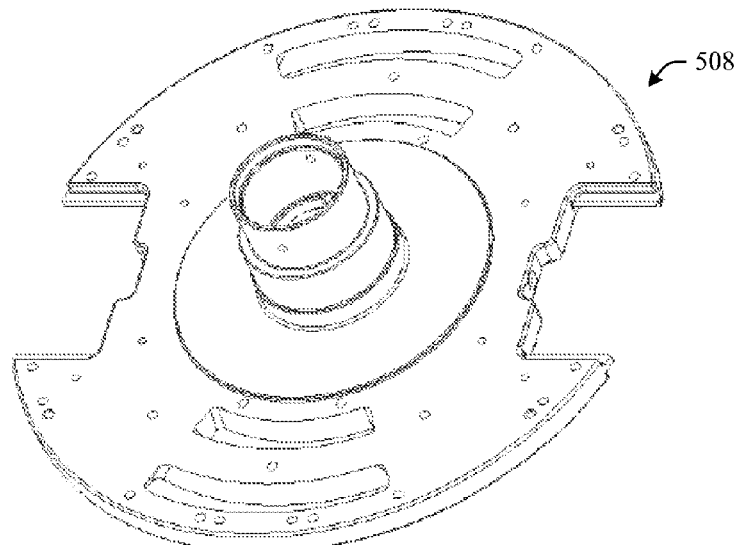
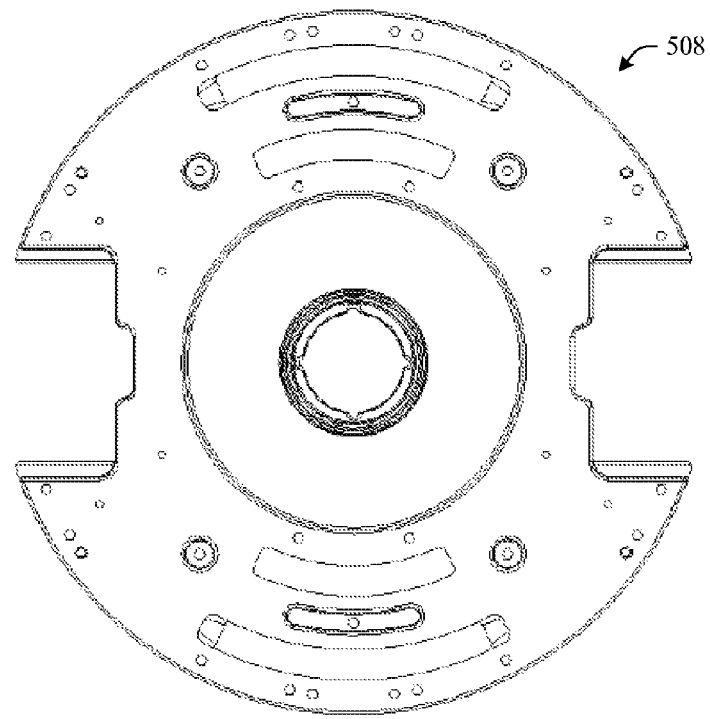
FIG. 38

ORBITING PLANETARY GEARING SYSTEM AND INTERNAL COMBUSTION ENGINE EMPLOYING THE SAME

CROSS-REFERENCE TO RELATED APPLICATIONS

This application claims the benefit of U.S. Provisional Patent application Ser. No. 61/705,490 entitled "ORBITING PLANETARY GEARING SYSTEM AND INTERNAL COMBUSTION ENGINE EMPLOYING THE SAME" and filed Sep. 25, 2012, and is a Continuation-in-part of pending U.S. Patent application Ser. No. 12/849,406, entitled "ROTARY PISTON INTERNAL COMBUSTION ENGINE" and filed Aug. 3, 2010. The entireties of the above-noted applications are incorporated by reference herein.

BACKGROUND

The statements in this section merely provide background information related to the present disclosure and may not constitute prior art. In conventional combustion engines, the walls delimiting combustion chambers are of a cylindrical shape and closed on one end with a cylinder head. A piston is moveably guided through the other end into the cylinder. Internal combustion engines have 4 basic steps: (1) intake; (2) compression; (3) combustion and expansion; and (4) exhaust. During the intake step, combustible mixtures are injected into the combustion chamber. This mixture is placed under pressure by the compression of the piston into the cylinder. The mixture is then ignited and burnt. The hot combustion products ultimately expand, forcing the piston to move in the opposite direction and causing the transfer of energy to mechanical components that are coupled or connected to the piston, such as a crankshaft. The cooled combustion products are finally exhausted and the combustion cycle restarts. Typical combustion engines operate according to this principle may function in two cycles or four cycles, such as in Otto and diesel engines.

There exists a continuing issue related to the relatively low efficiency exhibited by conventional combustion engines. Engine efficiency is usually defined by comparing the theoretical chemical energy in the fuels against the useful energy abstracted from the fuels in the form of the kinetic energy transferred through the engine. Although the thermodynamic limit for abstracting energy from a typical fuel is about 80%, typical combustion engines exhibit an average efficiency of only about 20-40%. Therefore, there remains substantial room for improvement in efficiency over conventional internal combustion engines.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect, the innovation comprises one or more embodiments of an internal-combustion engine, the engine comprising an engine housing that can have a first wall delimiting a first combustion chamber, a first primary member that can have a first piston and a second primary member that can have a second piston. The pistons can also delimit a first combustion chamber. The first wall can define at least a section of a toroid (e.g., a shape such as a torus, but with substantially any cross-sectional shape, not just circular, etc.), and the pistons can be guided along a curved path defined by that section of the toroid.

Various aspects of the subject innovation can provide a combustion engine that is compact and simple in construction. In one or more embodiments, the subject innovation can include a combustion engine comprising an intermediate member that is coupled to the primary members, which can travel along a predetermined path, and which can be coupled to the crankshaft. When compared with conventional internal combustion engines, embodiments of the subject innovation are more compact in size, lighter in weight, have a reduced need for internal lubrication, and can be capable of being easily manufactured.

In contrast to conventional combustion engines, combustion engines in accordance with various embodiments of the subject innovation can have a combustion chamber which is not only delimited by a wall of the engine housing and a first piston, but also by a second piston. The pistons can be provided as separate parts that are attached to the primary members. The pistons can also be integral parts of the primary members. The wall of the engine housing can define at least a section of a toroid in which the pistons are guided, so that the pistons can travel along a curved path. When the combustion gas is ignited in a combustion chamber that is delimited as described, the two pistons are driven in opposite directions, i.e., forced apart. The gases expanding in the combustion chamber thereby drive not only one, but two pistons to substantially increase the efficiency of the engine, by enlarging the surface area on which the combustion gases can act. This reduces fuel consumption and improves emission values.

Since the pistons travel along a curved path, the combustion engine of the subject innovation can be very compact for a given combustion chamber volume.

In other aspects, the innovation can include an intermediate member capable of transforming linear or rotational motion (e.g., the rotational motion of pistons described herein, a linear component of that motion, or other linear or rotational motion, etc.) into rotational motion, e.g., to drive a crankshaft, etc., or vice versa. In one example, the intermediate member can accept the motion of pistons such as those described herein and can transmit this motion to a crankshaft such as the one described herein. The intermediate member and a single crankshaft can thereby replace two crankshafts and further means for coupling the two crankshafts when employed in an engine such as described herein, providing for a very compact and easy to manufacture engine, although in some such aspects the intermediate member can alternatively be coupled to more than one crankshaft.

In further aspects, an intermediate member of the subject innovation can employ an orbiting planetary gearing system such as described in greater detail herein, which can provide multiple advantages. These advantages can include improved structural integrity, reduced manufacturing and assembly costs, reduced friction and stress, and reduced unnecessary motion (tilting, tipping, vibration, etc.).

As described herein, the pistons of an engine in accordance with aspects of the subject innovation can simultaneously move in opposite directions during expansion of the combustion gases, and therefore the forces and torques generated can be largely compensated for. Vibrations can thereby be almost completely compensated for, alleviating a need for special devices such as balancer shafts, etc.

In some embodiments, the first primary member can comprise a third piston and the second primary member can comprise a fourth piston, wherein the third piston and the fourth piston can delimit a second combustion chamber. This can allow for a very compact arrangement of two combustion chambers. Each primary member can delimit a first combustion chamber at one end by means of a piston and a second combustion chamber at its other end by means of another piston. Therefore, a stroke decreasing the size of one combustion chamber can increase the size of the other combustion chamber and vice versa. Idle strokes of the pistons can thereby be avoided, increasing efficiency and minimizing corresponding losses due to friction.

A wall having the shape of a toroid can delimit the first and the second combustion chambers. The second combustion chamber can also be delimited by a separate, second wall which can also define at least a section of the toroid. As used herein, a toroid is defined as a ring-shaped body, which can have any cross sectional shape, e.g., circular, square, rectangular, elliptical, irregular, etc.

The two primary members can pivot about a common pivot axis. This can reduce the size of the engine and minimize the number of parts needed to position the pistons. The two combustion chambers and the two interposed primary members can be arranged in a symmetrical manner to minimize engine vibrations.

In some aspects, the crankshaft can rotate around a rotation axis that is coaxial with the pivot axis, whereas in other aspects it can rotate around a separate axis. In coaxial embodiments, the motion of the pistons and the primary members can be transferred to the intermediate member and from there to the crankshaft in a symmetrical manner. The coaxial arrangement of the pivot axis and the rotation axis of the crankshaft can contribute to a very compact construction of the engine.

In aspects of the innovation, the intermediate member can be interposed between planes defined by the pivoting motion of the primary members. In this manner, forces acting in transverse directions and thereby inducing unwanted torques and loads can be minimized In some embodiments of the innovation, the primary members and the intermediate member can be coupled to each other via a turning and sliding joint. Each joint can be disposed between a primary member and the intermediate member, to allow turning and sliding of each primary member with respect to the intermediate member. The intermediate member can be coupled to the crankshaft in a similar manner. The intermediate member can have a receiving area for accommodating corresponding engaging members of the primary members. The engaging members can be bolts that are received in a slot-like area provided in or at the intermediate member. This can provide for a very robust and reliable transfer of motion and forces from the primary members to the intermediate member. In other aspects, the coupling of primary members and the intermediate member can be accomplished via rollers that can provide for motion of the intermediate member in a single linear dimension based upon the rotation of the primary member or primary members. The intermediate member can comprise an engagement member (e.g., pin, etc.) that can be received in corresponding receiving areas of the primary members.

The intermediate member can have a receiving area for receiving a corresponding engaging member of the crankshaft in order to transfer motion and forces from the intermediate member to the crank shaft. In some embodiments, this receiving area can be the same as the receiving area provided for the engaging members of the primary members. According to an alternative embodiment of the innovation, the intermediate member can comprise an engagement member that can be received in a corresponding receiving area of the crankshaft.

In some aspects, the intermediate member can be guided by guiding means extending parallel to an axis along which the intermediate member travels. These guiding means can comprise parallel columns, along which the intermediate member can slide and travel back and forth between its end positions.

In various aspects, the subject innovation can be employed as or in connection with a combustion engine that is a two-cycle or four-cycle engine, and both the Otto principle as well as the diesel principle may be used in various embodiments.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 7 illustrates a top and perspective view of an example second crankshaft in accordance with aspects of the subject innovation.

FIG. 13 illustrates perspective views of example crank bearing race and crank spacer in accordance with aspects of the subject innovation.

FIG. 28 illustrates a perspective view of a first piston and a side view of a second piston in accordance with aspects of the subject innovation.

FIG. 37 illustrates side and perspective views of a fluid reservoir in accordance with aspects of the subject innovation.

FIG. 38 illustrates perspective and front views of a first bottom plate in accordance with aspects of the subject innovation.

DETAILED DESCRIPTION

Figure 1A:
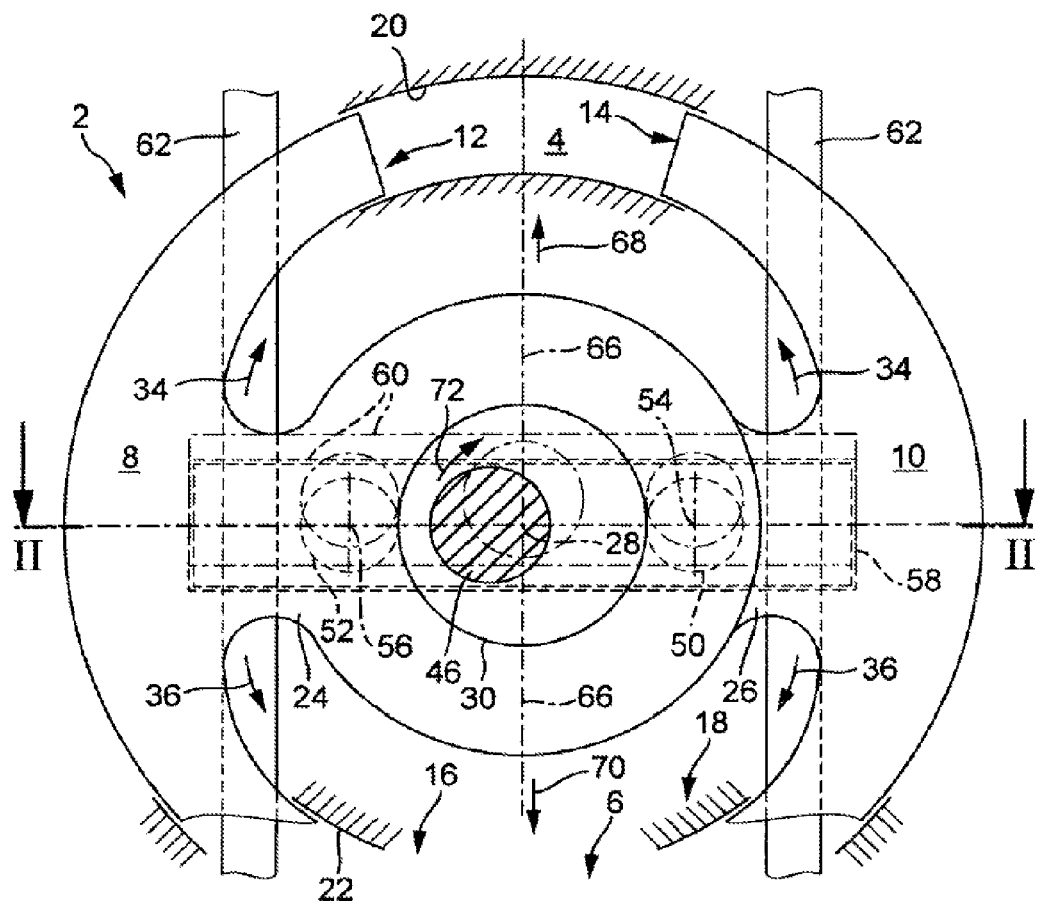
FIG. 1A illustrates a schematic side view of a combustion engine according to aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are illustrated in block diagram form in order to facilitate describing the innovation.

FIG. 1A illustrates the main parts of an initial embodiment of an internal combustion engine 2. Although other embodiments differ from that described in connection with FIGS. 1A and 1B, it is to be understood that differing embodiments can have similar structure and functionality where aspects are not specifically identified as distinct. Internal combustion engine 2 can comprise two combustion chambers, a first combustion chamber 4 and a second combustion chamber 6 (not illustrated in the drawing), which can be arranged symmetrically opposite the first combustion chamber 4. The engine 2 can have a first primary member 8 and a second primary member 10, which can be arranged in a symmetrical manner. The first primary member 8 can comprise a first piston 12 at one end and a third piston 16 at its other end. The second primary member 10 can comprise a second piston 14 at one end and a fourth piston 18 at its other end. The pistons 16 and 18 are not illustrated in the drawing; they can be identical to the pistons 12 and 14.

The pistons 12 to 18 can have a toroidal shape and can be an integral part of the primary members 8 and 10. Alternative embodiment of primary members with pistons that are provided as separate parts are described below.

The first combustion chamber 4 can be not only delimited by the pistons 12 and 14, but also by a first wall 20, which can be provided by a housing of the engine. The second combustion chamber 6 can be delimited accordingly by a second wall 22. The walls 20 and 22 can have the shape of a section of a toroid and the ends of these sections can guide the ends of the primary members 8 and 10 on which the pistons 12 to 18 are disposed.

The primary member 8 can have a pivot arm 24, which can extend in a radial direction towards the center of the engine 2. The primary member 10 can have a corresponding pivot arm 26. The pivot arms 24 and 26 can pivot around a common pivot axis 28. The pivot axis 28 can extend in a direction perpendicular to the plane of the drawing.

The pivot arm 24 of the primary member 8 can be held at a bearing 30 that runs on a crank shaft 42. Accordingly, the pivot arm 26 of the primary member 10 can be held at a bearing 32 that runs on the crank shaft 42 (FIG. 1B and the accompanying discussion below provide further details).

Figure 1B:
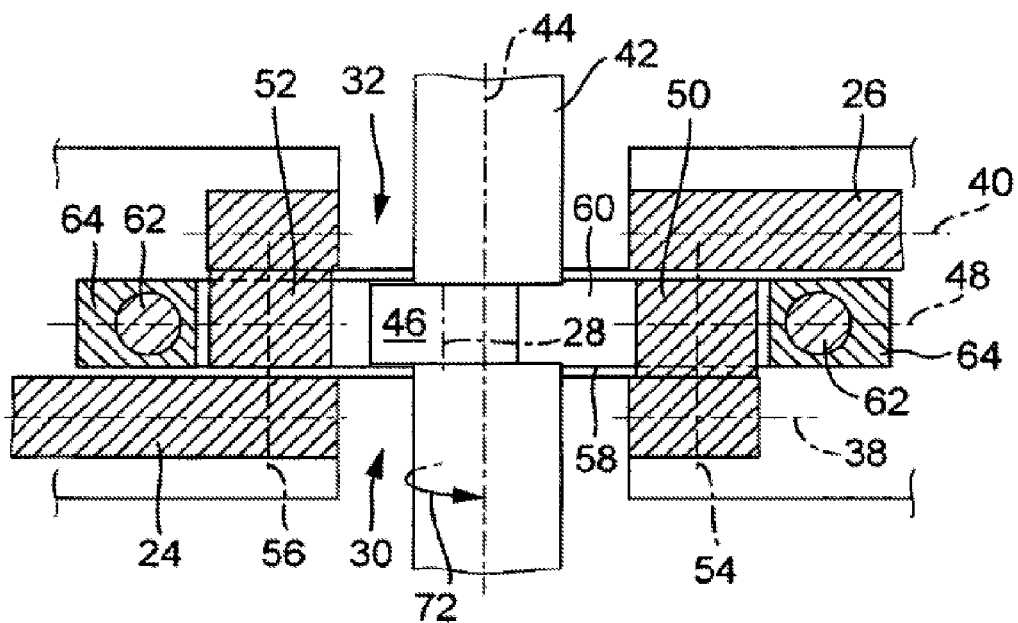
FIG. 1B illustrates a section taken along the line II-II as indicated in FIG. 1.

When the primary members 8 and 10 pivot around the common pivot axis 28 as illustrated by arrows 34, they can move in such a way that they compress gas contained in combustion chamber 4. The primary members 8 and 10 can also pivot in opposite directions, as illustrated by arrows 36. When the primary members 8 and 10 pivot back and forth according to directions 34 and 36, they can move within corresponding planes 38 and 40, as indicated in FIG. 1B.

The crankshaft 42 can extend in a direction perpendicular to these planes 38 and 40 and can rotate around a rotation axis 44, which can be coaxial with the pivot axis 28.

The crankshaft 42 can comprise a lobe 46, which can be arranged in a plane 48, which can be interposed between the planes 38 and 40.

The pivot arm 24 of the primary member 8 can comprise a bolt-shaped engaging member 52, which can be disposed at the end of the pivot arm 24, which can face the primary member 10. Accordingly, the pivot arm 26 of the primary member 10 can carry a bolt-shaped engaging member 50, which can be disposed at the end of the pivot arm 26 facing the primary member 8. The central axis of the engaging members 50 and 52 are designated 54 and 56, respectively. These central axes can be turning axes, when the engaging members 50 and 52 are rotatably disposed at the pivot arms 24 and 26, respectively.

In various embodiments, the engaging member 50 could also be arranged closer to the primary member 8, e.g. at the central axis 56. Accordingly, the engaging member 52 could also be arranged closer to the primary member 10, e.g. at the central axis 54.

With respect to FIGS. 1A and 1B, the engine 2 can comprise an intermediate member 58, which has the shape of a frame. This frame can be arranged within the plane 48. The intermediate member 58 can have an open receiving area 60, in which the engaging members 50 and 52 and the lobe 46 of the crankshaft 42 can be disposed. In alternate embodiments, as described in greater detail below, the intermediate member can include an orbiting planetary gearing system described herein.

The engine 2 can also comprise guiding means 62, which can include two or more parallel columns These can be received in bearing parts 64, which can be integrated at the side ends of the intermediate member 58, as illustrated in FIG. 1B. The intermediate member 58 can move along an axis 66, which extends in a direction parallel to the direction in which the guiding means 62 extend. The intermediate member 58 can therefore move along the axis 66 in an upward direction 68 or in downward direction 70.

In the initial embodiment, motion of the primary members 8 and 10 can be transferred to the crankshaft 42 as follows (the motion of the orbiting planetary gearing system embodiments are discussed in greater detail below). When primary members 8 and 10 move in pivot direction 34 (to thereby decrease the size of the combustion chamber 4 and increase the size of opposite combustion chamber 6), the engaging members 50 and 52 travel along a circular path in a substantially upward direction. The displacement of the engaging members 50 and 52 is illustrated in FIG. 1 by means of dashed lines (original position) and dashed-dotted lines (after pivot movement in direction 36). The engaging members 50 and 52 engage the receiving area 60 of the intermediate member 58 and thereby drive the intermediate member 58 in an upward direction 68. The corresponding displacement of the intermediate member 58 is illustrated in FIG. 1 by means of dashed and dashed-dotted lines.

The intermediate member 58 with its receiving area 60 is also in contact with the lobe 46 of the crankshaft 42. Therefore, when the intermediate member 58 travels in the upward direction 68, the lobe 46 is displaced accordingly, which is indicated by dashed-dotted lines. The displacement of the lobe 46 can cause a rotational movement 72 of the crankshaft 42.

Further embodiments of the subject innovation comprise an orbiting planetary gearing system, as well as an internal combustion engine employing such an orbiting planetary gearing system in an intermediate member to drive a crankshaft. In various embodiments, the orbiting planetary gearing system and/or associated intermediate member can be used either in connection with an engine such as described herein, or in other contexts. Embodiments employing such an orbiting planetary gearing system can provide multiple advantages over conventional engines as well as embodiments discussed herein. Such advantages include but are not limited to the following: improved structural integrity, reduced manufacturing cost, and reduced assembly cost. One or more such embodiments are discussed below.

The embodiment described above comprises an intermediate member assembly (including guiding means 62, intermediate member 58, etc.) of which a halter (e.g., intermediate member 58) slides from one end position to another (mid positions) to each respective mid positions of travel (top dead center (TDC) and bottom dead center (BDC)) on the intermediate member assembly. However, this directional translation of the halter on the intermediate member assembly can bring about the following: high frictional values, a tilting and tipping of the entire intermediate member assembly, etc.

Due to the tipping of the intermediate member assembly, high stresses can be induced on various components, including those that can, in some embodiments, comprise ceramic components (e.g., bearings, etc.).

Embodiments employing an orbiting planetary gearing system, however, do not have a part such as the aforementioned halter in their intermediate member assembly. One advantage of such embodiments is to reduce the "tilting" of the intermediate member assembly when compared with other embodiments disclosed herein. To achieve a reduction in the aforementioned forces, various embodiments can employ an orbiting planetary gearing system.

As discussed above and described in greater detail below, various embodiments can employ gearing, more particularly an orbiting planetary gear set, to bring about the oscillating motion of the primary members. The planetary gear set can have a sun gear called the crank spur gear. The crank spur gear can be rigidly fixed to the crank pin of the crankshaft, for example, by means of male and female spline pairs. It is to be noted that the crank pin's axis can still be located at an offset to the global rotational axis of the crank shaft pair (e.g., common internal combustion engine style). The crankshafts can consist of a male and female crankshaft (e.g., the first and second crankshafts discussed herein, etc.), which can be coupled together by spline pairs.

Not only can the crank pin rigidly couple two crank spur gears, but it also can define the orbiting motion of a planet carrier. The planet carrier can ride on the crank pin by means of bearings. The position of the planet carrier on the crank pin can be defined by the location of the crank spur gears, since a crank spur gear can be located on either side of the planet carrier.

The planet carrier's rotational axis can coincide with the offset axis of the crank pin, thus allowing it to freely rotate around the same. However, the rotational motion of the planet carrier can be restricted. The rotation in $R_z$ can be restricted by the inclusion of rods (e.g., slider rods, etc.). These rails can lock the planet carrier's horizontal axis in parallel motion to the horizontal axis of the intermediate member assembly. This can result in a constraint set that limits the motion of the planet carrier to x and y translation in respect to the intermediate member assembly's global coordinate system.

The planet carrier can have, in addition to one global rotational axis, which when assembled coincides with the offset axis of the crank pin of a first crankshaft, a plurality (e.g., six, as illustrated, or a larger or smaller number, e.g., three or more) of other rotational axis, which can be located on a circular perimeter around the aforementioned main global rotational axis. These axes define the position of cylindrical extrude features, two for each other rotational axis (twelve in the example embodiments illustrated), with half (six in the example) on one side of the planet carrier and another half (six in the example) on the respective other side. The planet carrier can be symmetrical in design and in the illustrated embodiment resembles a cylinder in overall shape.

The planet carrier can be directly connected to the crank spur gears by means of planet gears which can be guided by the (twelve in the example illustrated) cylindrical extrude features of the planet carrier. Thus when the crankshaft rotates, the crank pin can orbit. This orbiting motion, along with the orbiting motion of the crank spur gears, can allow a torque transmission to be carried through from the crankshaft to the crank spur gears and into the planet gears. It is to be noted that the planet gears will rotate in the opposite direction of the rotational direction of the crankshafts.

The planet gears can furthermore be connected to a ring gear with an internal gear set (i.e., with gear teeth on the inside of the ring). Being an internal gear pair with the planet gears, the direction of rotation of the ring gear will be identical to that of the planet gears, and opposite the rotational direction of the crankshafts.

The ring gear, which can have the general shape of a cylinder with another cylindrical extrude at an offset to the origin of the larger extrude, can act as an "excenter" for the intermediate member assembly, wherein the respective axes are offset relative to one another, and not coaxial. The second cylindrical extrude can act as the ring gear with its internal gearing. The aforementioned offset of the second extrude should closely match the crank pin offset value to facilitate proper functioning.

As an example of the operation of an embodiment employing the orbiting planetary gearing system described herein, if a first crankshaft rotates ccw (counterclockwise), the crank spur gears will do the same, since they are connected to the crank pin of the first crankshaft. The planet carrier will not rotate, but will translate in x and y, the orbiting motion of the crank pin offset. The planet gears (twelve in the example illustrated) will rotate cw (clockwise) on the respective extrude features on the planet carrier, and the planet gears will cause the ring gear to rotate cw as well.

In such an embodiment, in hierarchal order, the following components can depend on one another. The planet carrier can be moving in x and y on the crank pin. The ring gear can be moving in x and y along with the planet carrier and can be rotating on the planet carrier. The ring gear can be directly connected to the intermediate member by a cylindrical extrude cut feature in the intermediate member. The ring gear can be rotating the intermediate member assembly in top dead center (TDC) and bottom dead center (BDC) positions respectively.

In various embodiments, the intermediate member's motion can be restricted to only translating into the y axis (up and down motion). This restriction can be obtained by inclusion of outer rails and inner rails. These rails can directly connect with the housing (plates and cylinder liners) of the engine. To eliminate any other sliding motion in the intermediate sub-assembly (such as can occur in the halter embodiments discussed above), the intermediate member can also house cylindrical connecting means for the oscillating members (primary members, such as those described herein). These cylindrical connecting means, two of them in total—one on either side of the ring gear extrude cut—are called intermediate member rollers (or IM rollers). The IM roller can be a cylindrical cylinder with a cylindrical extrude cut at an offset to its central axis such as the example described below. The cylindrical extrude cut can allow the IM roller to be coupled to the primary members by pin connections. The IM rollers can be positioned at an offset to the center axis (x axis) of the intermediate member. This can allow the IM roller's extrude cut to rotate to accommodate an x and y translation of the primary member pin connection. In various embodiments, the IM rollers can be designed in terms of their cylindrical cut offsets to allow only a slight rotation within the intermediate member while the primary members are moving from BDC to TDC, so that the pin connections are only moving within one quadrant of the Cartesian coordinate system of each IM roller itself.

Figure 2:
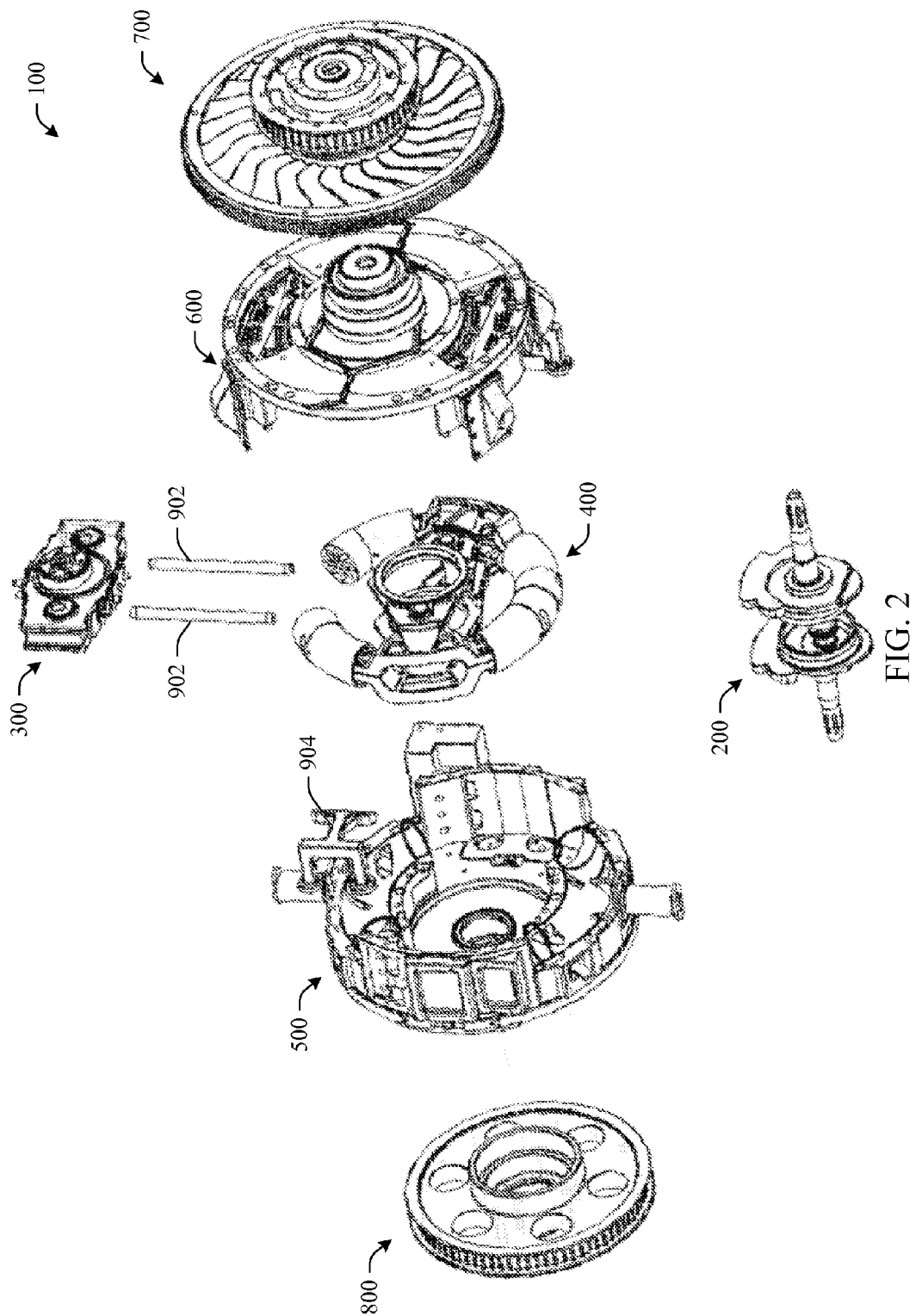
FIG. 2 illustrates an exploded view of an embodiment of an internal combustion engine in accordance with aspects of the subject innovation.

Turning to a specific example embodiment that can implement such features, FIG. 2 illustrates an exploded view of an embodiment of an internal combustion engine 100 that employs an orbiting planetary gearing system in accordance with aspects of the subject innovation. Although multiple specific components and features are described in connection with internal combustion engine 100, it is to be understood that these details are included for the purposes of illustrating concepts and features of the innovation, which is not limited to the specific example embodiments provided herein. Thus, while this example embodiment is provided with specific details and components to provide a detailed illustration of a few specific embodiments of the subject innovation, it is to be appreciated that many of the specific components or features disclosed in connection with example internal combustion engine 100 are optional, and in other embodiments such components or features may be absent or, alternatively, may be replaced with other components or features.

In some embodiments, internal combustion engine 100 can comprise a crank sub-assembly 200, intermediate sub-assembly 300, primary member sub-assembly 400, bottom plate sub-assembly 500, top plate sub-assembly 600, front-end sub-assembly 700, back-end sub-assembly 800, inner rails 902, and outer rails 904. Each of these assemblies or components is described in greater detail herein. As with internal combustion engine 2, internal combustion engine 100 can comprise two combustion chambers, a first (or upper) combustion chamber and a second (or lower) combustion chamber that can be delimited or defined by pistons of the primary member sub-assembly 400, and cylinder liners of the bottom plate sub-assembly 500 and top plate sub-assembly 600. Primary members of the primary member sub-assembly 400 can be coupled to the intermediate sub-assembly 300, and rotation of the primary members can cause motion of the intermediate sub-assembly 300 along the inner rails 902 and outer rails 904. This motion can drive rotation of the crank sub-assembly 200 and can also drive pulleys of front-end assembly 700 and back-end assembly 800, as well as a flywheel of front-end assembly 700, generating mechanical energy that can be used for substantially any application of an internal combustion engine (e.g., for locomotion of a vehicle, to run vehicle accessories, for stationary applications, etc.).

Figure 3:
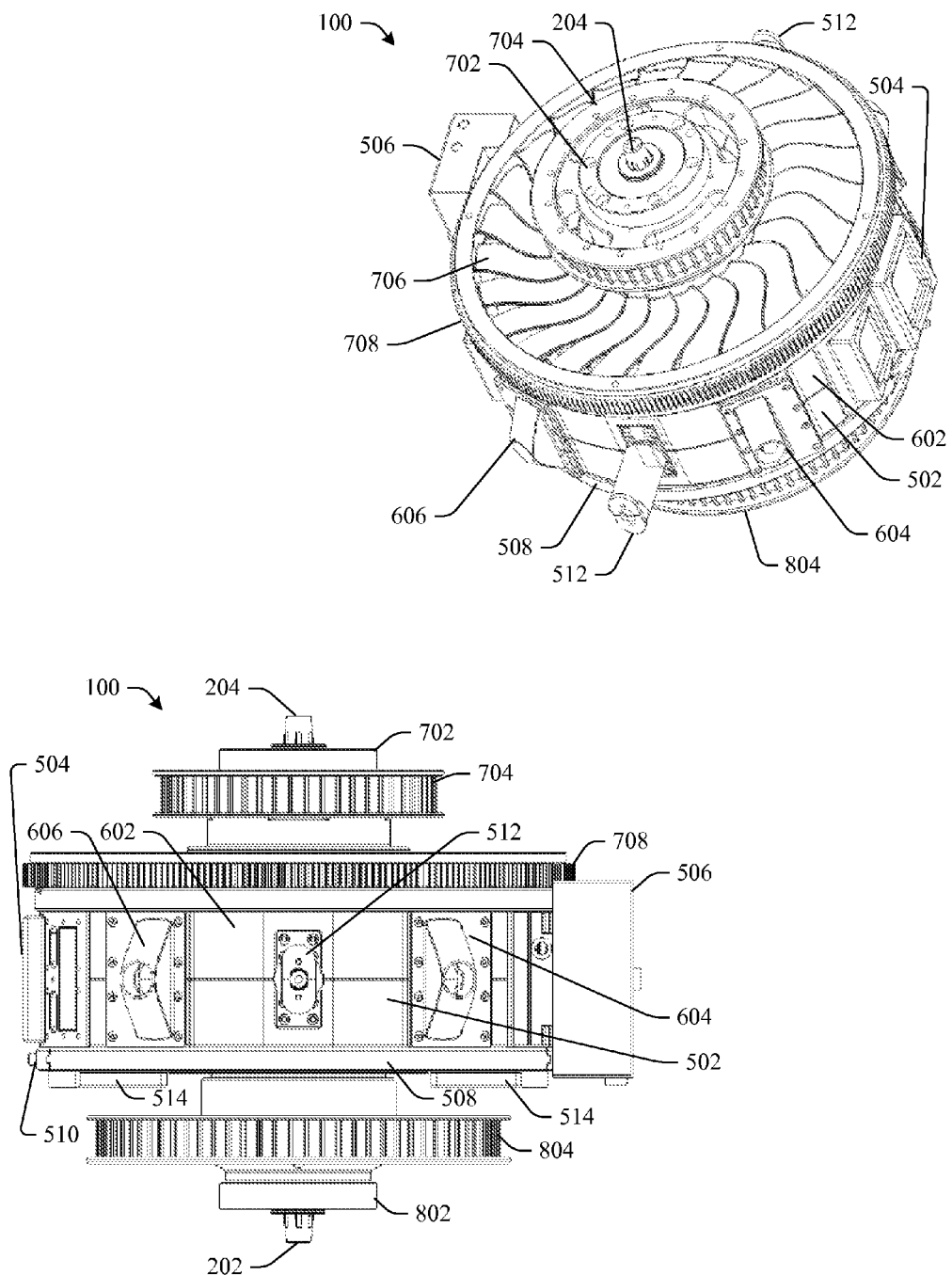
FIG. 3 illustrates a perspective view and a side view of an embodiment of an internal combustion engine in accordance with aspects of the subject innovation.
Figure 4:
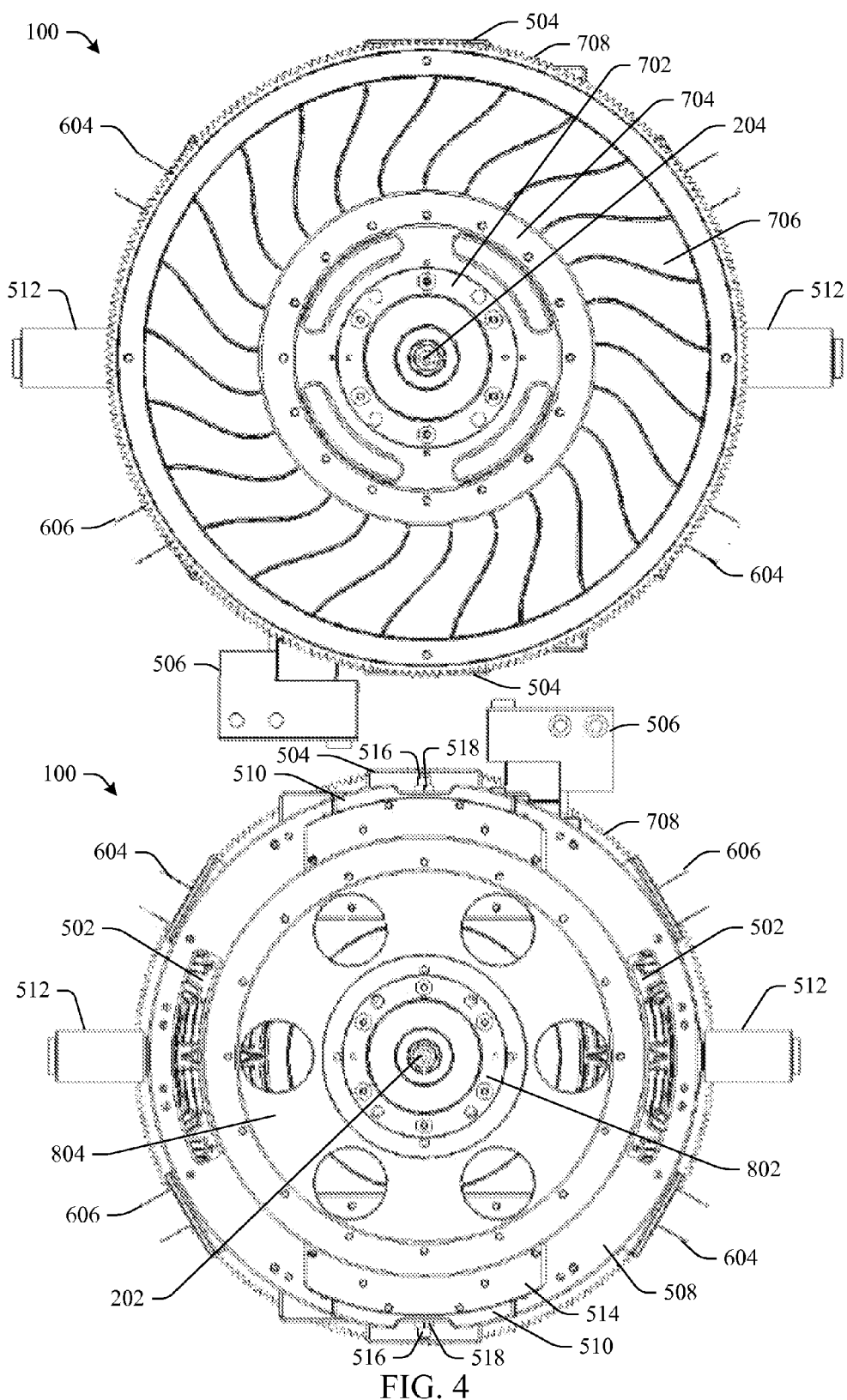
FIG. 4 illustrates front and back views of the example embodiment of an internal combustion engine in accordance with aspects of the subject innovation.

FIG. 3 illustrates a perspective view and a side view of an embodiment of internal combustion engine 100 in accordance with aspects of the subject innovation. Multiple components that can be included in at least one of internal combustion engine 100 or sub-assemblies thereof can be seen in FIG. 3. A first crankshaft 202 and a second crankshaft 204 can be coupled to the motion of an intermediate sub-assembly 300 (not illustrated in FIG. 3). Multiple components that can be included in a bottom plate sub-assembly 500 are illustrated in FIG. 3, including a bottom cylinder liner 502 that can partly define a combustion chamber, a side plate 504, a fluid reservoir 506 (e.g., for storing engine oil, etc.), a first bottom plate 508, second bottom plates 510, injection adapters 512 that can inject fuel into the combustion chambers, and a bottom plate cover 514. Components visible in FIG. 3 that can be included in a top plate sub-assembly 600 are a top cylinder liner 602 that can partly define a combustion chamber, an intake manifold 604, and an exhaust manifold 606. Components that can be included in a front-end sub-assembly 700 which can be seen in FIG. 3 include a front-end coupling plate 702 that can couple motion of the front-end sub-assembly 700 or components thereof to that of the crank sub-assembly 200, a front-end pulley 704, a flywheel 706, and a ring gear 708. Components that can be included in a back-end sub-assembly which can be seen in FIG. 3 include a back-end coupling plate 802 that can couple motion of the back-end sub-assembly 800 or components thereof to that of the crank sub-assembly 200 and a back-end pulley 804. FIG. 4 illustrates front and back views of the example embodiment of internal combustion engine 100 in accordance with aspects of the subject innovation. Additionally visible in FIG. 4 are adjustment rods 516 and adjustment rod nuts 518 that can be included in bottom plate sub-assembly 500 to facilitate adjustment and attachment of the second bottom plates 510 to the first bottom plate 508.

Figure 5:
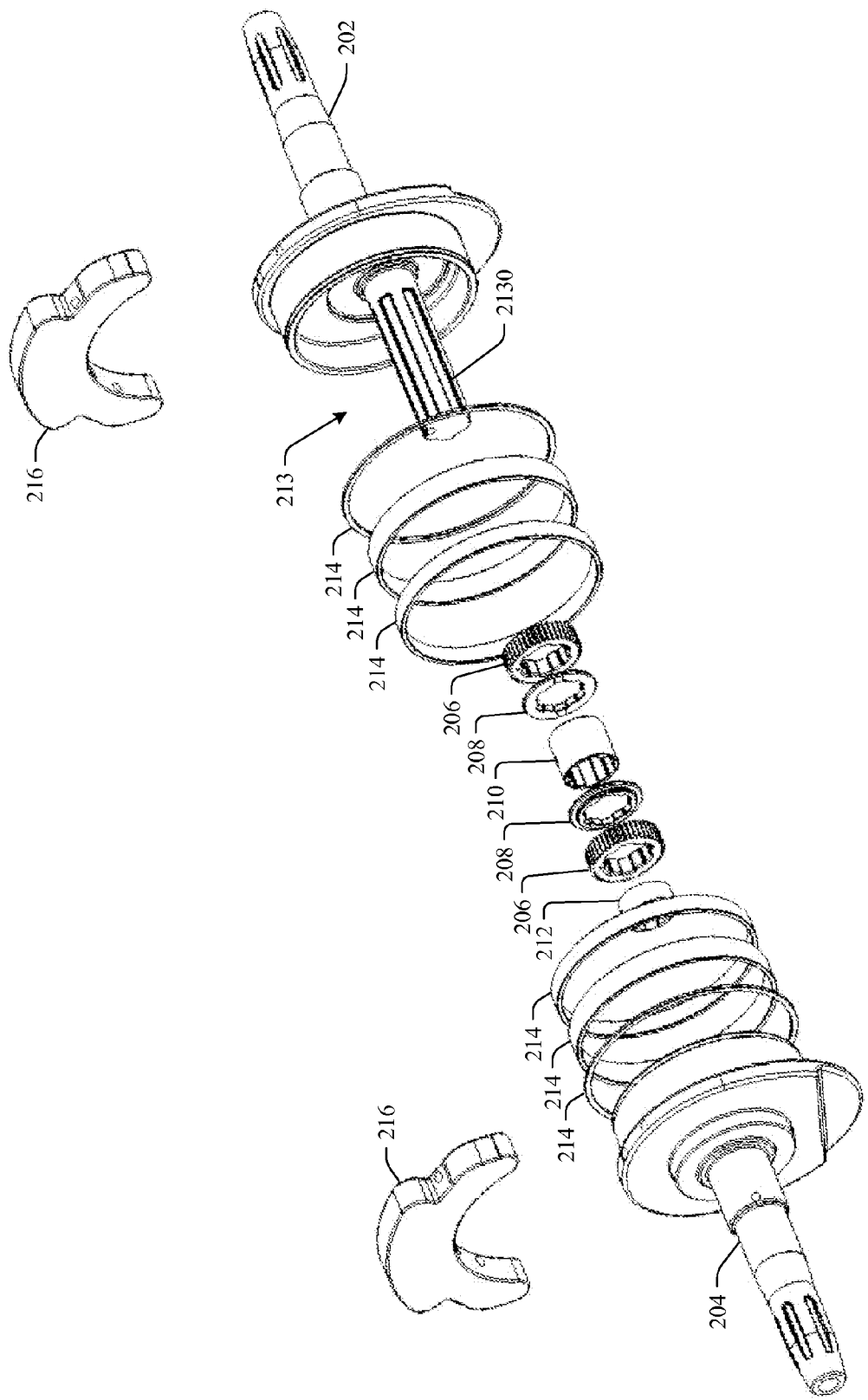
FIG. 5 illustrates an exploded view of an example crank sub-assembly in accordance with aspects of the subject innovation.

FIG. 5 illustrates an exploded view of an example crank sub-assembly 200 in accordance with aspects of the subject innovation. Example crank sub-assembly 200 can include the first crankshaft 202 and second crankshaft 204, which can couple to one another via a spline joint 213 that can include the spline 2130 visible on the inner side of the first crankshaft 202 (i.e., the side facing the second crankshaft 204) and a spline 2132 visible in FIG. 7. Between the first crankshaft 202 and second crankshaft 204, the spline joint 213 can couple with one or more of crank spur gears 206, crank washers 208, crank bearing race 210, and crank spacer 212. Primary members of primary member sub-assembly 400 can rotate around the circular inner surface of first crankshaft 202 and second crankshaft 204, between the primary member bearings 214 (e.g., which can be made of ceramic, etc., to provide for reduced friction in the absence of lubrication, etc.). The cylindrical extrudes visible on the outer sides of the first and second crankshafts 202 and 204 can couple to roller bearings that can be included in the bottom plate sub-assembly 500 and the top plate sub-assembly 600. Counterweights 216 can be included on the first and second crankshafts 202 and 204 to reduce vibration.

Figure 6:
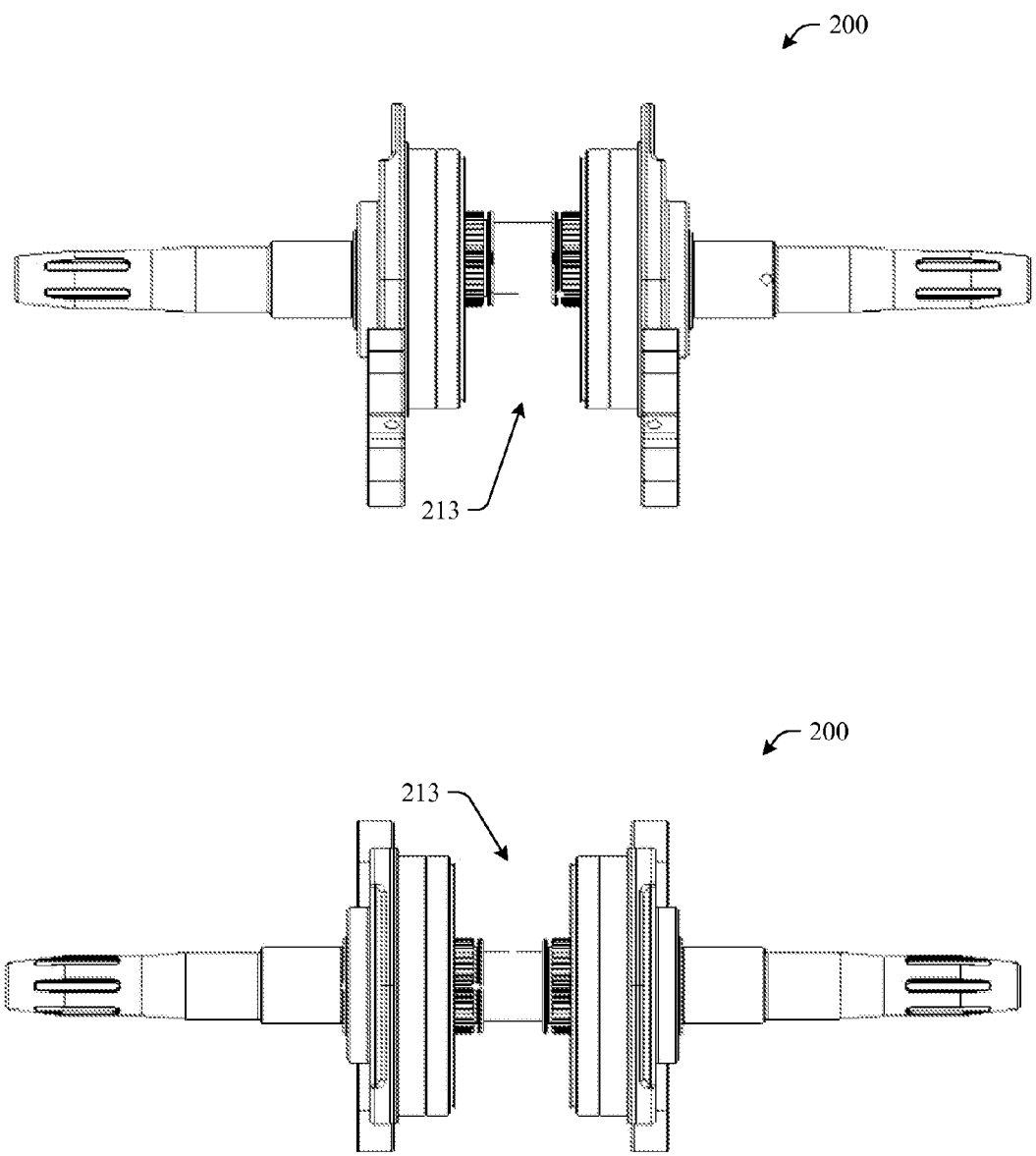
FIG. 6 presents side and top views of the example crank sub-assembly in accordance with aspects of the subject innovation.
Figure 8:
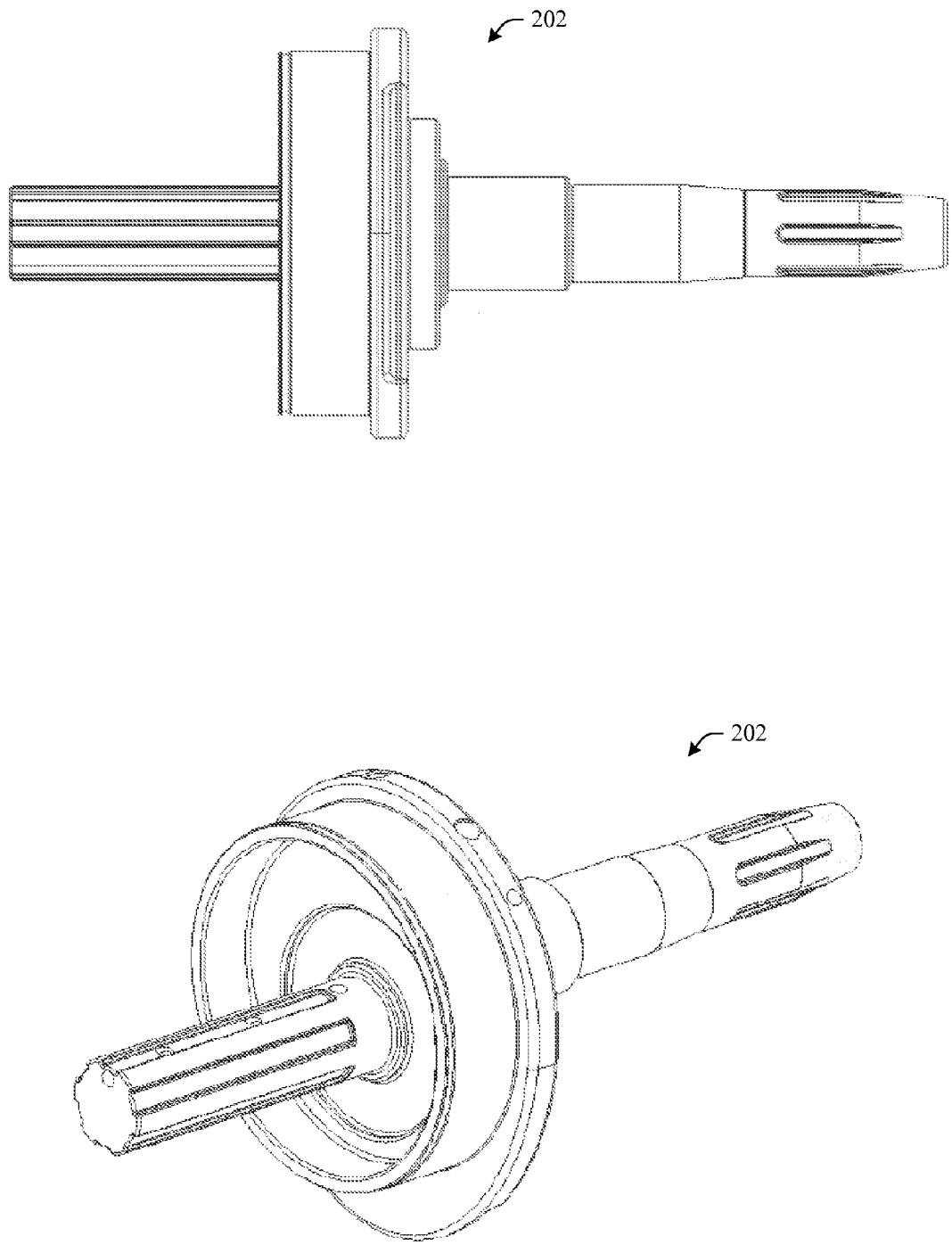
FIG. 8 illustrates a top and perspective view of an example first crankshaft in accordance with aspects of the subject innovation.
Figure 9:
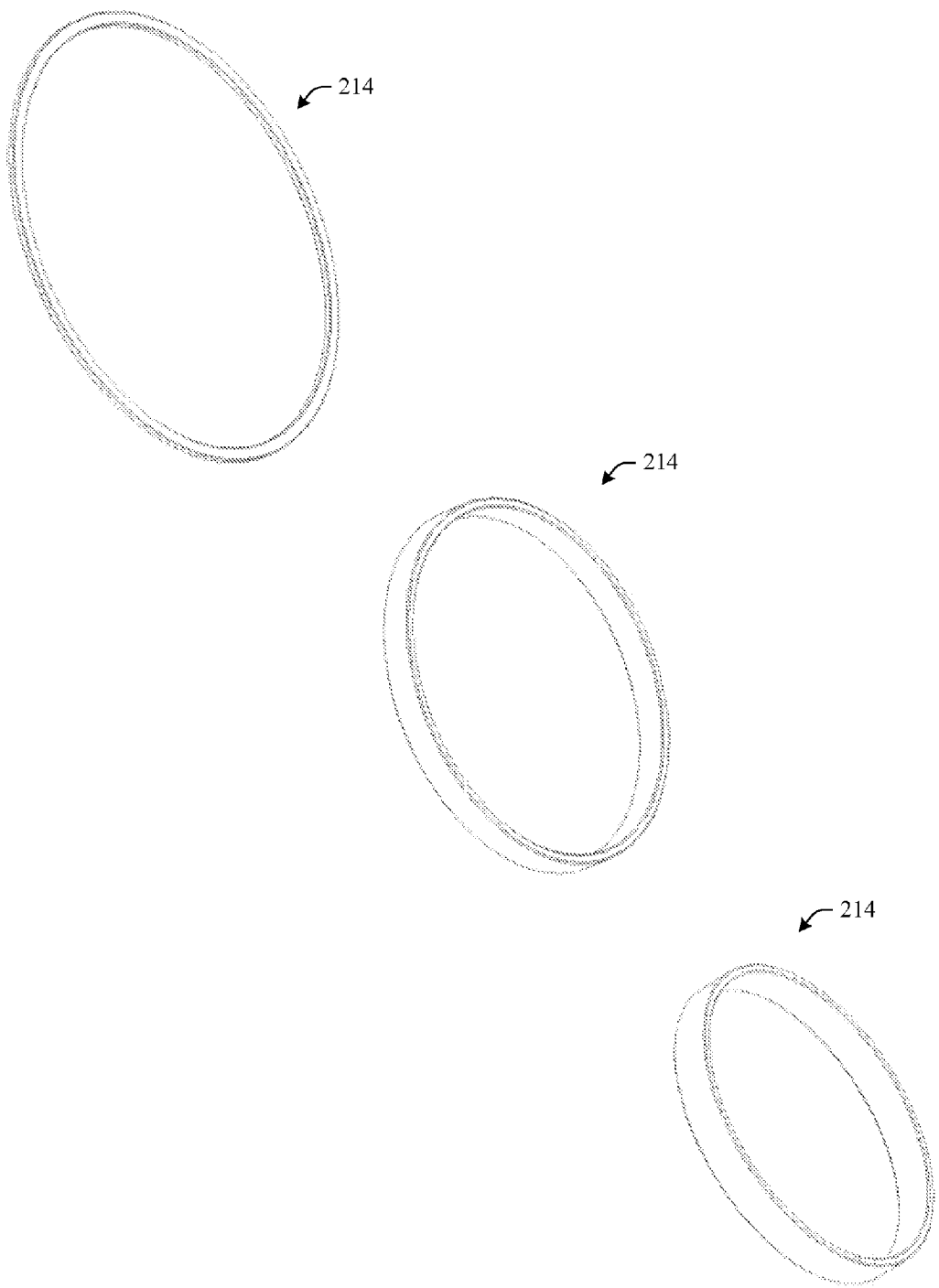
FIG. 9 illustrates perspective views of example primary member bearings in accordance with aspects of the subject innovation.
Figure 10:
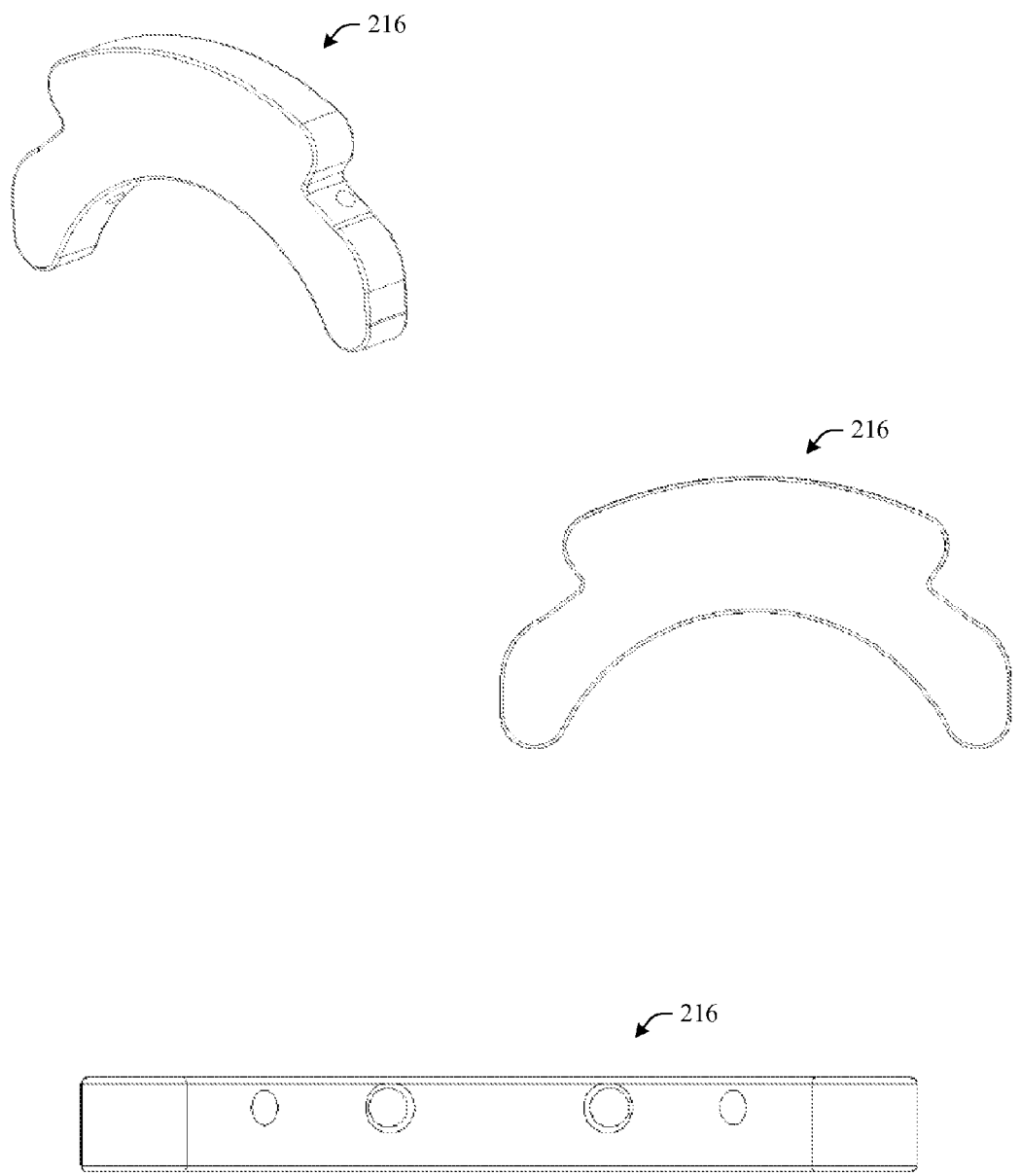
FIG. 10 illustrates perspective, side, and bottom views of an example counterweight in accordance with aspects of the subject innovation.
Figure 11:
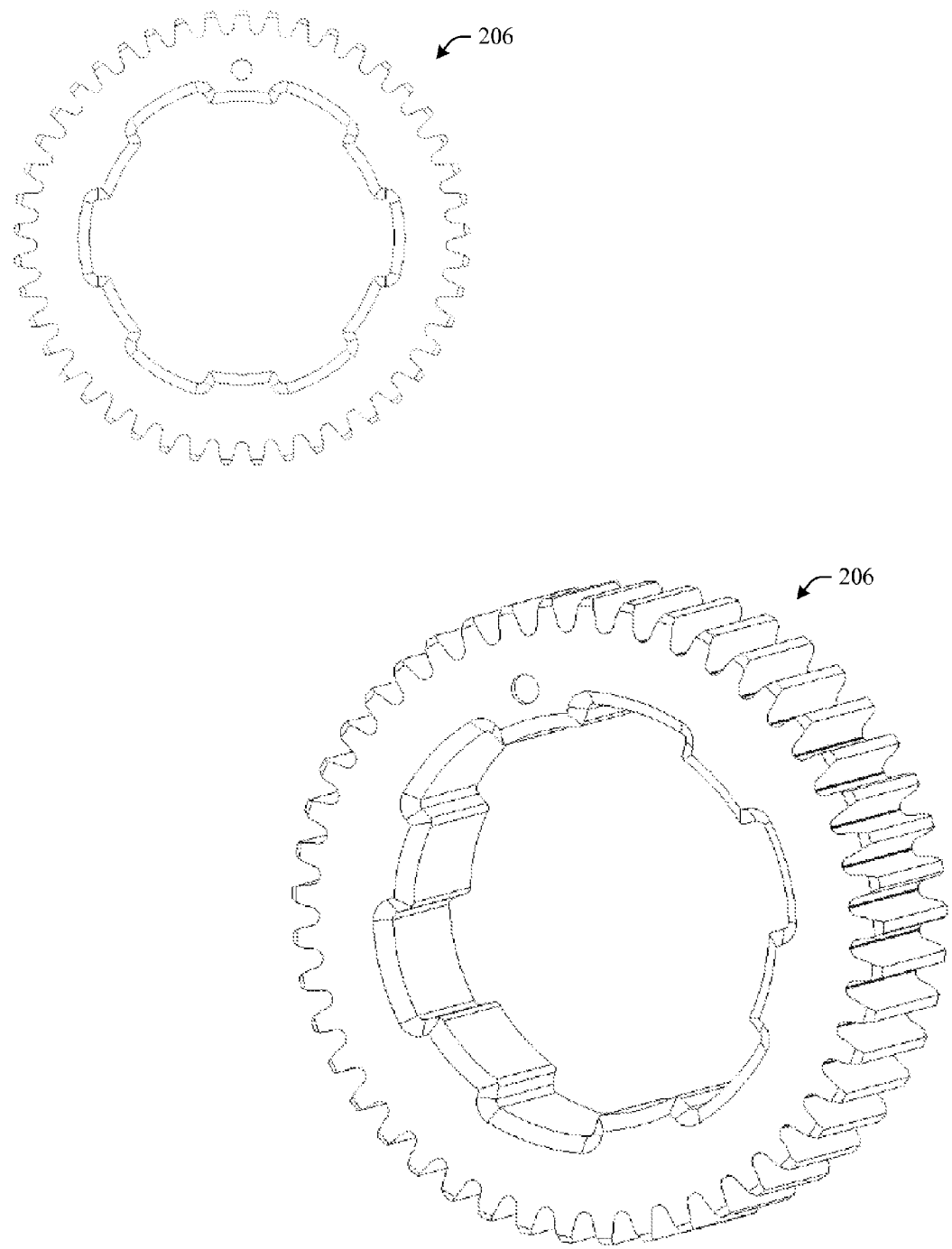
FIG. 11 illustrates side and perspective views of an example crank spur gear in accordance with aspects of the subject innovation.
Figure 12:
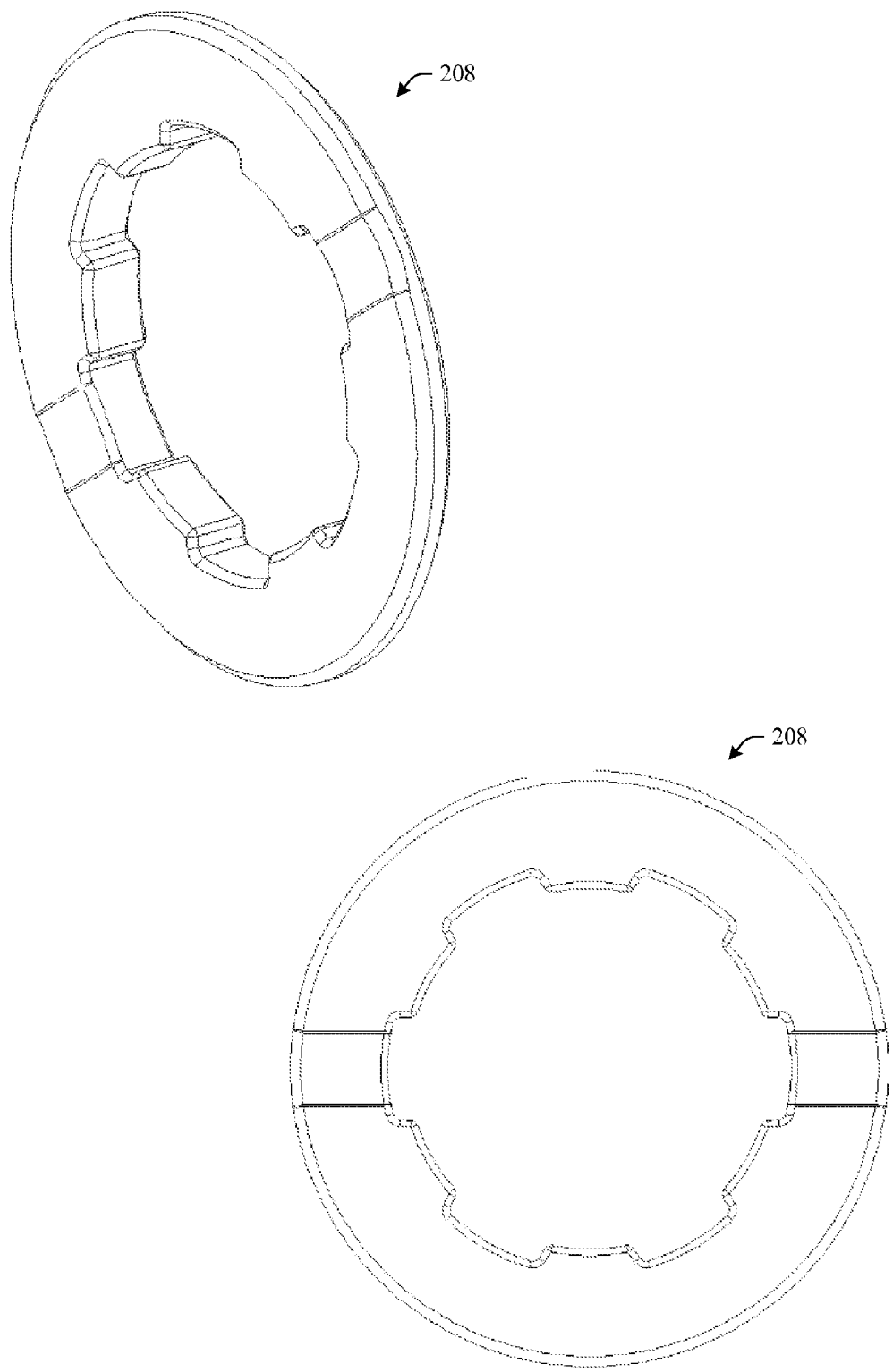
FIG. 12 illustrates perspective and side views of an example crank washer in accordance with aspects of the subject innovation.

FIGS. 6-13 show various components that can be included in or associated with a crank sub-assembly 200 in accordance with aspects of the subject innovation. FIG. 6 presents side and top views of the example crank sub-assembly 200 in accordance with aspects of the subject innovation. FIG. 7 illustrates a top and perspective view of an example second crankshaft 204 in accordance with aspects of the subject innovation, showing a spline 2132 that can be included on the second crankshaft 204 to couple with the first crankshaft 202. FIG. 8 illustrates a top and perspective view of an example first crankshaft 202 comprising a spline 2130 in accordance with aspects of the subject innovation. FIG. 9 illustrates perspective views of example primary member bearings 214 in accordance with aspects of the subject innovation. In various aspects, these bearings and other components of internal combustion engines 2 or 100 can be ceramic, which can provide reduced friction. FIG. 10 illustrates perspective, side, and bottom views of an example counterweight 216 in accordance with aspects of the subject innovation. FIG. 11 illustrates side and perspective views of an example crank spur gear 206 in accordance with aspects of the subject innovation. FIG. 12 illustrates perspective and side views of an example crank washer 208 in accordance with aspects of the subject innovation. FIG. 13 illustrates perspective views of example crank bearing race 210 and crank spacer 214 in accordance with aspects of the subject innovation.

Figure 14:
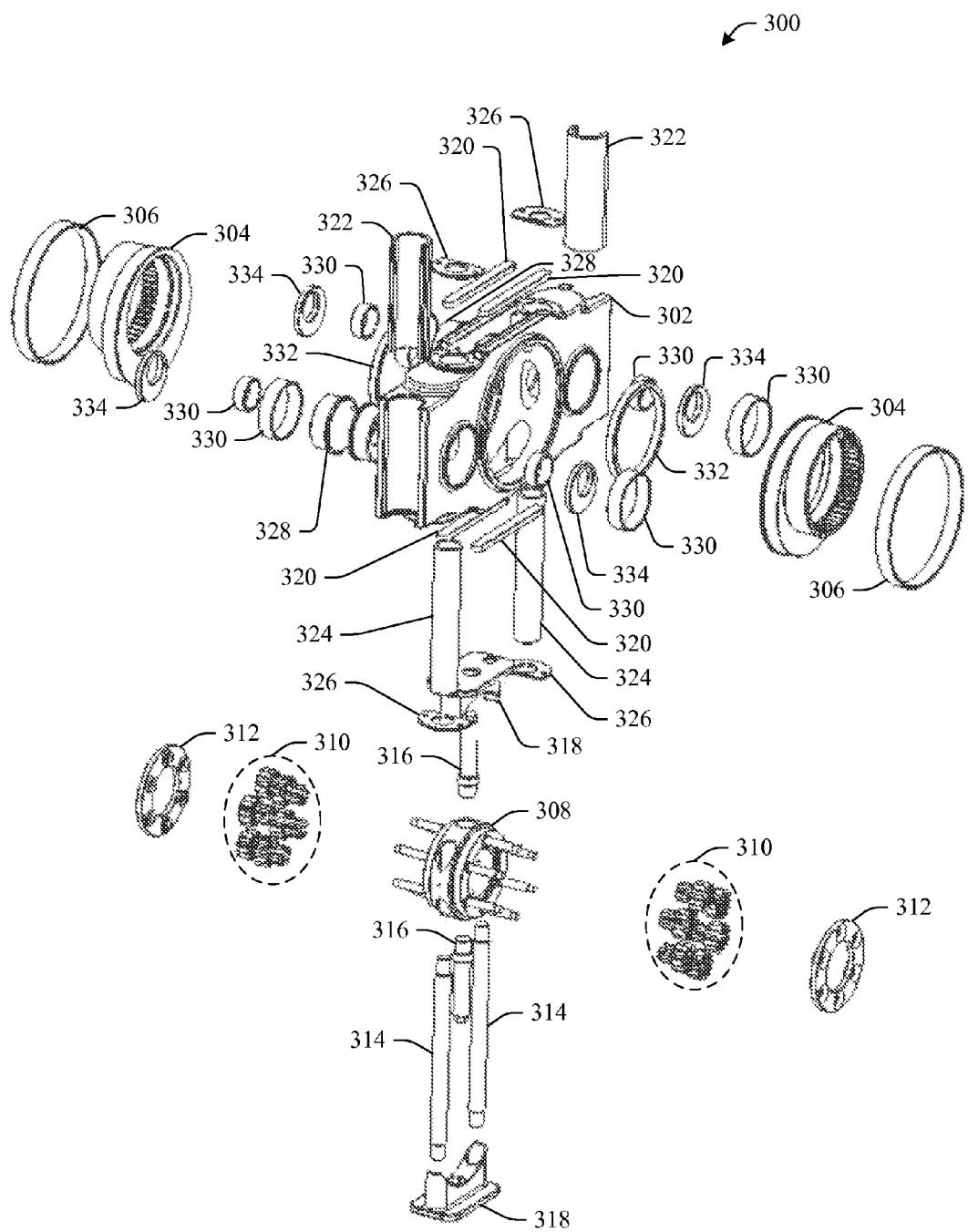
FIG. 14 illustrates an exploded view of an example intermediate sub-assembly in accordance with aspects of the innovation.

Turning to FIG. 14, illustrated is an exploded view of an example intermediate sub-assembly 300 in accordance with aspects of the innovation. Intermediate member 302 can house a pair of ring gears 304 and associated ring gear bearings 306 (e.g., to reduce friction, etc.) in a central opening, such that ring gears 304 can rotate within that central opening.

Planet carrier 308 can be positioned within ring gears 304, and can have a plurality of pins or cylindrical extrude features on each side as illustrated, each of which can couple with a planet gear 310, which can be maintained between planet carrier caps 312. Planet carrier 308, planet gears 310 (enclosed within the dashed regions) and planet carrier caps 312 can be placed within the central opening of the intermediate member 302 such that teeth of planet gears 310 couple with those of crank spur gears 206 (e.g., which can act as a sun gear, etc.) and with those of ring gears 304. As such, rotation of ring gears 304 and planet gears 310 is coupled to that of the crank sub-assembly 200 via crank spur gears 206. Planet gears 310 can rotate around the pins or cylindrical extrude features of planet carrier 308; however, planet carrier 308 need not rotate, but can instead translate in the horizontal and vertical directions (as used herein, for ease of reference, "horizontal" and "vertical" refer to a pair of arbitrary, mutually orthogonal directions, and are not used in relation to gravity), with planet carrier bearings 332 being disposed between the ring gears 304 and planet carrier 308 to provide for reduced friction. Rotation of planet carrier 308 can be constrained with the inclusion of slider rods 314 and planet carrier rods 316, which can allow vertical motion of planet carrier 308 and associated components via planet carrier 308 sliding vertically along slider rods 314. Slider rods 314 and planet carrier rods 316 can be coupled to sliders 318, which can move horizontally along slider bearings 320, allowing horizontal motion of the planet carrier 308 and associated components. These components, the ring gears 304, planet carrier 308, and planet gears 310, with or without other associated components, can act as an orbiting planetary gearing system in accordance with aspects of the subject innovation, whereby the linear motion (vertically) of the intermediate sub-assembly 300 can drive the rotational motion of the crank sub-assembly 200 via the translational (horizontal and vertical) motion of the planet carrier 308, and the rotational motion of the ring gears 304, which is coupled to the planet gears 310, which are also coupled to crank spur gears 206.

Intermediate sub-assembly 300 can move vertically along inner rails 902 and outer rails 904. Outer rail bearings 322 and inner rail bearings 324, which can be held in place via inner rail bearing caps 326. As with other bearings described herein, in some embodiments, bearings 322 and 324 can be made of ceramic or other materials that can provide for reduced friction.

Motion of the intermediate sub-assembly 300 can be coupled to the motion of primary members of the primary member sub-assembly 400 via intermediate member rollers (also referred to herein as IM rollers) 328, which can be placed in side openings of intermediate member 302 along with associated IM roller bearings 330 and IM roller caps 334. Because of the offset coupling of the IM rollers 328 with the primary members, vertical motion of the intermediate sub-assembly 300 can be coupled to motion along an arc of a circle for the primary members.

Figure 15:
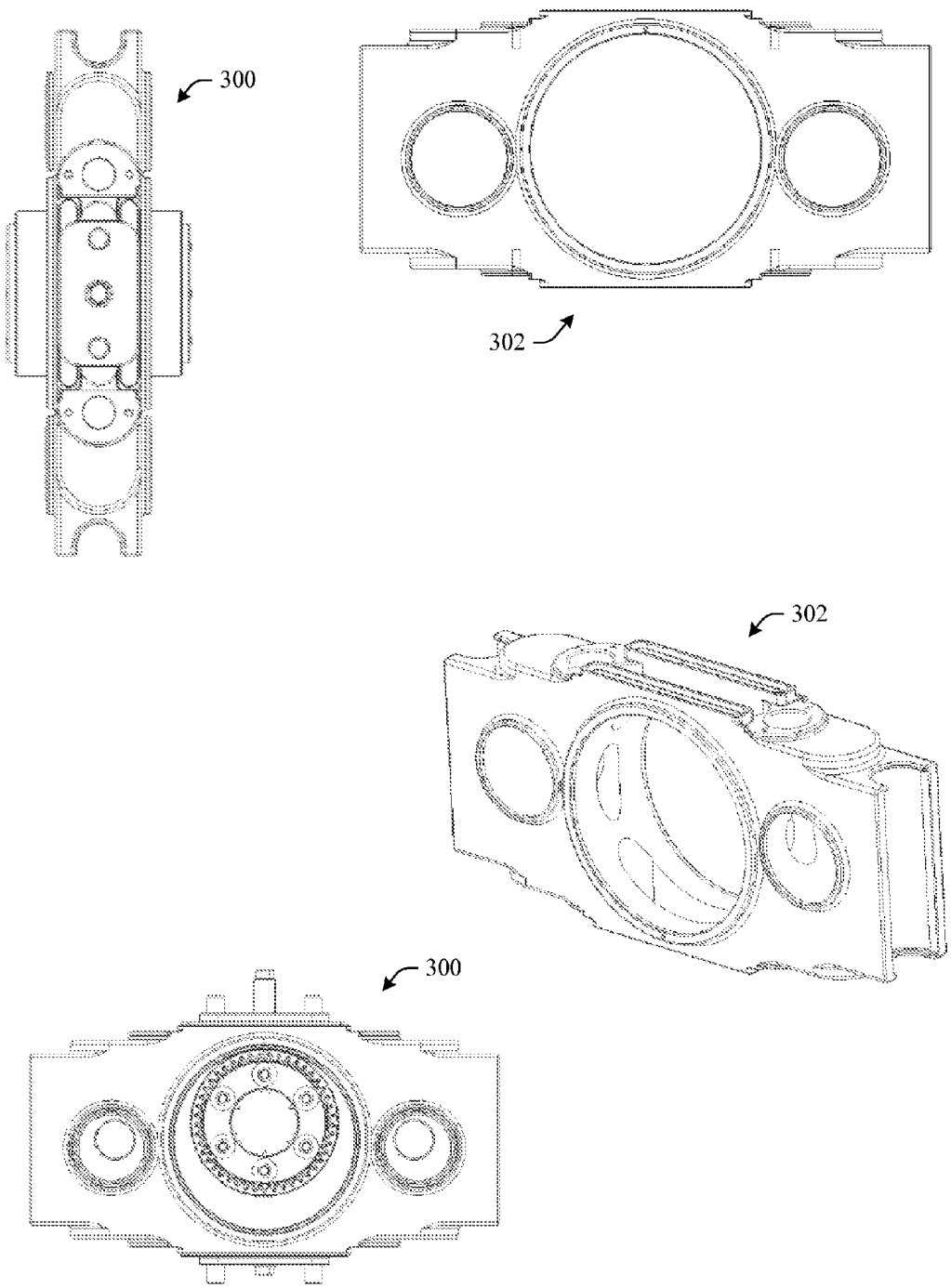
FIG. 15 illustrates top and front views of the intermediate sub-assembly, and front and perspective views of the intermediate member, in accordance with aspects of the innovation.
Figure 16:
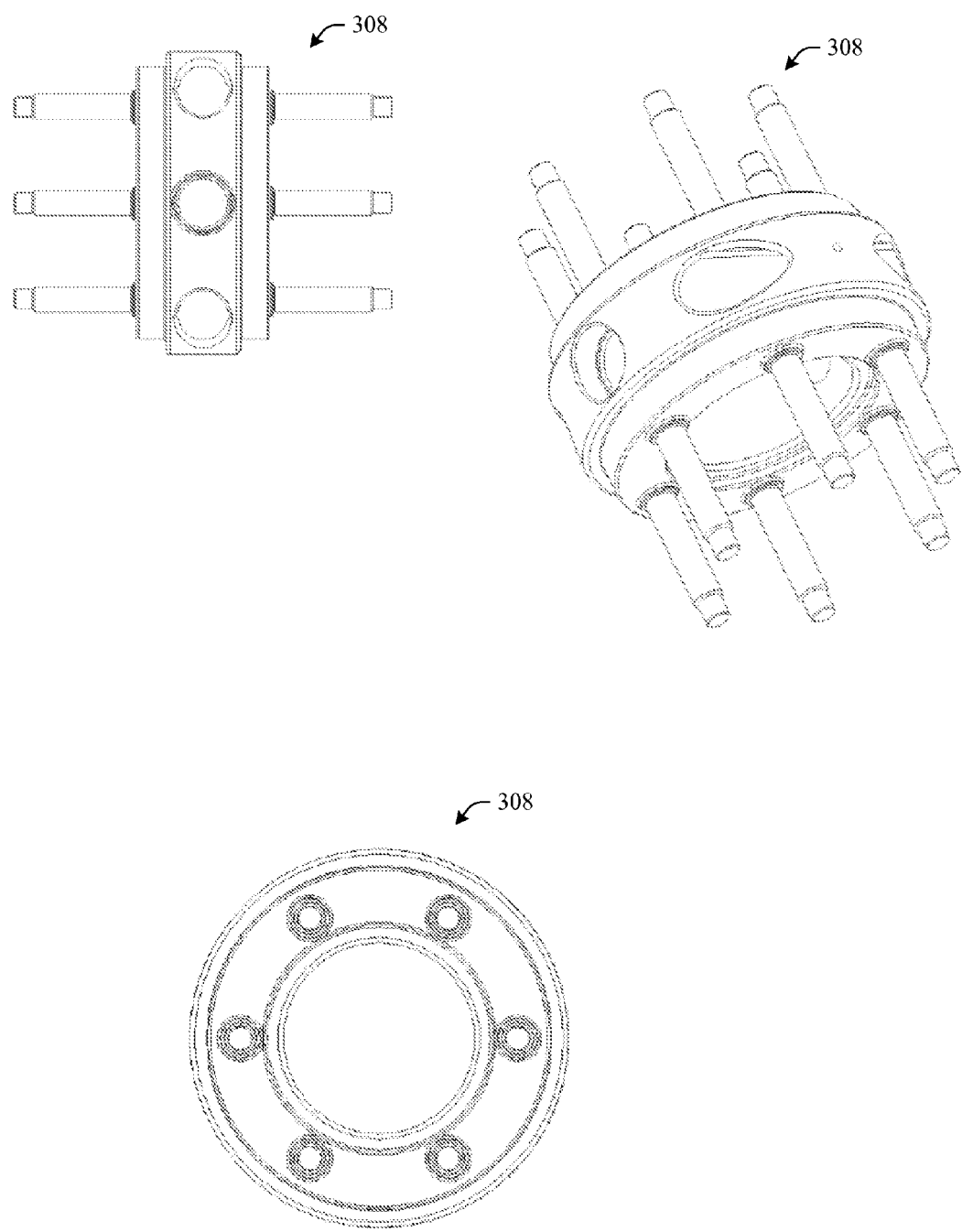
FIG. 16 illustrates top, perspective, and front views of an example planet carrier in accordance with aspects of the subject innovation.
Figure 17:
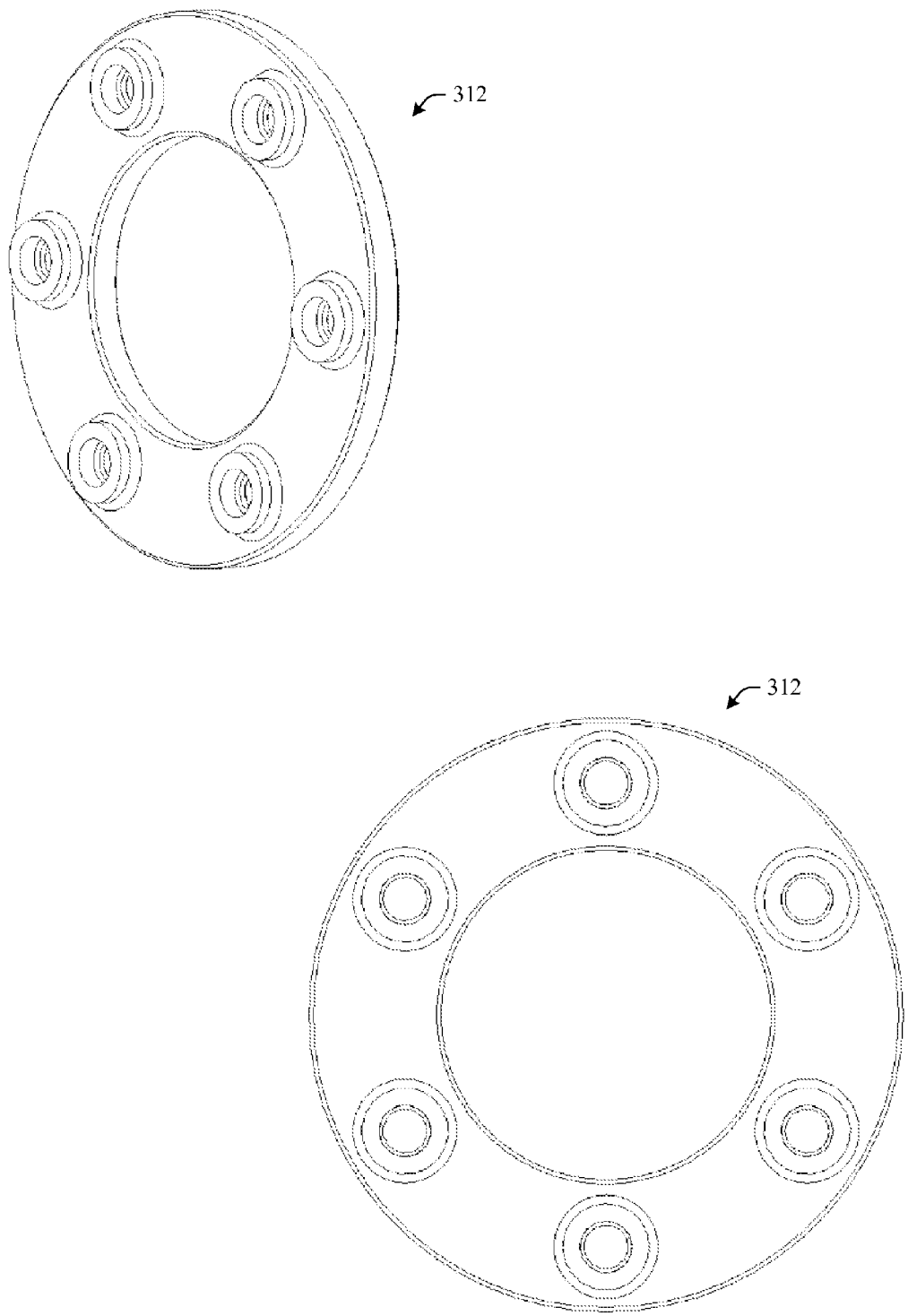
FIG. 17 illustrates perspective and front views of an example planet carrier cap in accordance with aspects of the subject innovation.
Figure 18:
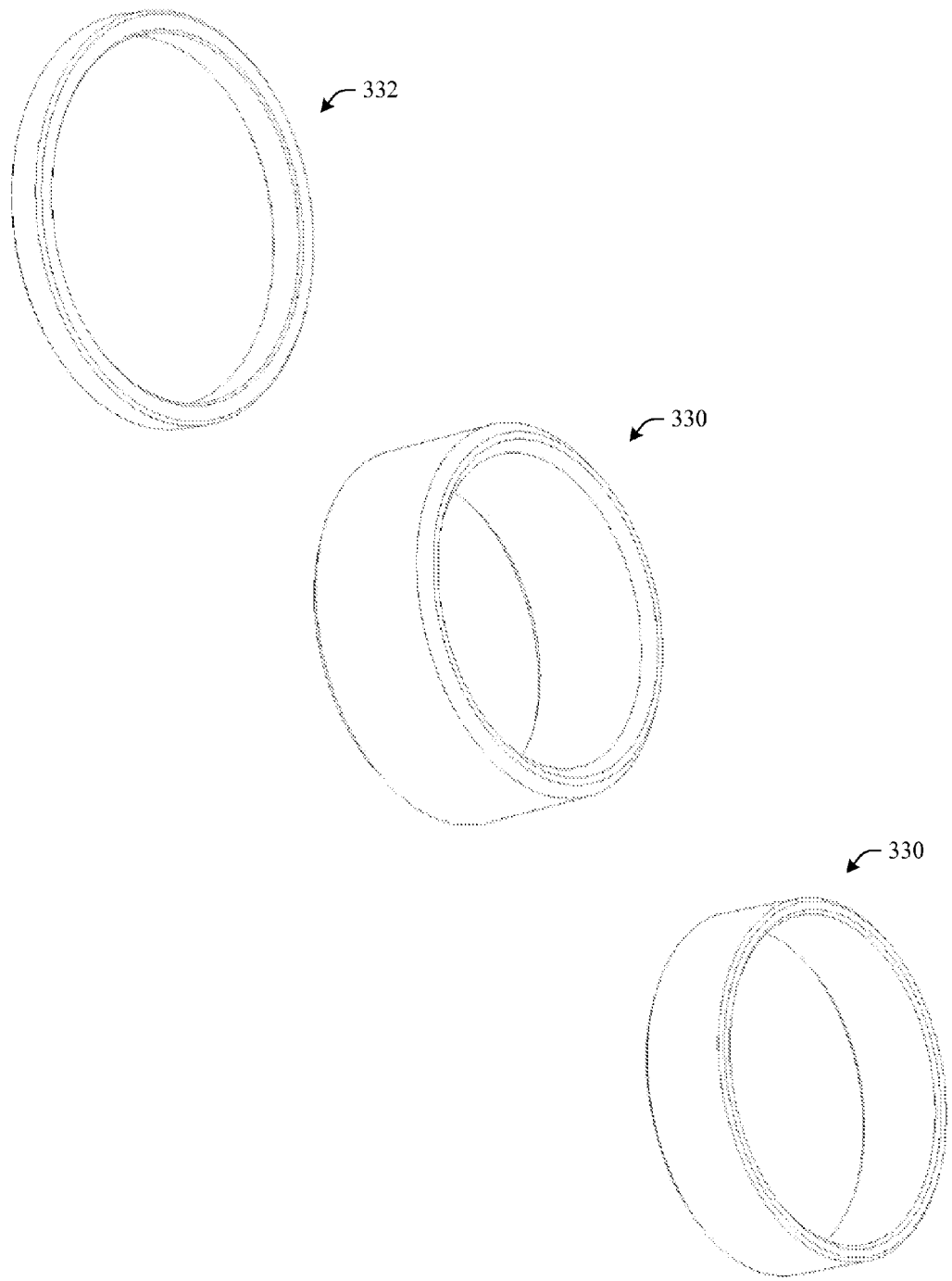
FIG. 18 illustrates perspective views of planet carrier bearing and intermediate member (IM) roller bearings in accordance with aspects of the subject innovation.
Figure 19:
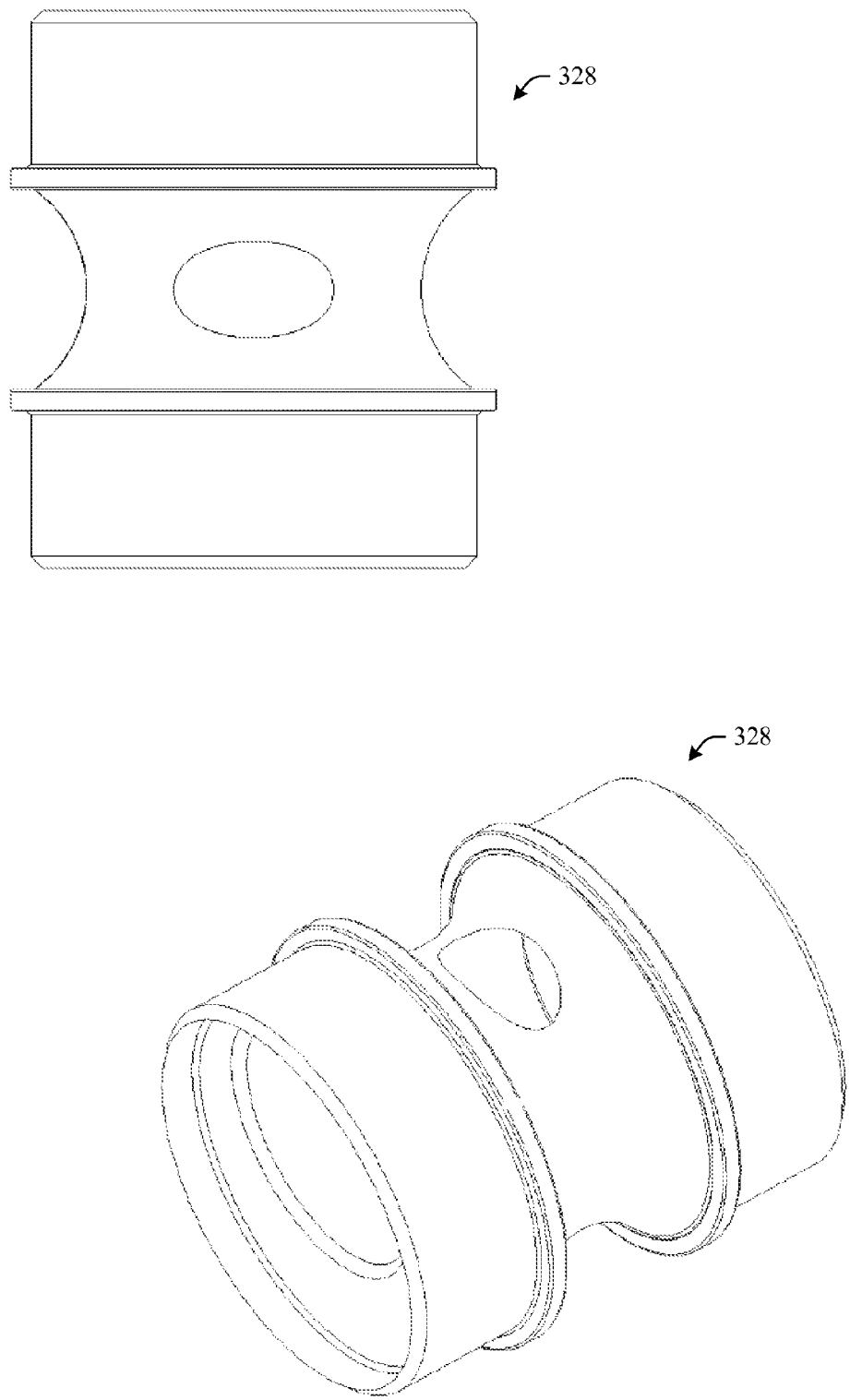
FIG. 19 illustrates side and perspective views of an IM roller in accordance with aspects of the subject innovation.
Figure 20:
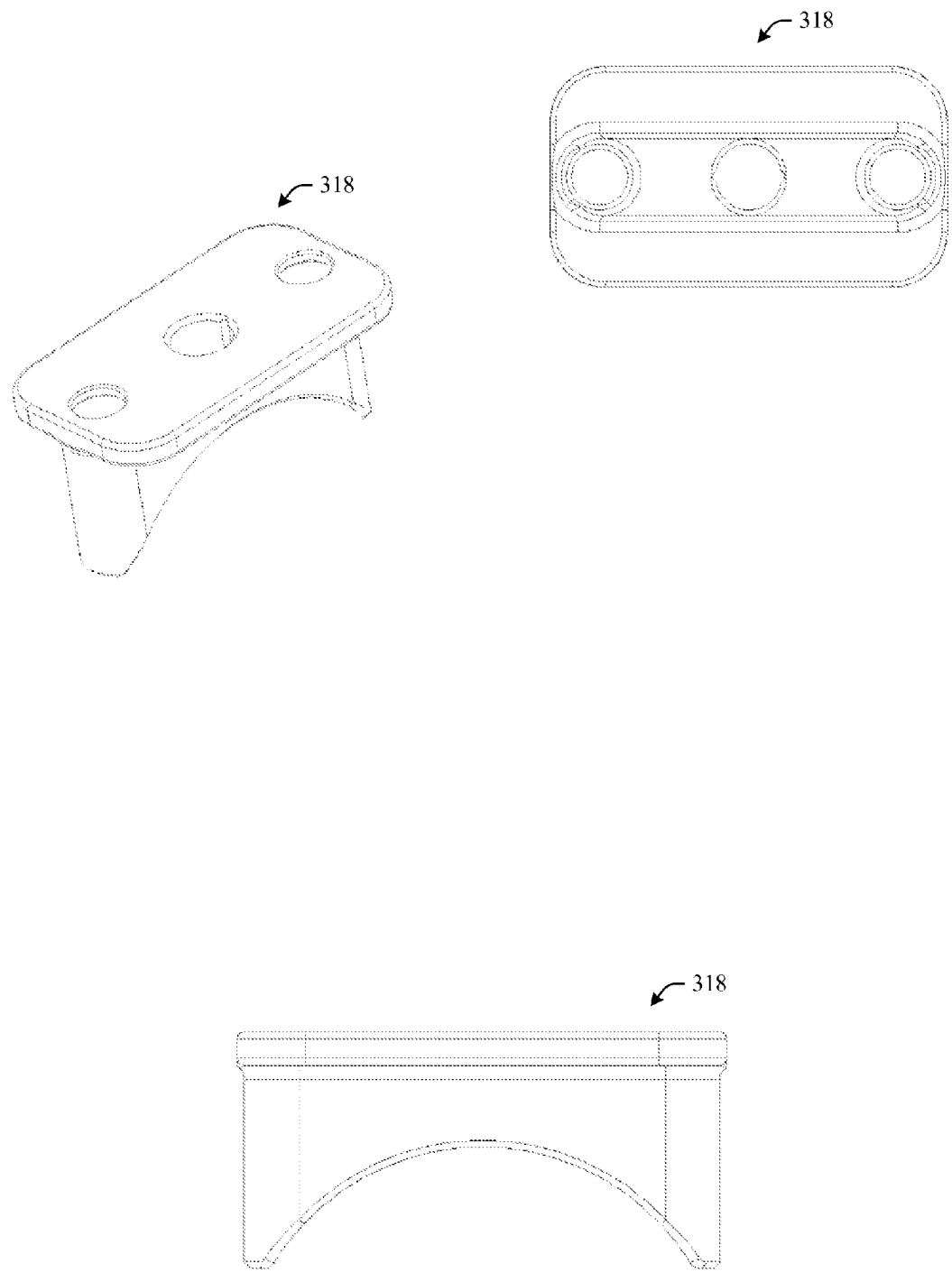
FIG. 20 illustrates top, perspective, and side views of a slider in accordance with aspects of the subject innovation.
Figure 21:
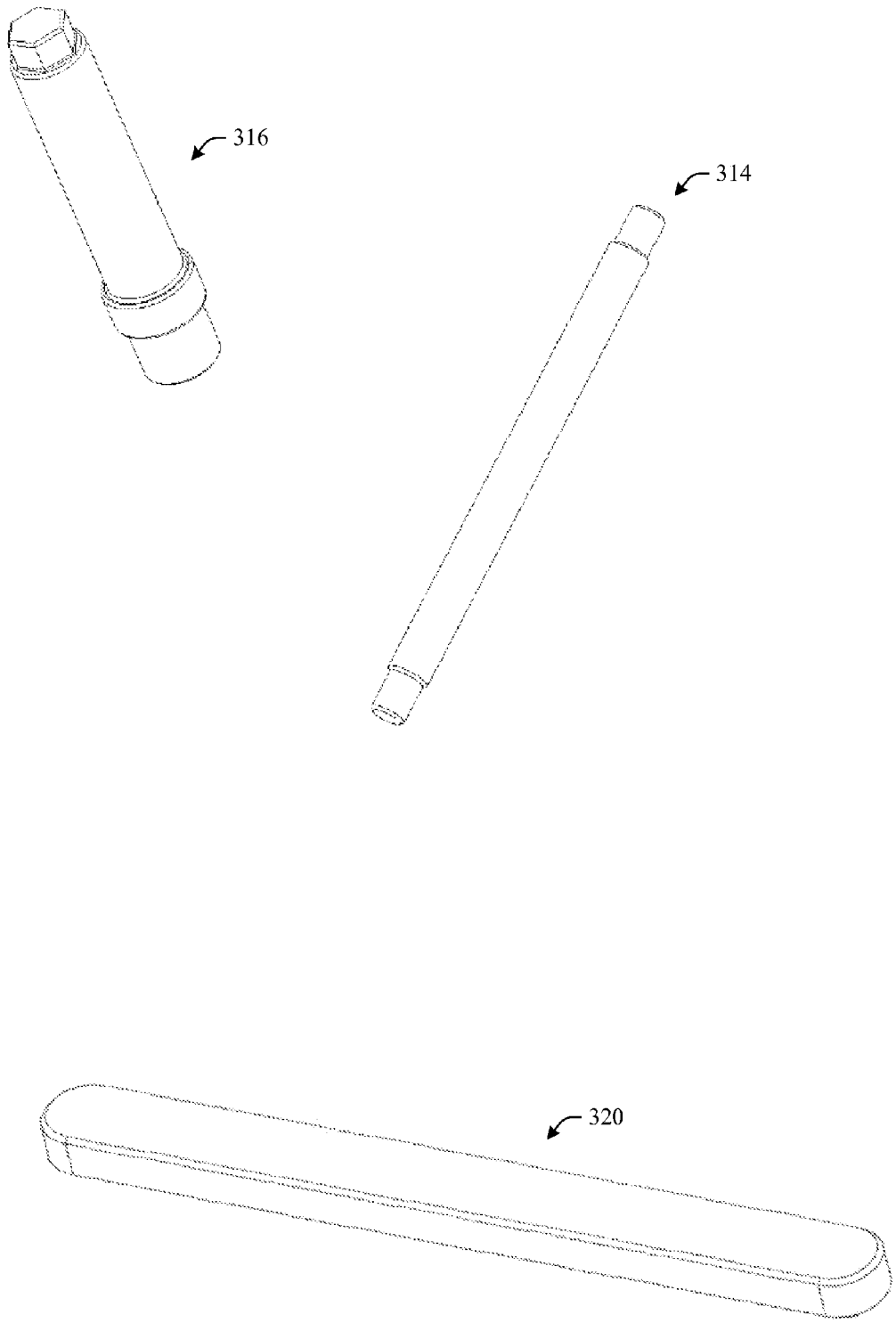
FIG. 21 illustrates perspective views of a planet carrier rod, slider rod, and slider bearing, in accordance with aspects of the subject innovation.
Figure 22:
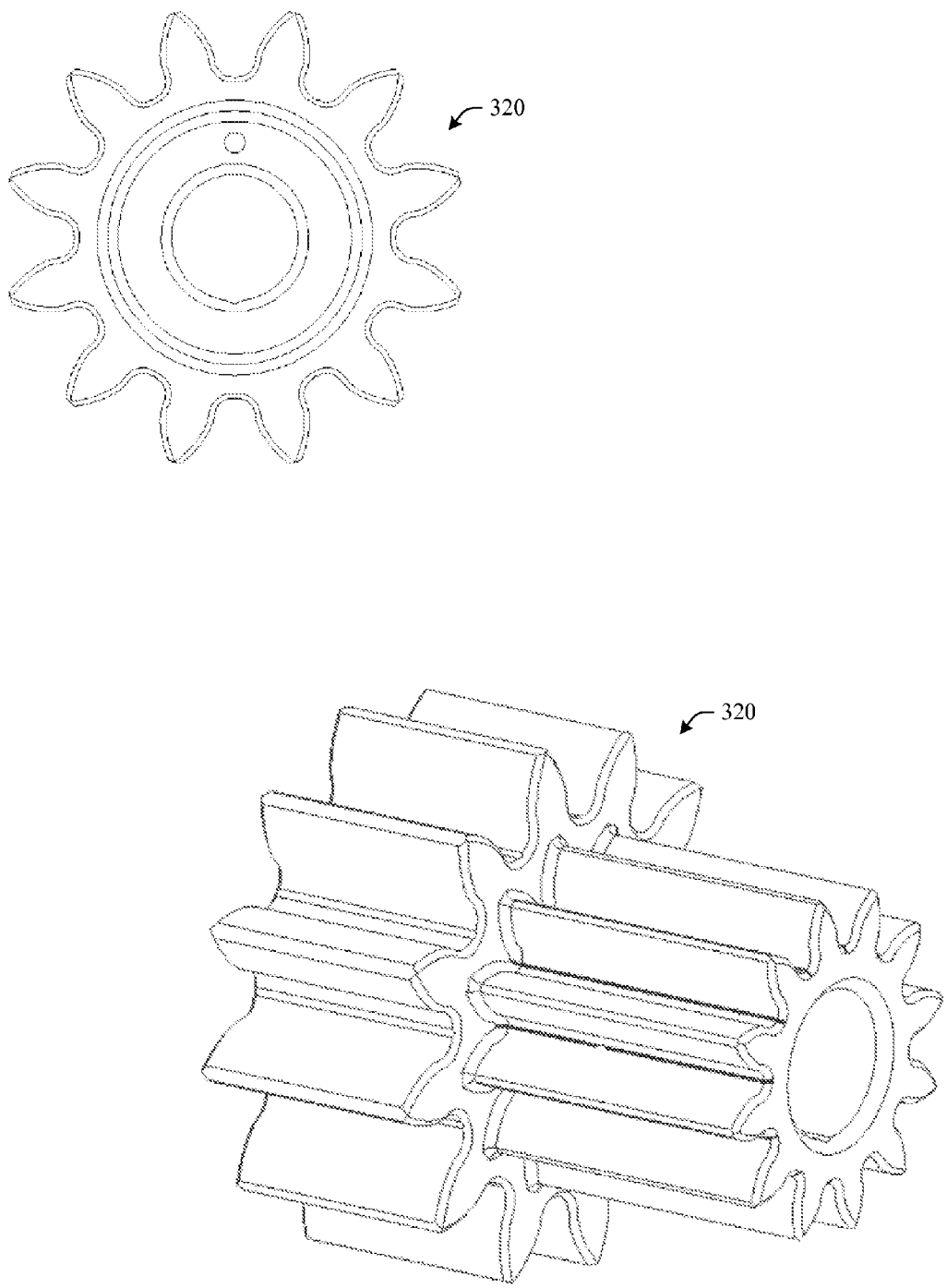
FIG. 22 illustrates a front and perspective view of a planet gear in accordance with aspects of the innovation.
Figure 23:
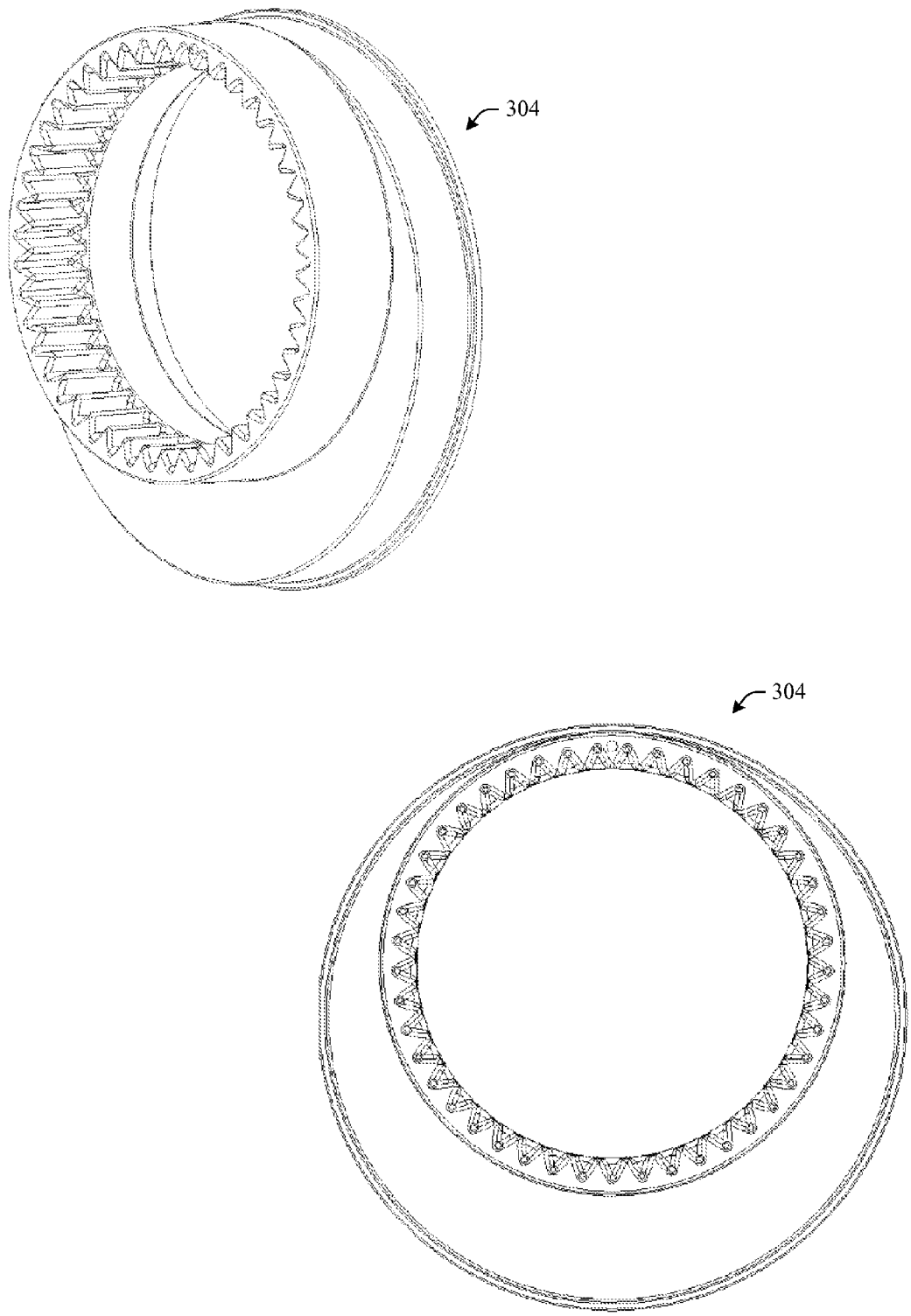
FIG. 23 illustrates a perspective and front view of a ring gear in accordance with aspects of the subject innovation.
Figure 24:
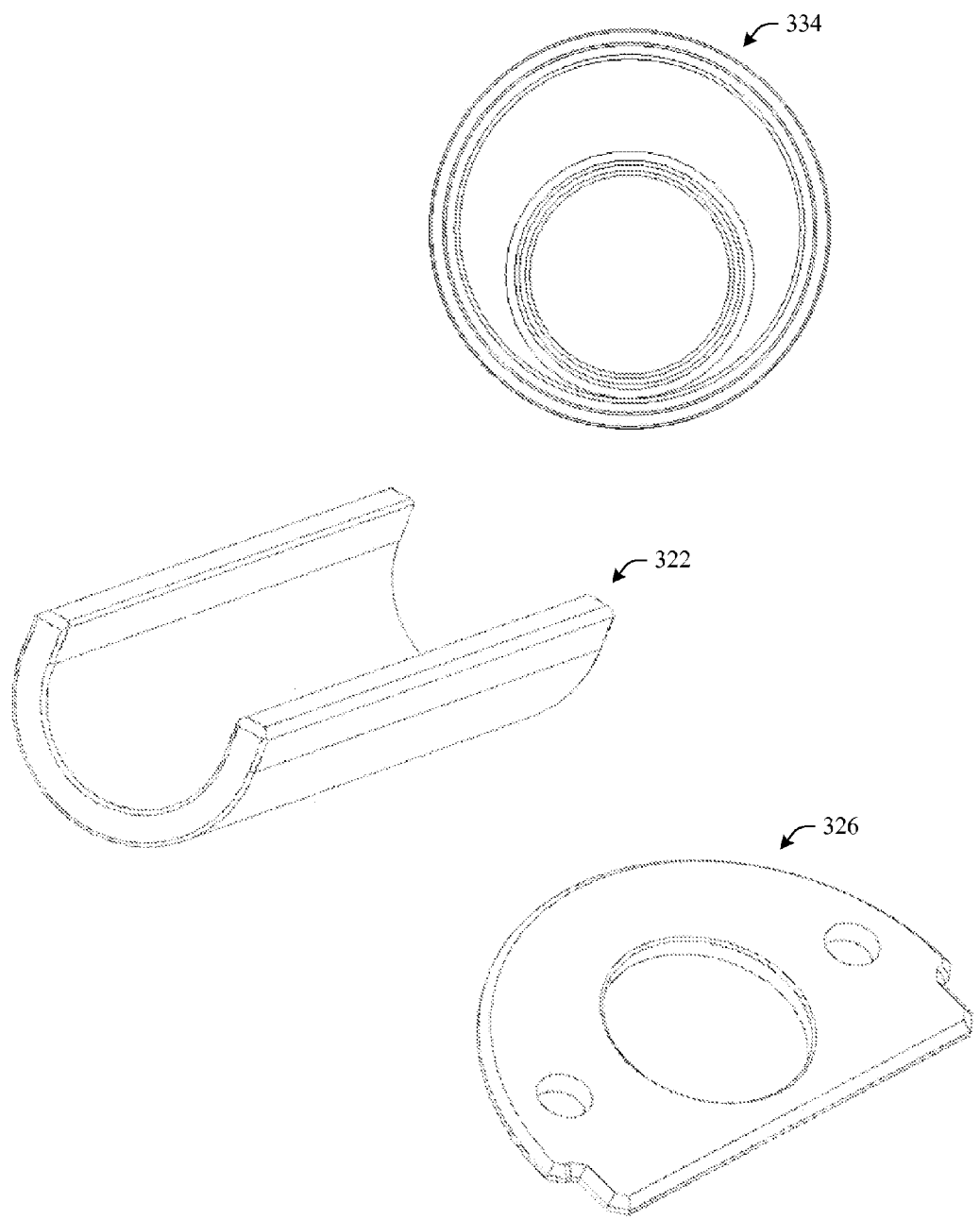
FIG. 24 illustrates a front view of an IM roller cap, and perspective views of an outer rail bearing and an inner rail bearing cap, in accordance with aspects of the subject innovation.

FIGS. 15-24 show various components that can be included in or associated with an intermediate sub-assembly 300 in accordance with aspects of the subject innovation. FIG. 15 illustrates top and front views of the intermediate sub-assembly 300, and front and perspective views of the intermediate member 302, in accordance with aspects of the innovation. FIG. 16 illustrates top, perspective, and front views of an example planet carrier 308 in accordance with aspects of the subject innovation. FIG. 17 illustrates perspective and front views of an example planet carrier cap 312 in accordance with aspects of the subject innovation. FIG. 18 illustrates perspective views of a planet carrier bearing 332 and IM roller bearings 330 in accordance with aspects of the subject innovation. FIG. 19 illustrates side and perspective views of an IM roller 328 in accordance with aspects of the subject innovation. The offset opening for coupling to the primary members of the primary member sub-assembly 400 is visible in the perspective view. FIG. 20 illustrates top, perspective, and side views of a slider 318 in accordance with aspects of the subject innovation. FIG. 21 illustrates perspective views of a planet carrier rod 316, slider rod 314, and slider bearing 320, in accordance with aspects of the subject innovation. FIG. 22 illustrates a front and perspective view of a planet gear 310 in accordance with aspects of the innovation. FIG. 23 illustrates a perspective and front view of a ring gear 304 in accordance with aspects of the subject innovation. FIG. 24 illustrates a front view of an IM roller cap 334, and perspective views of an outer rail rail bearing 322 and an inner rail bearing cap 326, in accordance with aspects of the subject innovation.

Figure 25:
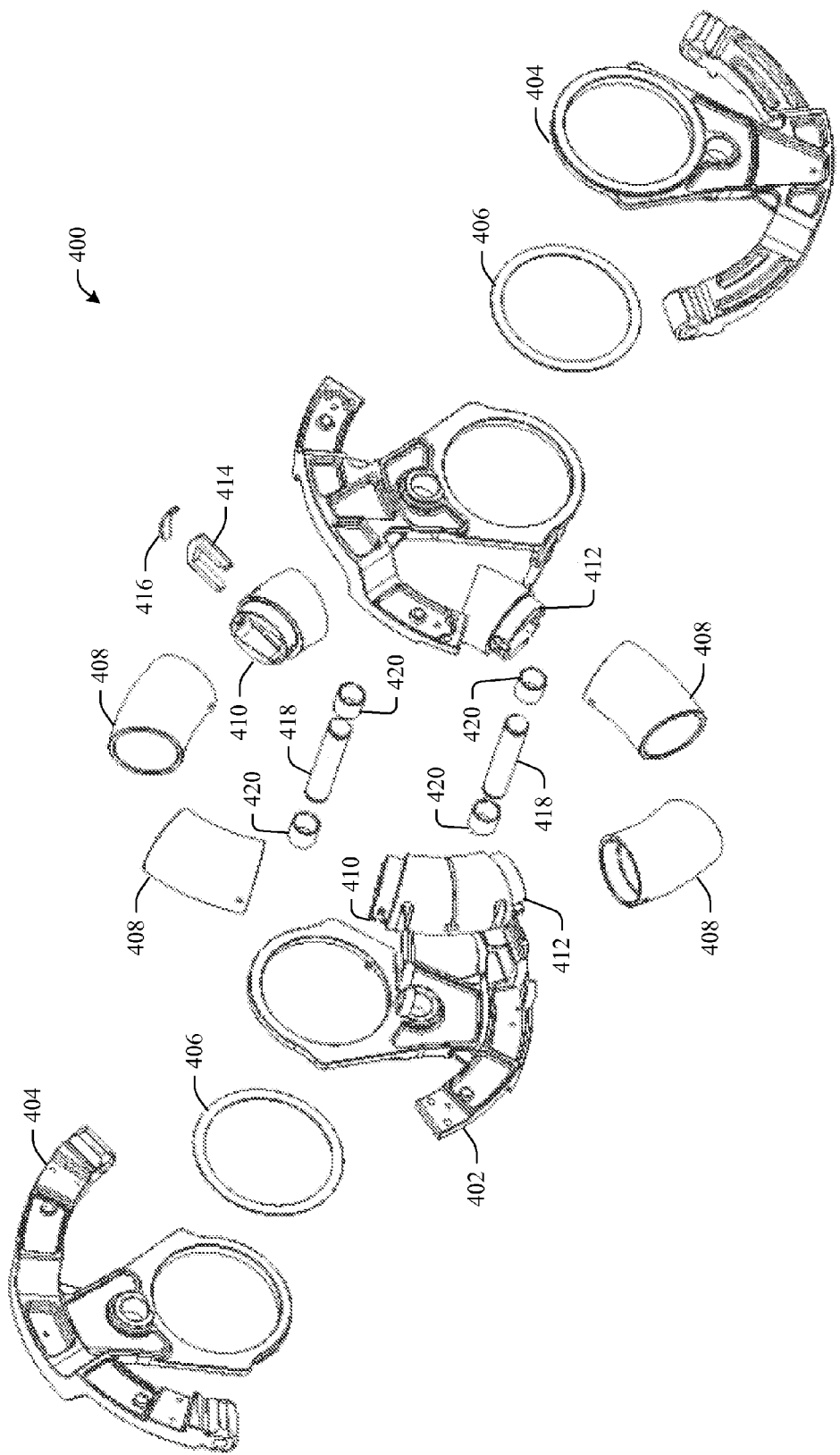
FIG. 25 illustrates an exploded view of an example primary member sub-assembly in accordance with aspects of the innovation.

Turning to FIG. 25, illustrated is an exploded view of an example primary member sub-assembly 400 in accordance with aspects of the innovation. Primary member sub-assembly 400 can include a pair of first primary member components 402 and a pair of second primary member components 404. Each first primary member component 402 can couple to a second primary member component 404, and the coupled or assembled pair (e.g., forming a primary member similar to those described above in connection with internal combustion engine 2) can include an associated primary member washer 406. Piston extensions 408 can be attached to each end of a coupled pair of a first primary member component 402 and second primary member component 404, and first pistons 410 or second pistons 412 can be attached to the ends of the coupled first primary member component 402 and second primary member component 404 (the coupled pair of a first primary member component 402 and second primary member component 404 corresponds to one of primary member 8 or primary member 10 described in connection with internal combustion engine 2; in various embodiments, unitary primary members can be employed alternatively to a pair of first primary member component 402 and second primary member component 404). Piston inserts 414 can be included to secure first pistons 410 or second pistons 412 to the coupled first and second primary member components 402 and 404, and piston insert caps 416 can be included as caps over the piston inserts 414 (although only one piston insert 414 and one piston insert cap 416 are labeled in FIG. 25, four of each are visible in FIG. 25, although the others overlap with other components). In some embodiments, pistons of the subject innovation (e.g., first pistons 410, second pistons 412, etc.) can be made of ceramic or other materials to provide for reduced friction. Together with cylinder liners discussed below, first pistons 410 and second pistons 412 can define the combustion chambers of internal combustion engine 100. IM roller shafts 418 and IM roller shaft bearings 420 can be included to couple each paired first primary member component 402 and second primary member component 404 to an IM roller 328, and thereby couple the motion of the primary member components 402 and 404 (which can move at least in part based on combustion of fuel in the combustion chambers partially defined by attached pistons 410 and 412) to that of the intermediate member sub-assembly 300 (and thereby to the crank sub-assembly 200).

Figure 26:
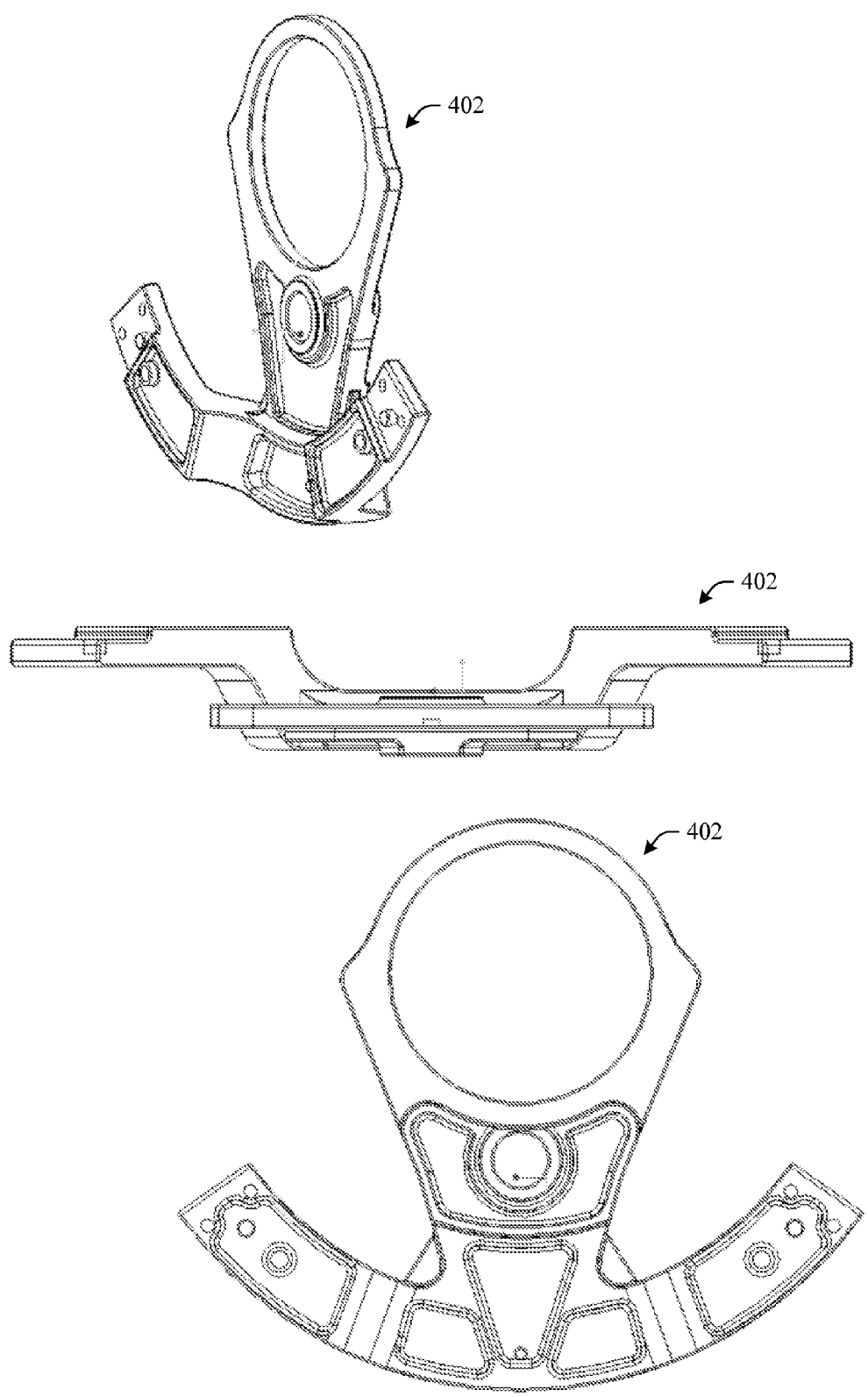
FIG. 26 illustrates perspective, top, and back views of a first primary member component in accordance with aspects of the subject innovation.
Figure 27:
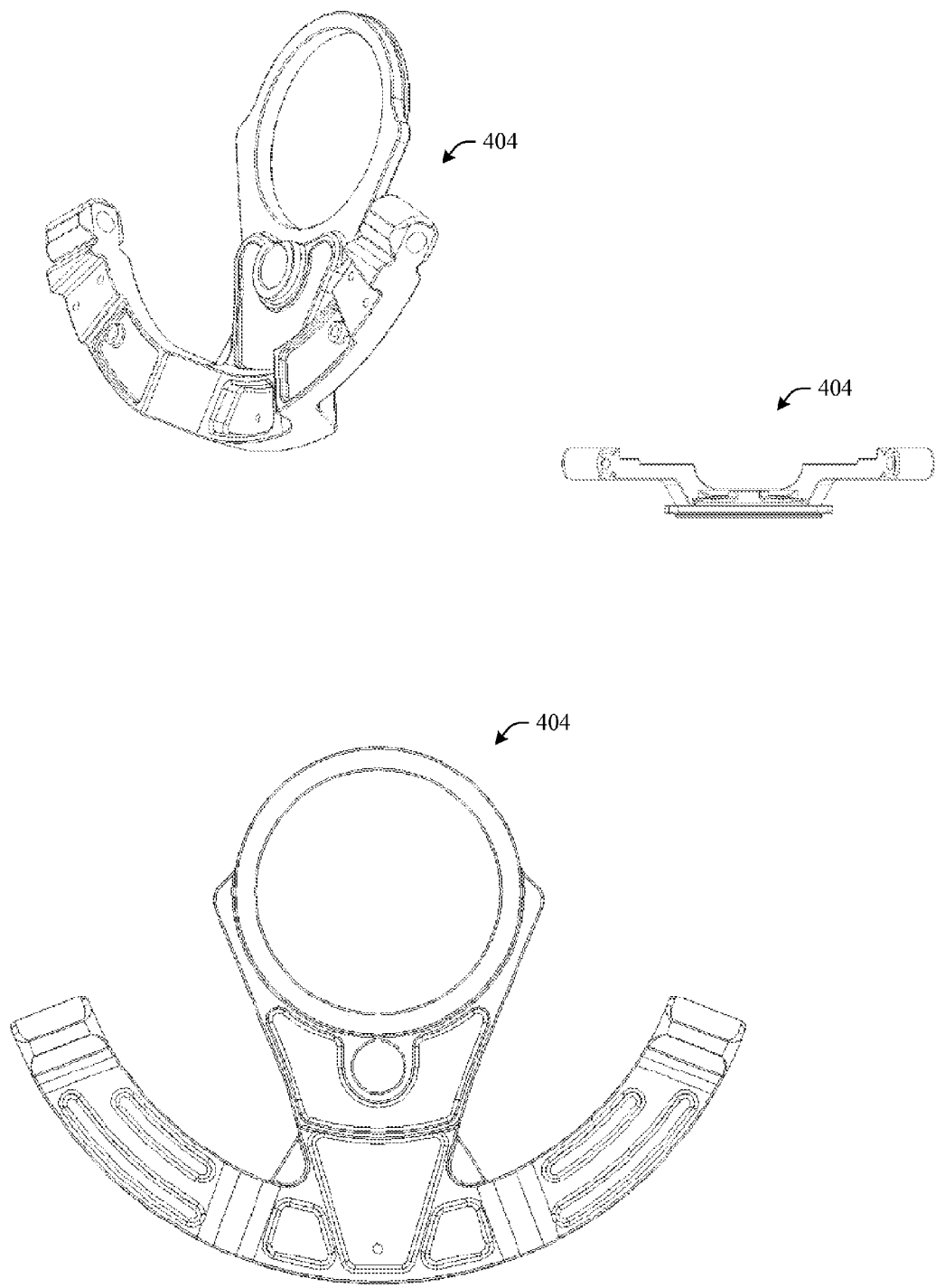
FIG. 27 illustrates a perspective, top, and front view of a second primary member component in accordance with aspects of the subject innovation.
Figure 29:
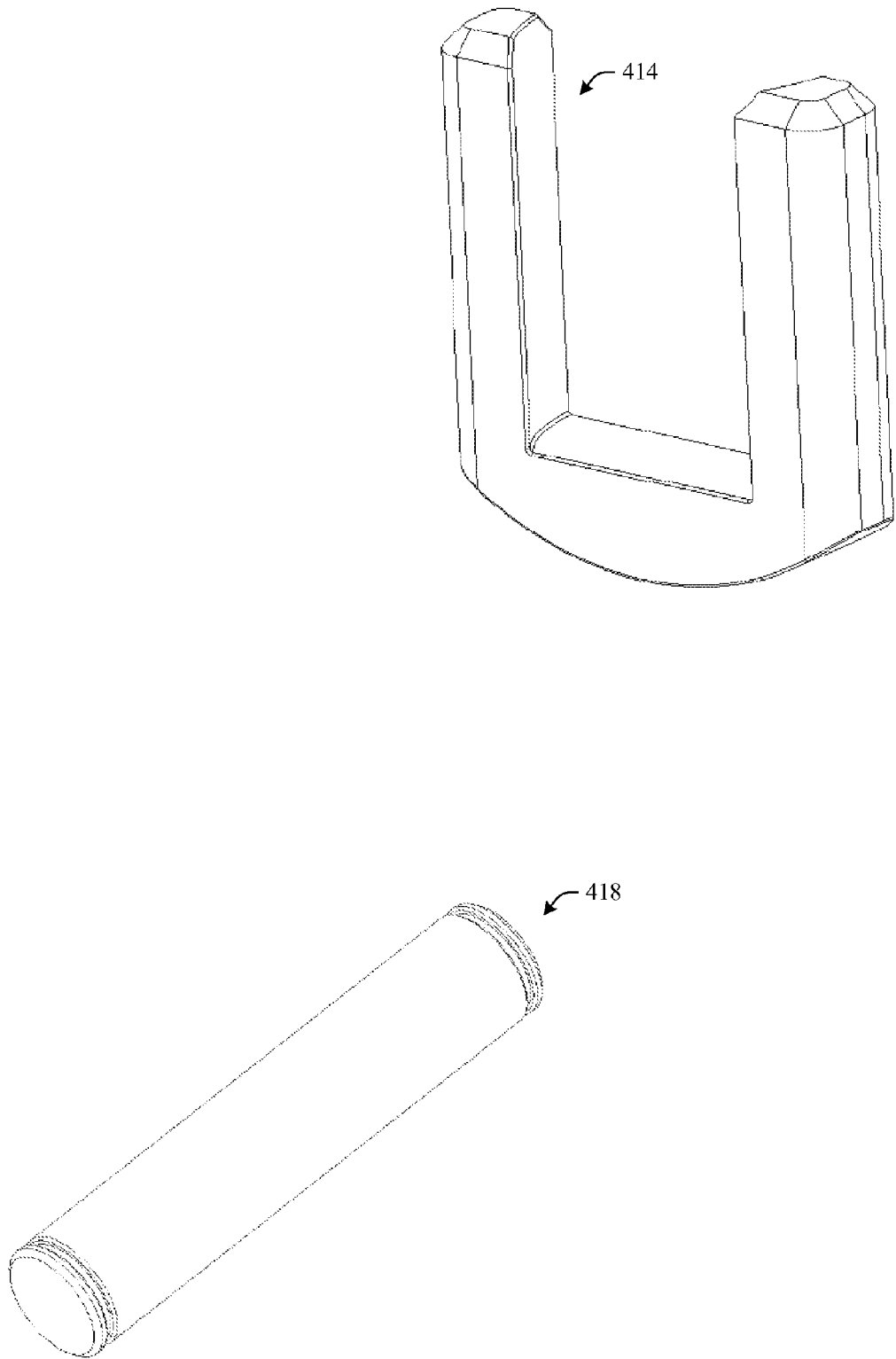
FIG. 29 illustrates perspective views of a piston insert and an intermediate member roller shaft in accordance with aspects of the subject innovation.
Figure 30:
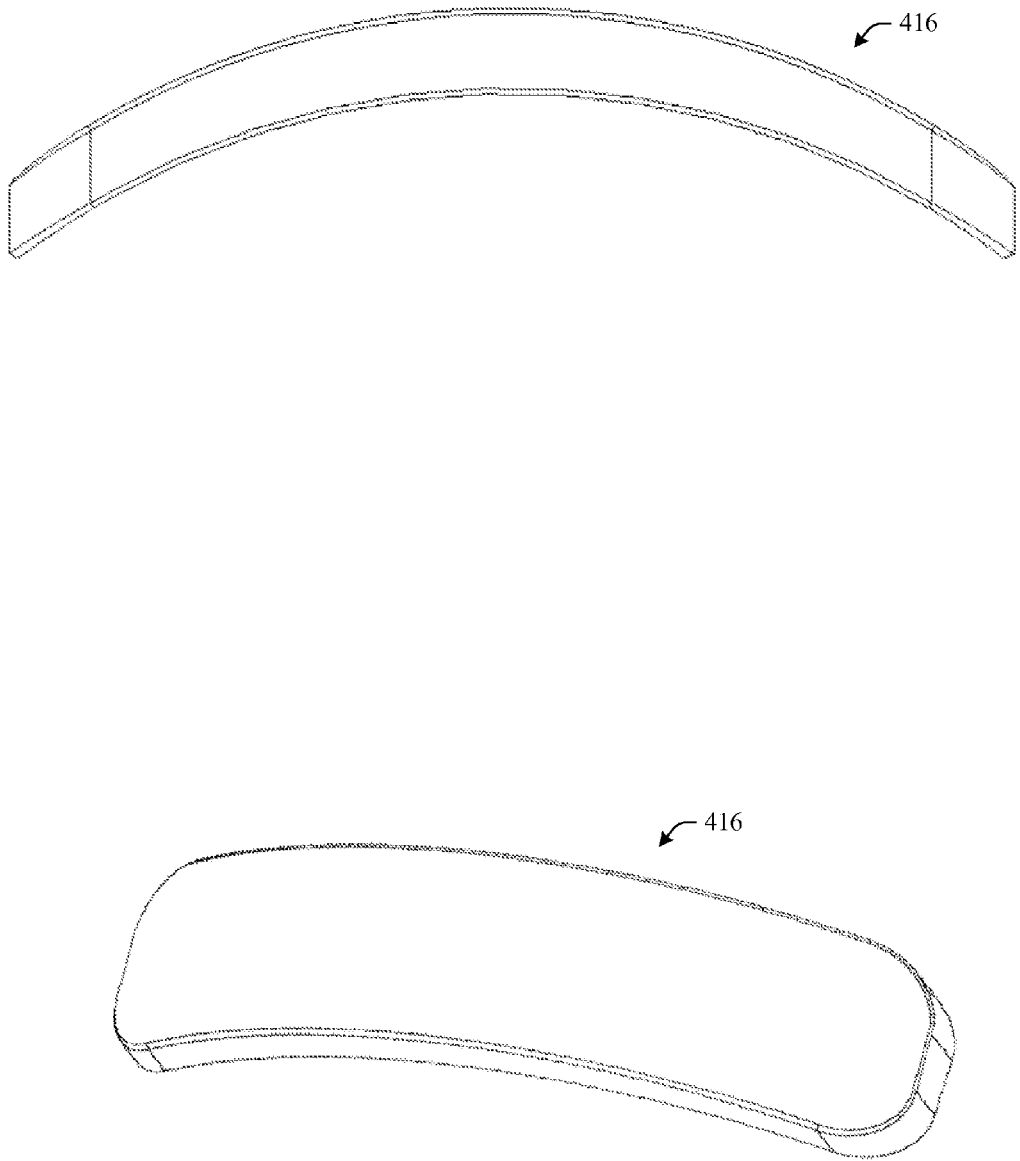
FIG. 30 illustrates side and perspective views of a piston insert cap in accordance with aspects of the subject innovation.
Figure 31:
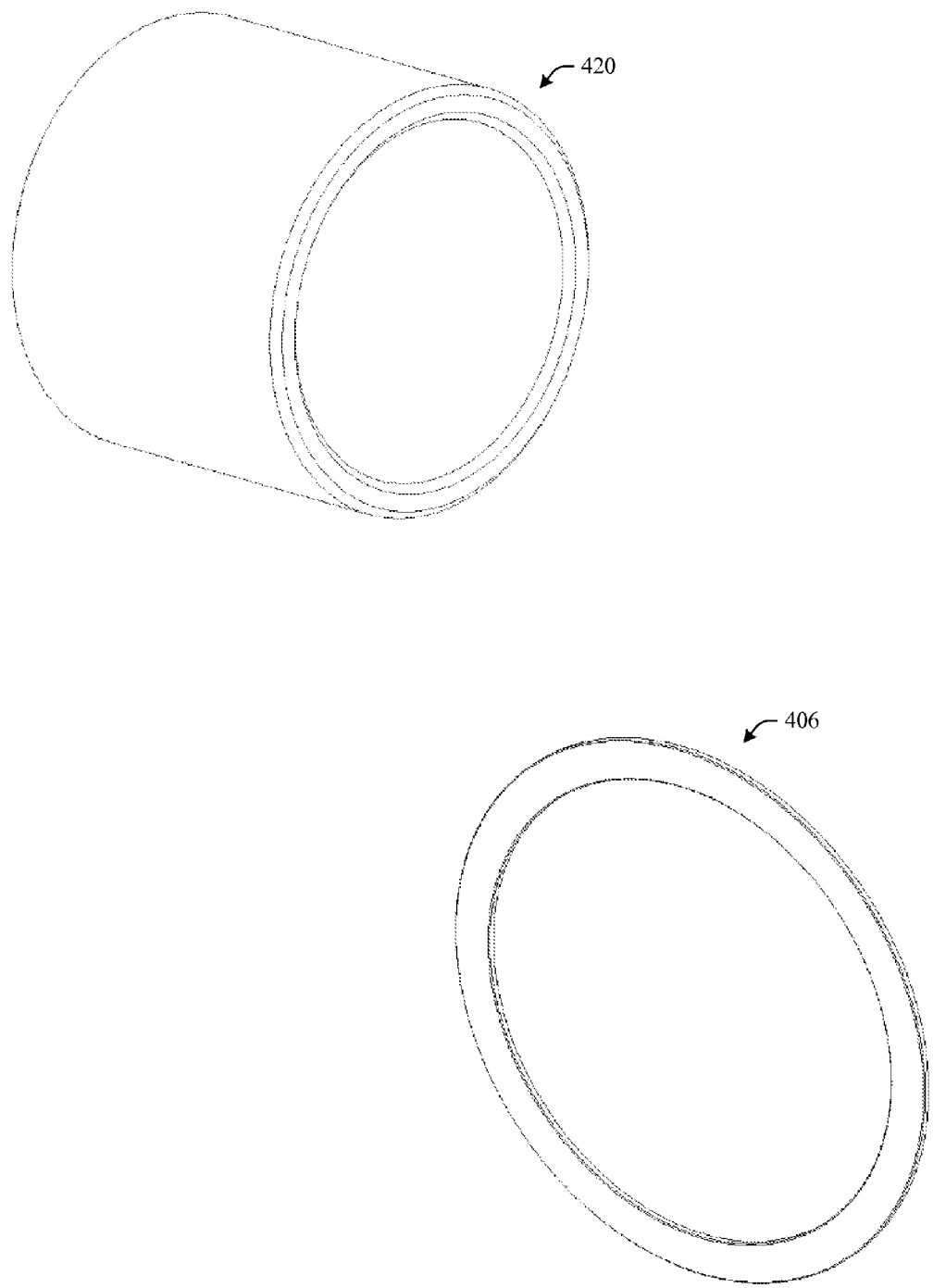
FIG. 31 illustrates perspective views of an IM roller shaft bearing and primary member washer in accordance with aspects of the subject innovation.

FIGS. 26-31 show various components that can be included in or associated with a primary member sub-assembly 400 in accordance with aspects of the subject innovation. FIG. 26 illustrates perspective, top, and back views of a first primary member component 402 in accordance with aspects of the subject innovation. FIG. 27 illustrates a perspective, top, and front view of a second primary member component 404 in accordance with aspects of the subject innovation. FIG. 28 illustrates a perspective view of a first piston 410 and a side view of a second piston 412 in accordance with aspects of the subject innovation. In aspects, pistons of the subject innovation can be made of a material such as ceramic to provide for reduced friction. Additionally, as shown in FIG. 2 (but not visible in the views of FIG. 25 or 28), the ends of first piston 410 and second piston 412 can include contours or features that can create vortices in the combustion chambers which they partially define, providing for improved mixing of fuel and air, and thus more efficient combustion of fuel. FIG. 29 illustrates perspective views of a piston insert 414 and an intermediate member roller shaft 418 in accordance with aspects of the subject innovation. FIG. 30 illustrates side and perspective views of a piston insert cap 416 in accordance with aspects of the subject innovation. FIG. 31 illustrates perspective views of an IM roller shaft bearing 420 and primary member washer 406 in accordance with aspects of the subject innovation.

Figure 32:
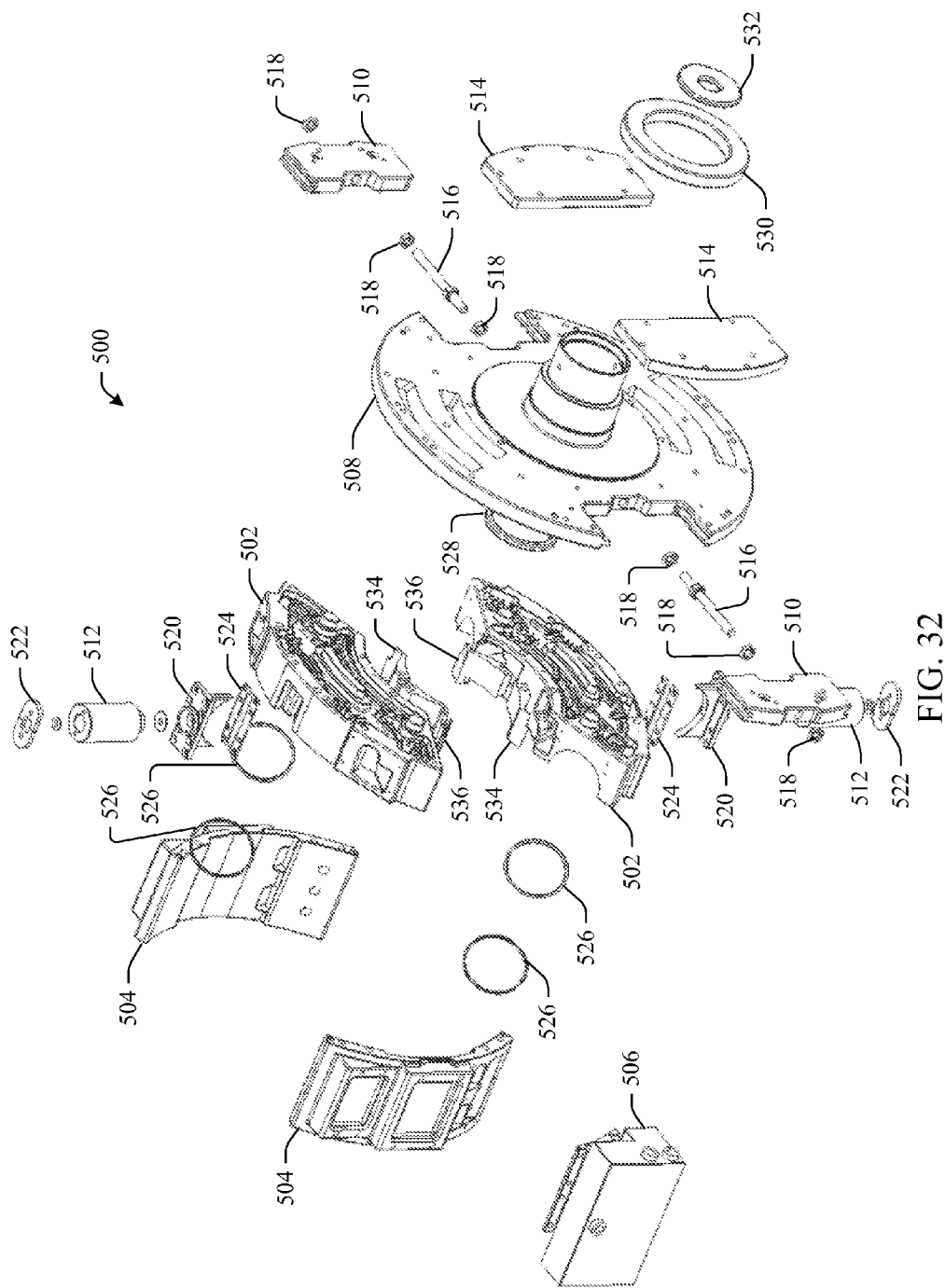
FIG. 32 illustrates an exploded view of an example bottom plate sub-assembly in accordance with aspects of the subject innovation.
Figure 33:
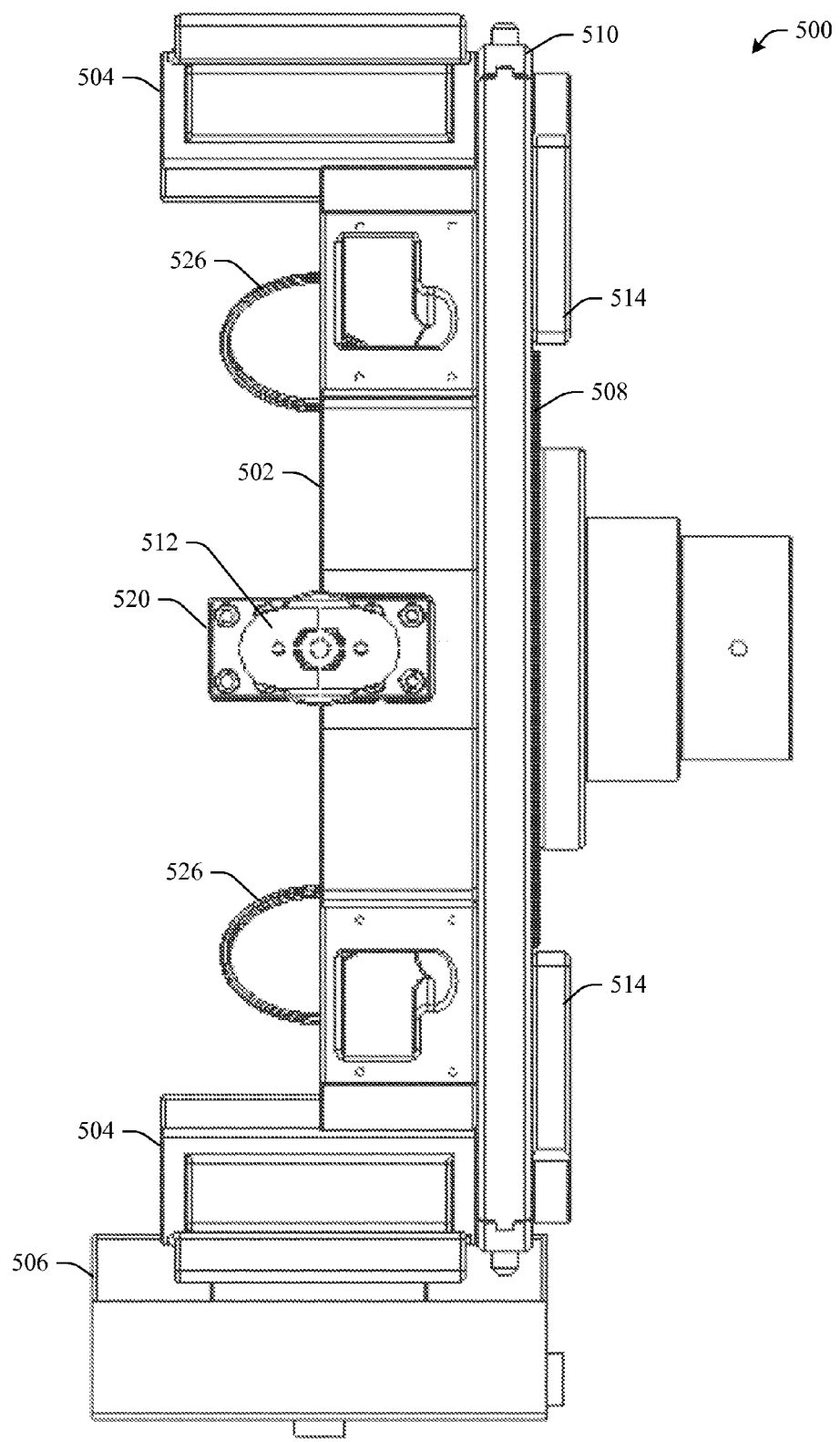
FIG. 33 is a top view of an example bottom plate sub-assembly in accordance with aspects of the subject innovation.
Figure 34:
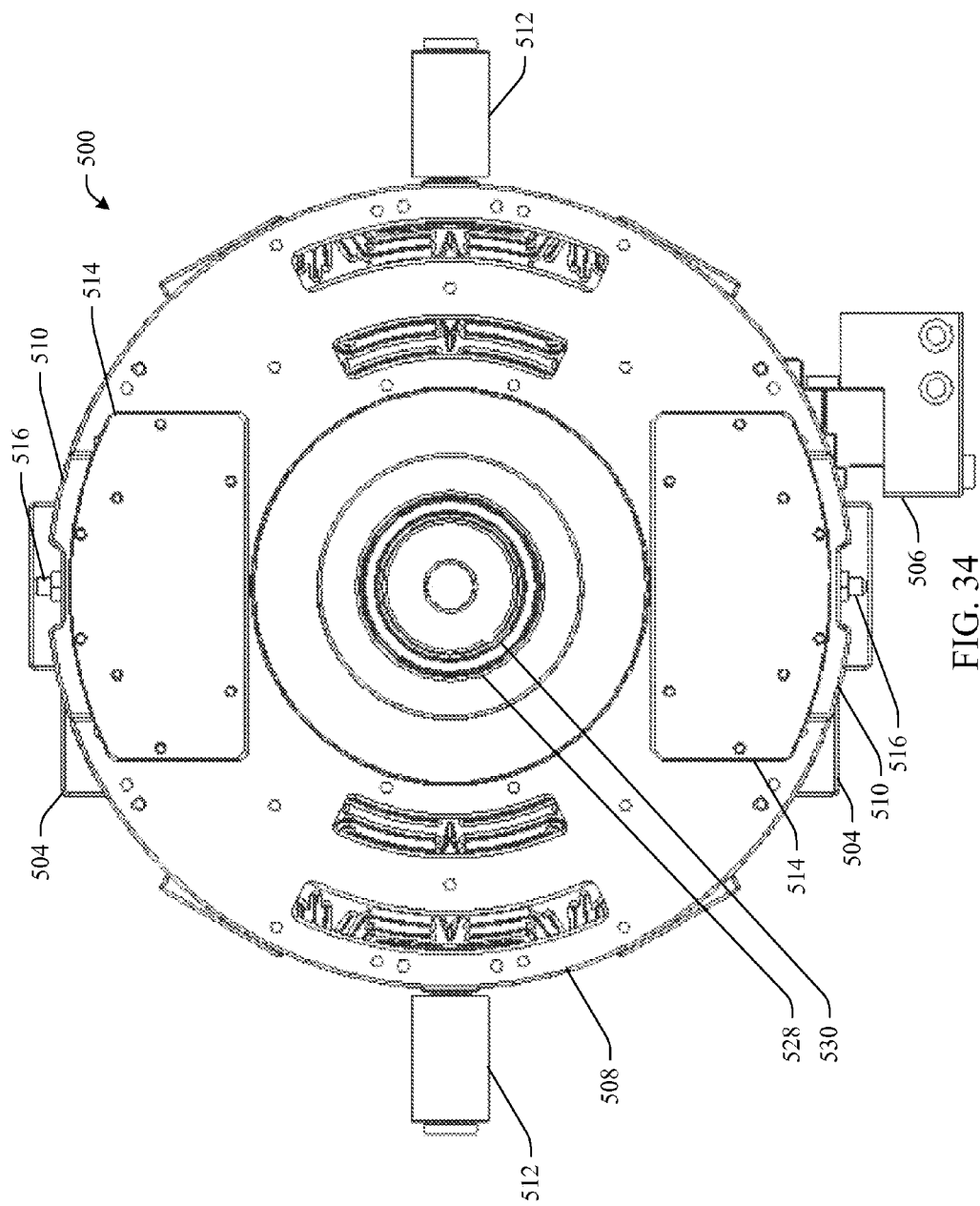
FIG. 34 is a back view of an example bottom plate sub-assembly in accordance with aspects of the subject innovation.

Turning to FIG. 32, illustrated is an exploded view of an example bottom plate sub-assembly 500 in accordance with aspects of the subject innovation. Bottom plate sub-assembly 500 can include bottom cylinder liners 502, which can partially define the combustion chambers of internal combustion engine 100, side plates 504, and a fluid reservoir 506, that can store oil used in connection with internal combustion engine 100. Each bottom cylinder liner 502 can be associated with a first cylinder liner insert 534 and a second cylinder liner insert 536, coupled to a first bottom plate 508, which can be connected to second bottom plates 510, which can be coupled via bottom plate covers 514 and adjustment rods 516 and adjustment rod nuts 518. Injection adapters 512 can provide fuel for the combustion chambers, and can be connected via injector inserts 520 and injector plates 522, with injector gaskets 524 providing seals. Bottom plate sub-assembly 500 can also include piston seals 526, which can be arranged as stationary elements in the combustion chambers, and can facilitate control of oil in cooperation with piston extensions 408, as piston extensions 408 slide past piston seals 526. Additionally, bottom plate sub-assembly 500 can include first bottom plate seal 528, second bottom plate seal 530, and washer 532. The first crankshaft 202 of crank sub-assembly 200 can pass through the opening in the first bottom plate 508 to couple with back-end sub-assembly 800 as described herein. FIG. 33 is a top view of example bottom plate sub-assembly 500 in accordance with aspects of the subject innovation. FIG. 34 is a back view of example bottom plate sub-assembly 500 in accordance with aspects of the subject innovation.

Figure 35:
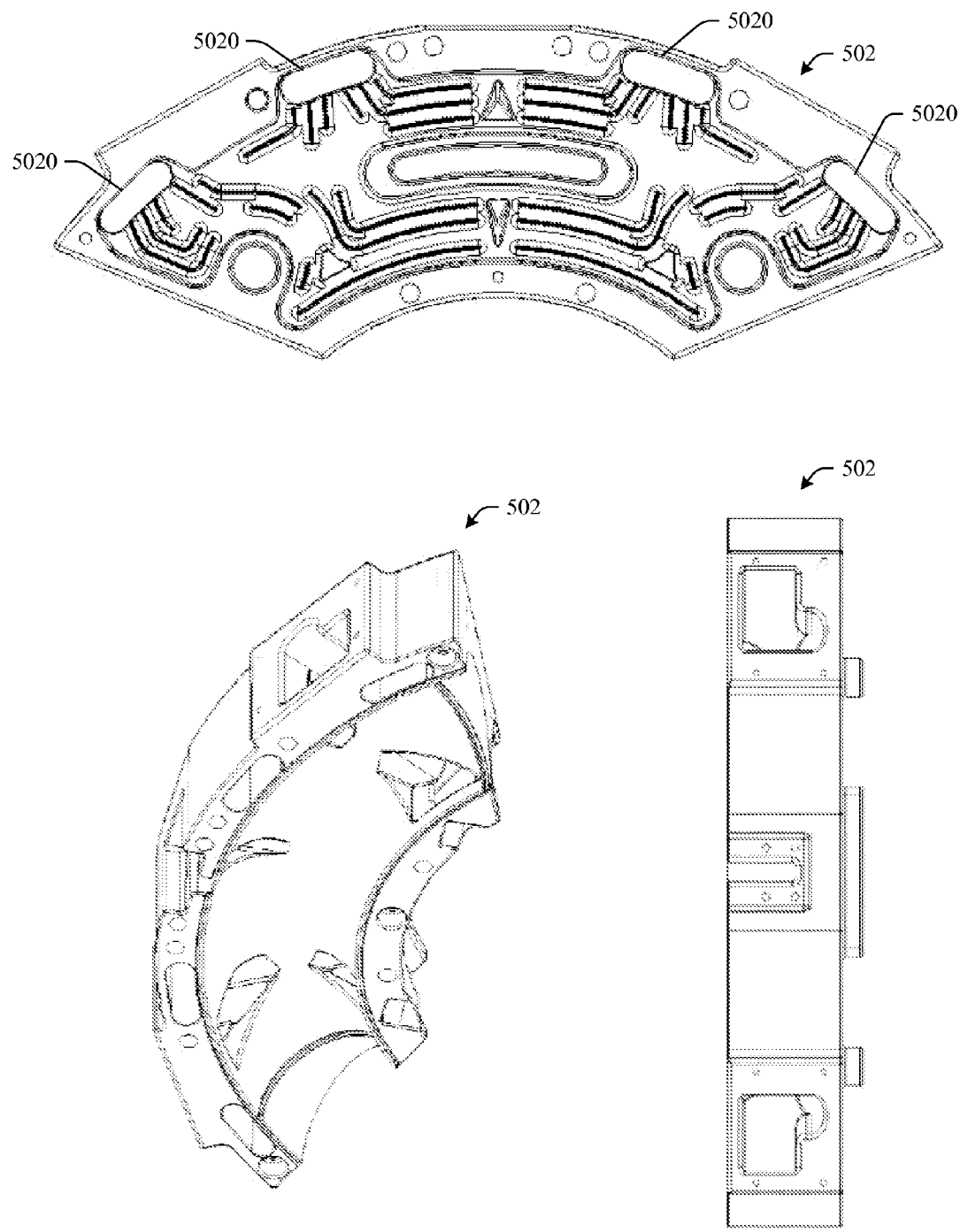
FIG. 35 shows back, perspective, and side views of a bottom cylinder liner in accordance with aspects of the subject innovation.
Figure 36:
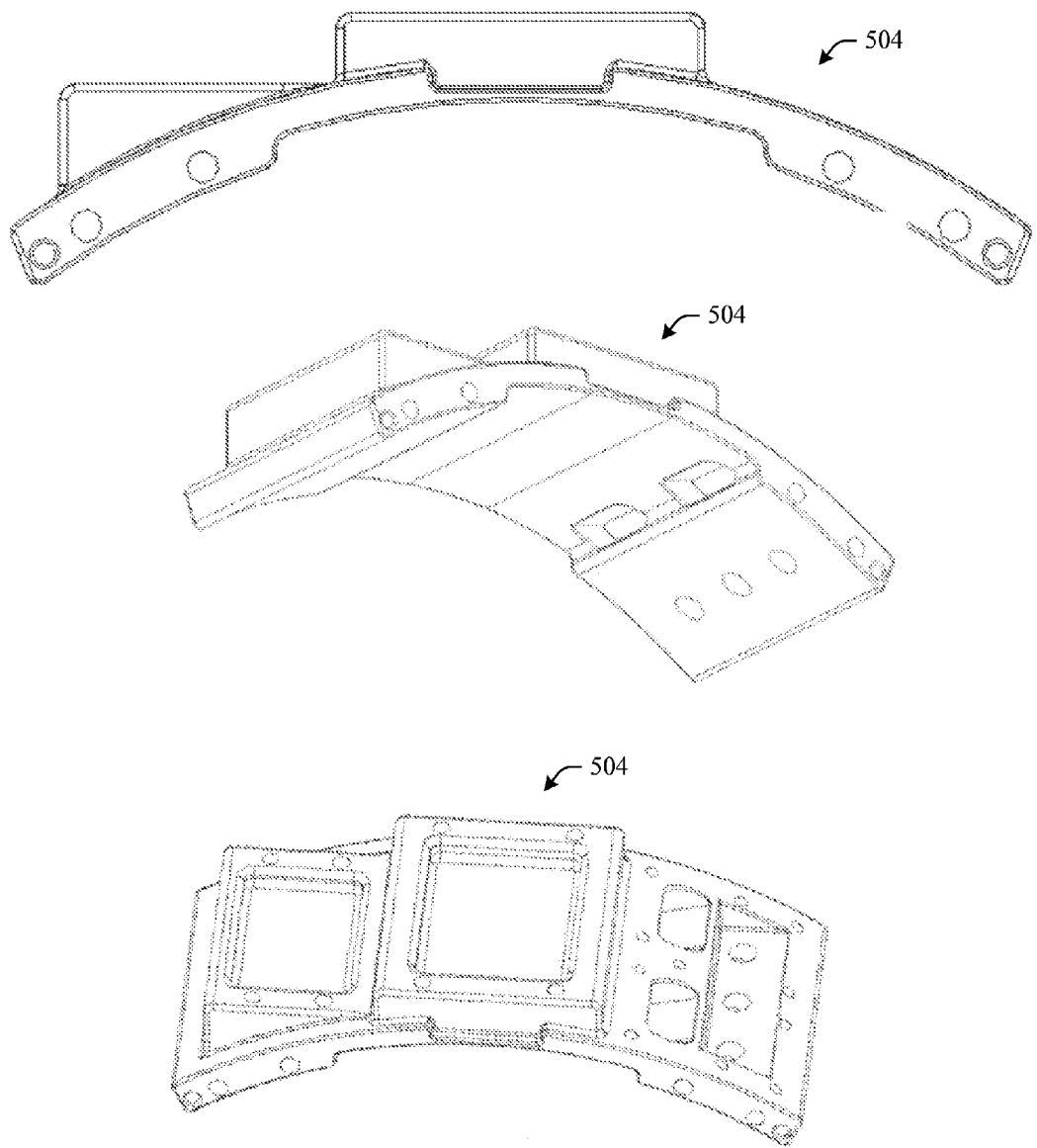
FIG. 36 shows side, back perspective, and front perspective views of a side plate in accordance with aspects of the subject innovation.
Figure 39:
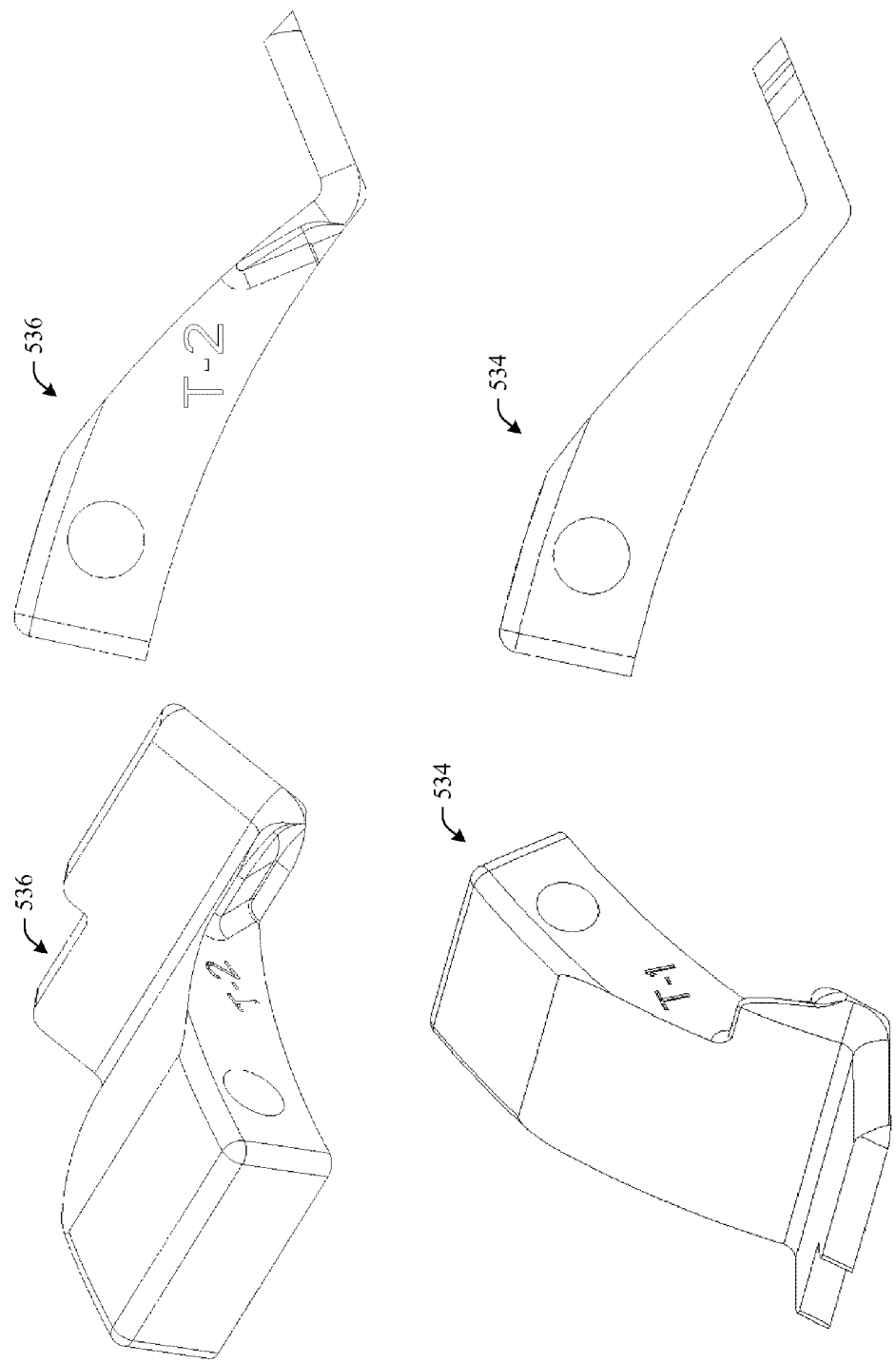
FIG. 39 illustrates perspective and side views of a first cylinder liner insert and a second cylinder liner insert in accordance with aspects of the subject innovation.
Figure 40:
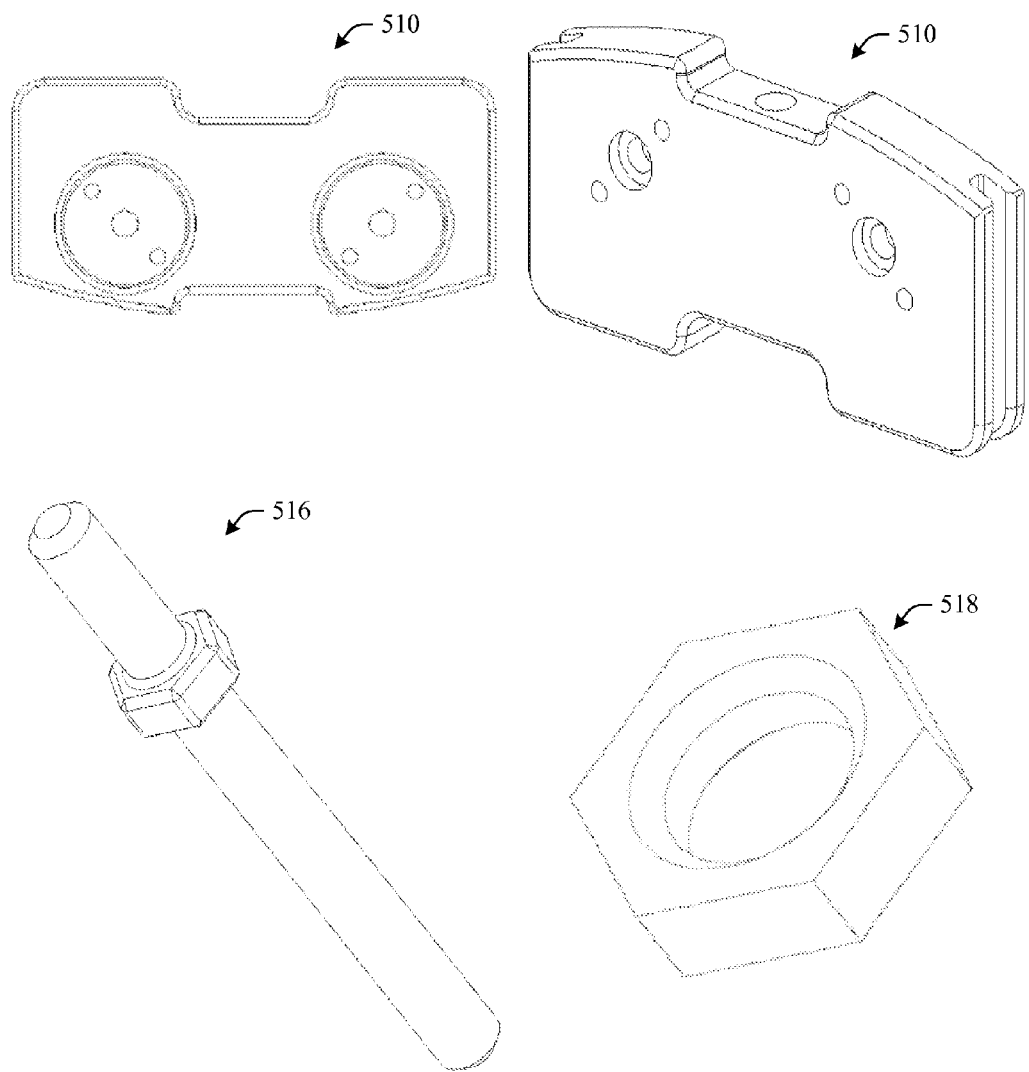
FIG. 40 illustrates front and perspective views of a second bottom plate, and perspective views of an associated adjustment rod and adjustment rod nut, in accordance with aspects of the subject innovation.
Figure 41:
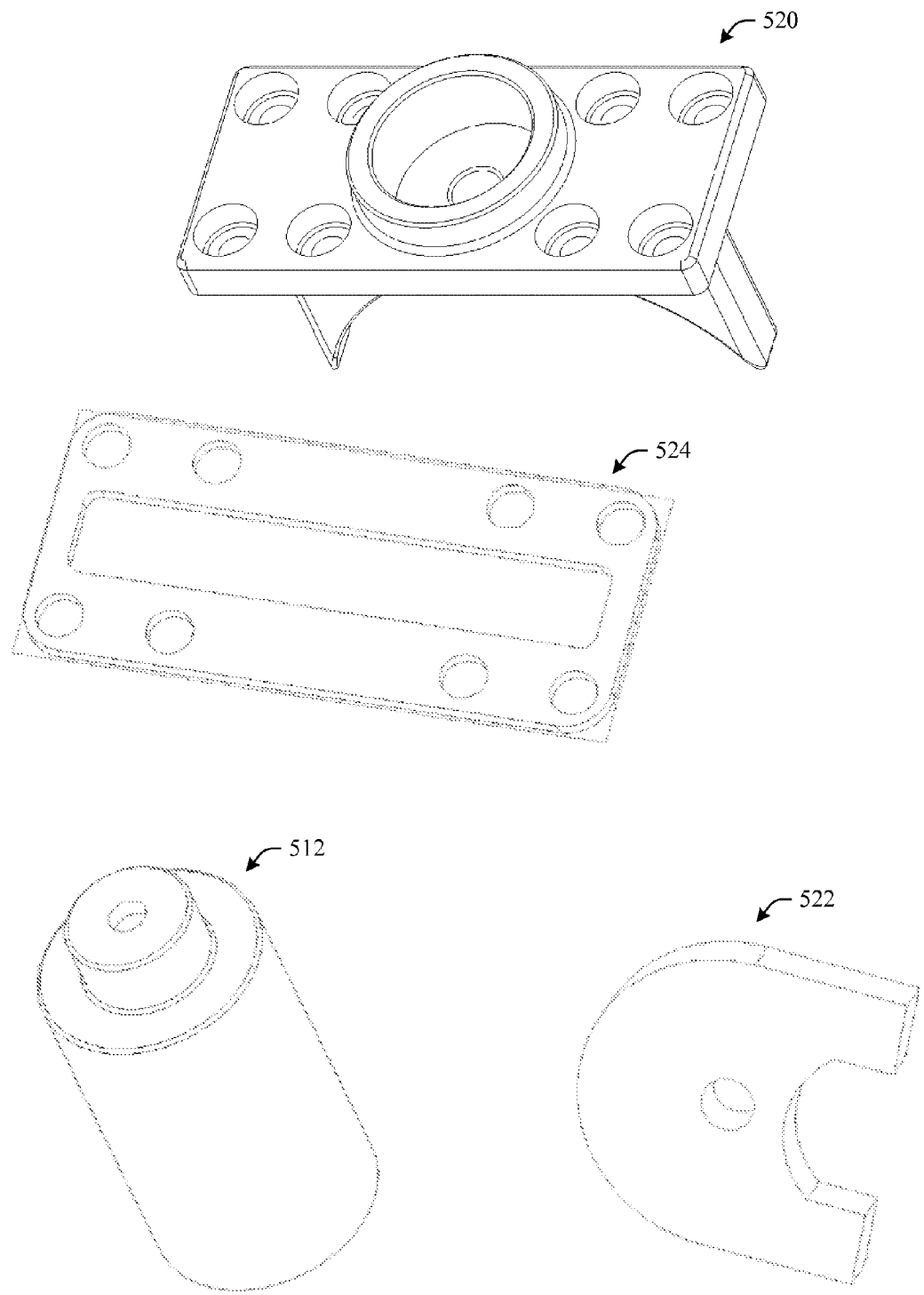
FIG. 41 illustrates perspective views of an injector insert, an injector gasket, an injection adapter, and an injector plate in accordance with aspects of the subject innovation.
Figure 42:
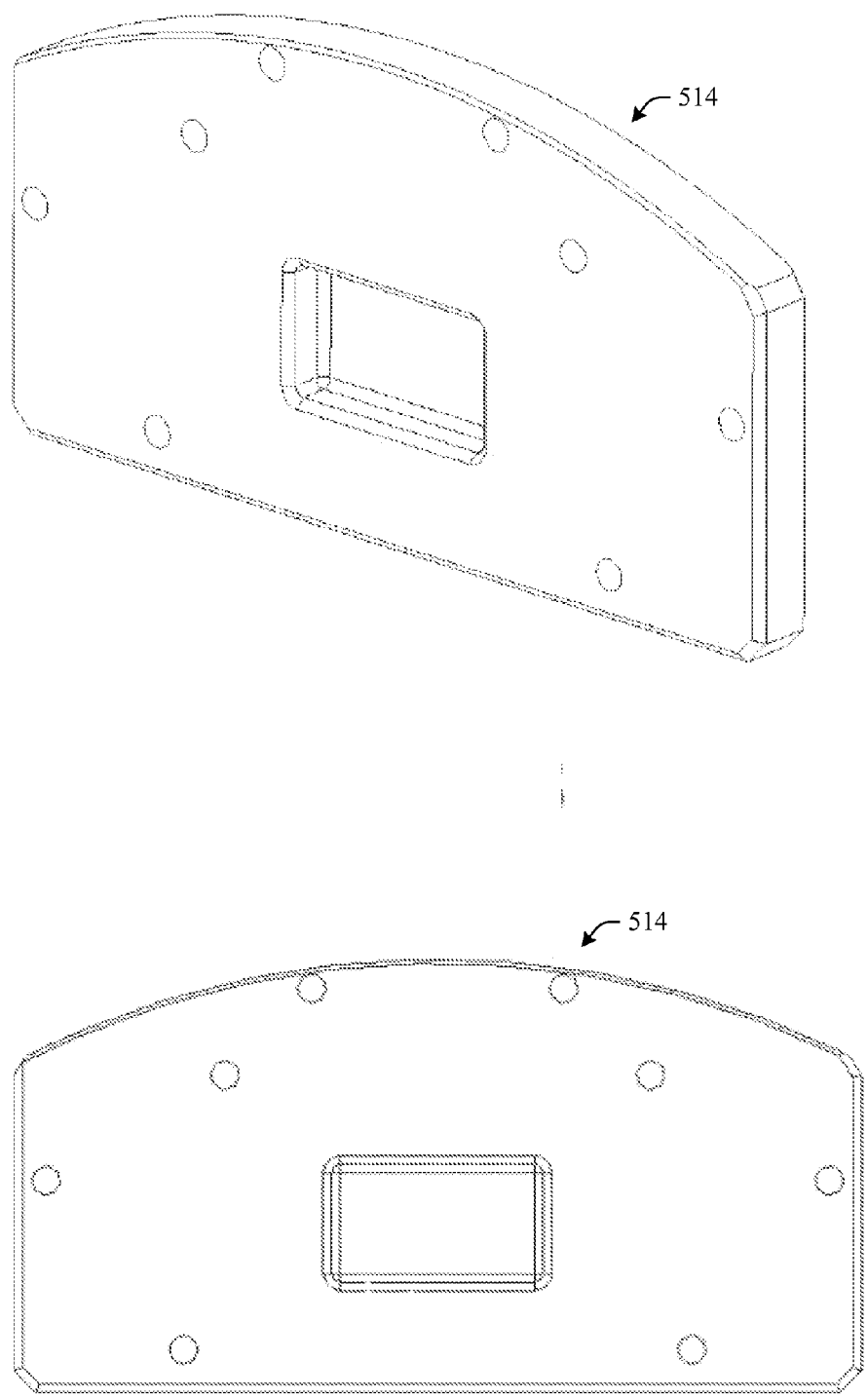
FIG. 42 illustrates perspective and front views of a bottom plate cover in accordance with aspects of the subject innovation.
Figure 43:
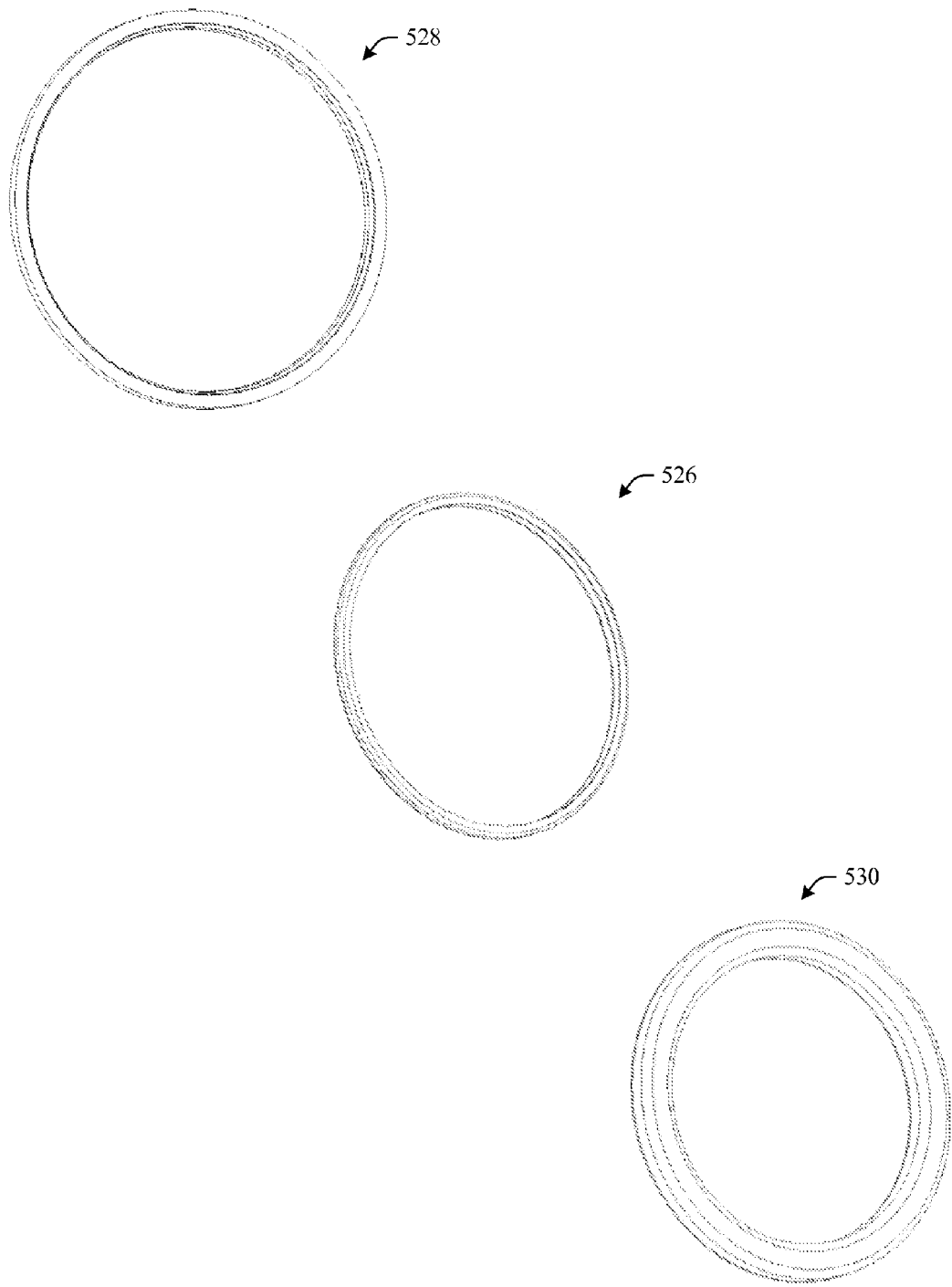
FIG. 43 illustrates perspective views of first and second bottom plate seals and a piston seal in accordance with aspects of the subject innovation.

FIGS. 35-43 illustrate various components that can be included in or associated with a bottom plate sub-assembly 500 in accordance with aspects of the subject innovation. FIG. 35 shows back, perspective, and side views of a bottom cylinder liner 502 in accordance with aspects of the subject innovation. As seen in the back view, in some embodiments bottom cylinder liner 502 (and top cylinder liner 602 see FIG. 44) can include contours (e.g., cooling channels 5020, 6020, raised features, etc.) that can provide for more efficient cooling via increased surface area and heat transfer to a flowing fluid (e.g., air, oil, water, etc.) in various embodiments; such features also are visible on other components (e.g., top plate, etc.). Heat can thereby be transferred away from the combustion chambers partially defined by bottom cylinder liner 502 (and top cylinder liner 602) more efficiently. FIG. 36 shows side, back perspective, and front perspective views of a side plate 504 in accordance with aspects of the subject innovation. FIG. 37 illustrates side and perspective views of a fluid reservoir 506 in accordance with aspects of the subject innovation. FIG. 38 illustrates perspective and front views of a first bottom plate 508 in accordance with aspects of the subject innovation. FIG. 39 illustrates perspective and side views of a first cylinder liner insert and a second cylinder liner insert in accordance with aspects of the subject innovation. FIG. 40 illustrates front and perspective views of a second bottom plate 510, and perspective views of an associated adjustment rod 516 and adjustment rod nut 518, in accordance with aspects of the subject innovation. FIG. 41 illustrates perspective views of an injector insert 520, an injector gasket 524, an injection adapter 512, and an injector plate 522 in accordance with aspects of the subject innovation. FIG. 42 illustrates perspective and front views of a bottom plate cover 514 in accordance with aspects of the subject innovation. FIG. 43 illustrates perspective views of first and second bottom plate seals 528 and 530 and a piston seal 526 in accordance with aspects of the subject innovation.

Figure 44:
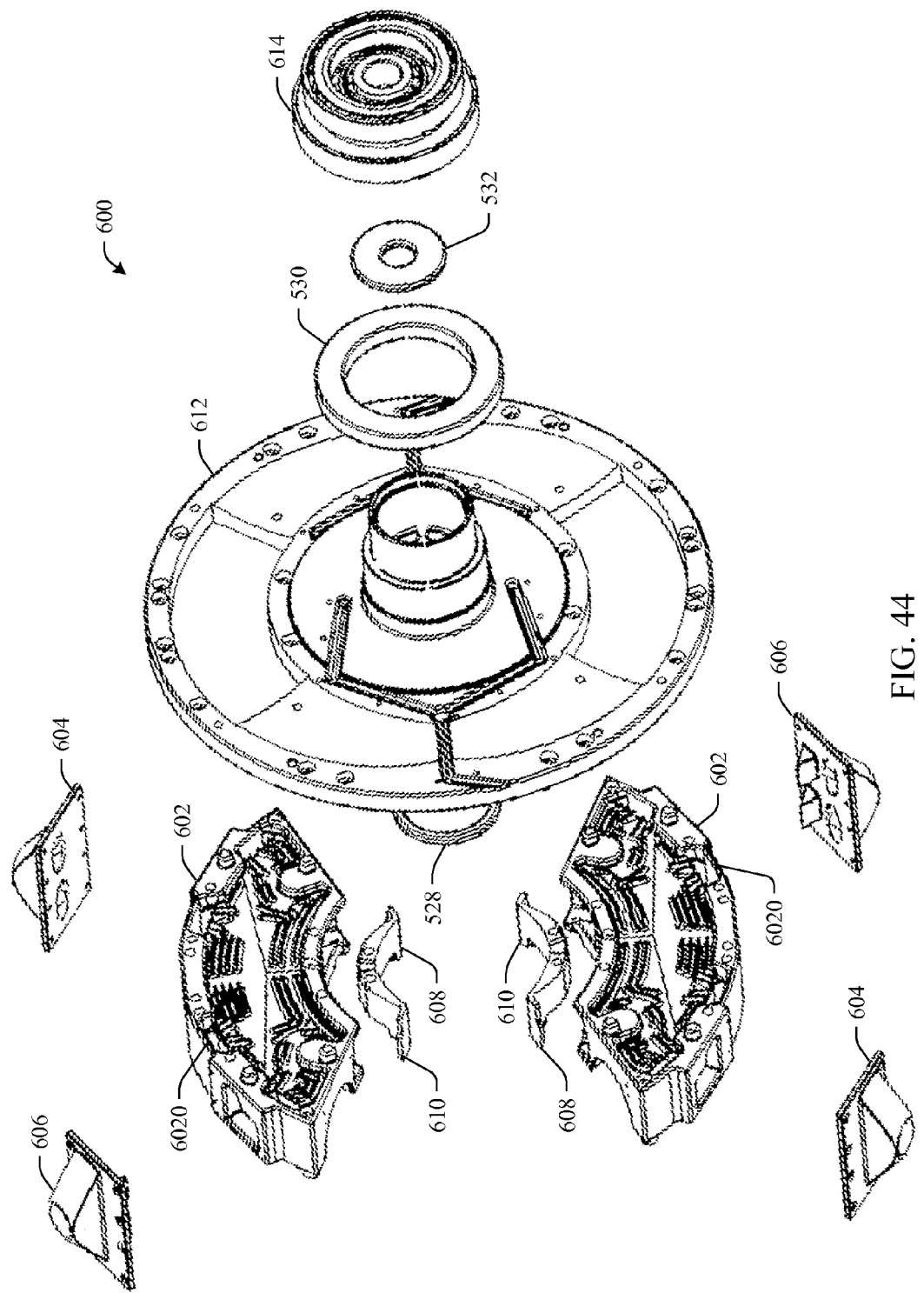
FIG. 44 illustrates an exploded view of an example top plate sub-assembly in accordance with aspects of the subject innovation.
Figure 45:
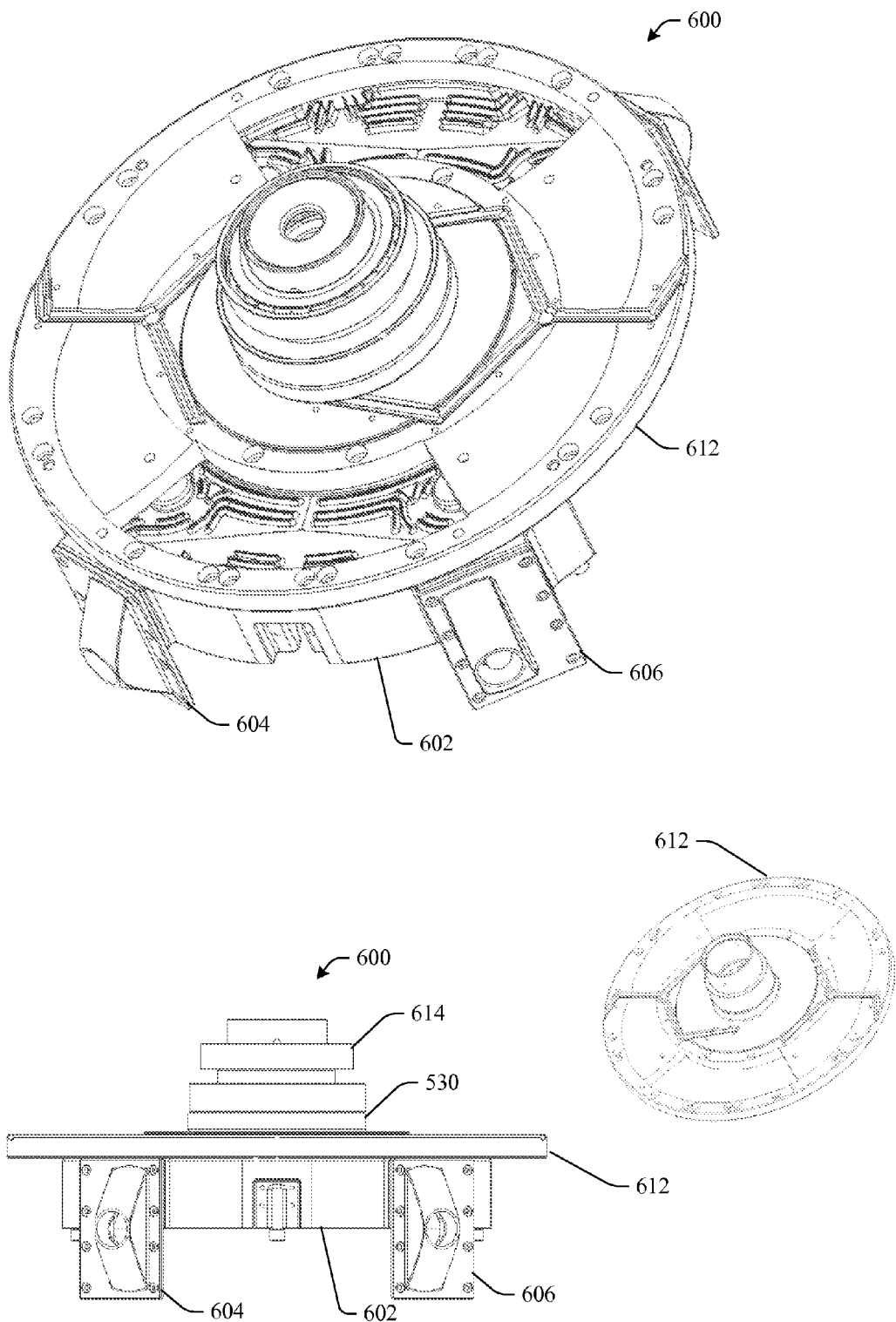
FIG. 45 illustrates perspective and side views of a top plate sub-assembly, and a perspective view of a top plate in accordance with aspects of the subject innovation.
Figure 46:
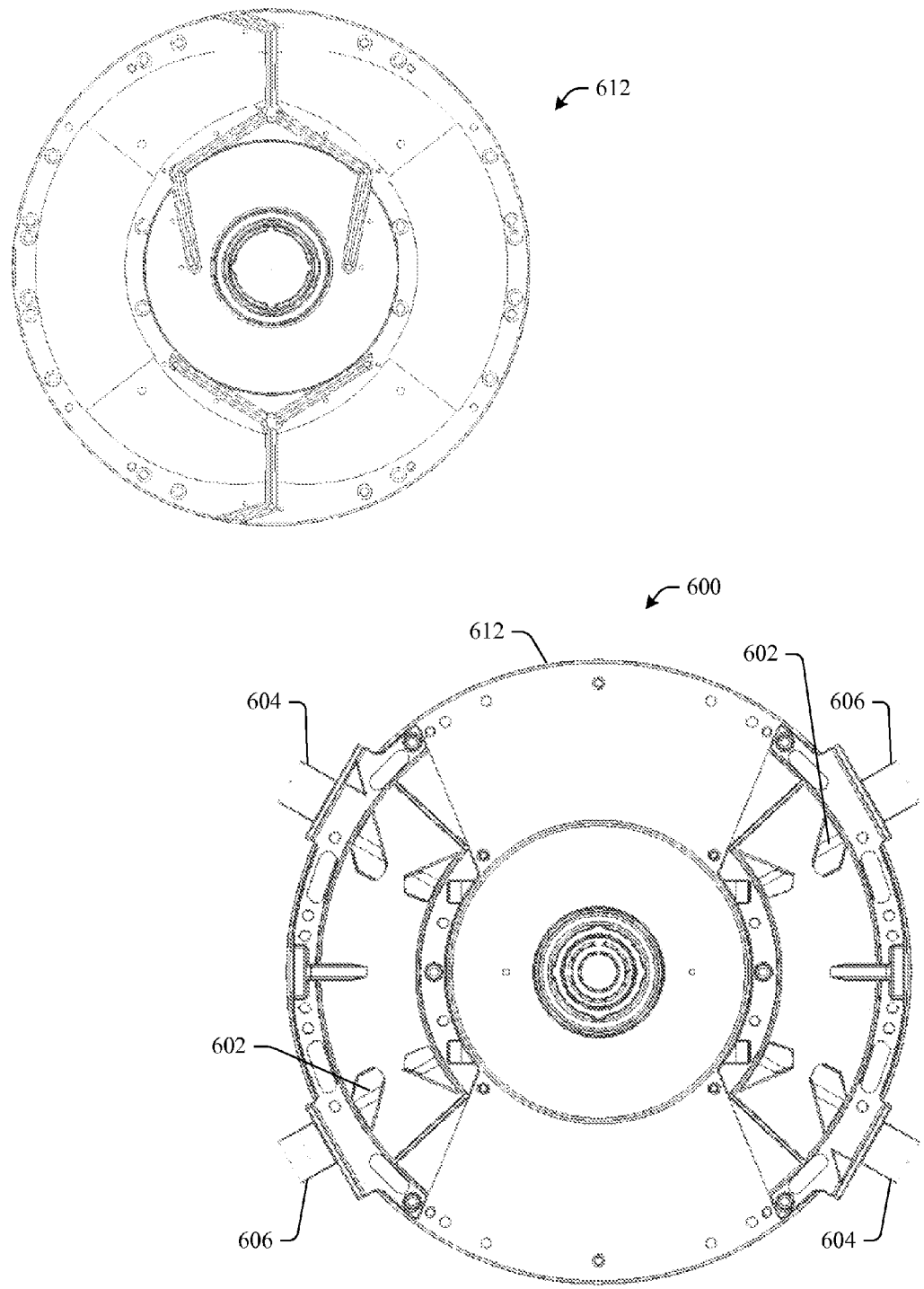
FIG. 46 illustrates front views of a top plate and a top plate sub-assembly in accordance with aspects of the subject innovation.

FIG. 44 illustrates an exploded view of an example top plate sub-assembly 600 in accordance with aspects of the subject innovation. Top-plate sub-assembly can include top cylinder liners 602, which can be associated with intake manifolds 604 and exhaust manifolds 606, which can supply air to the combustion chamber and collect exhaust from the combustion chamber, respectively. Top cylinder liners 602 can be associated with third cylinder liner inserts 608 and fourth cylinder liner inserts 610, which can be similar to first cylinder liner insert 534 and second cylinder liner insert 536. Top plate 612 can house the top cylinder liners 602, and can be associated with a first bottom plate seal 528 a second bottom plate seal 530, and a washer 532, which can be substantially as described above in connection with bottom plate sub-assembly 500. Bearing cage 614 can house a pair of roller bearings for engaging front-end sub-assembly. FIG. 45 illustrates perspective and side views of a top plate sub-assembly, and a perspective view of a top plate in accordance with aspects of the subject innovation. FIG. 46 illustrates front views of a top plate and a top plate sub-assembly in accordance with aspects of the subject innovation.

Figure 47:
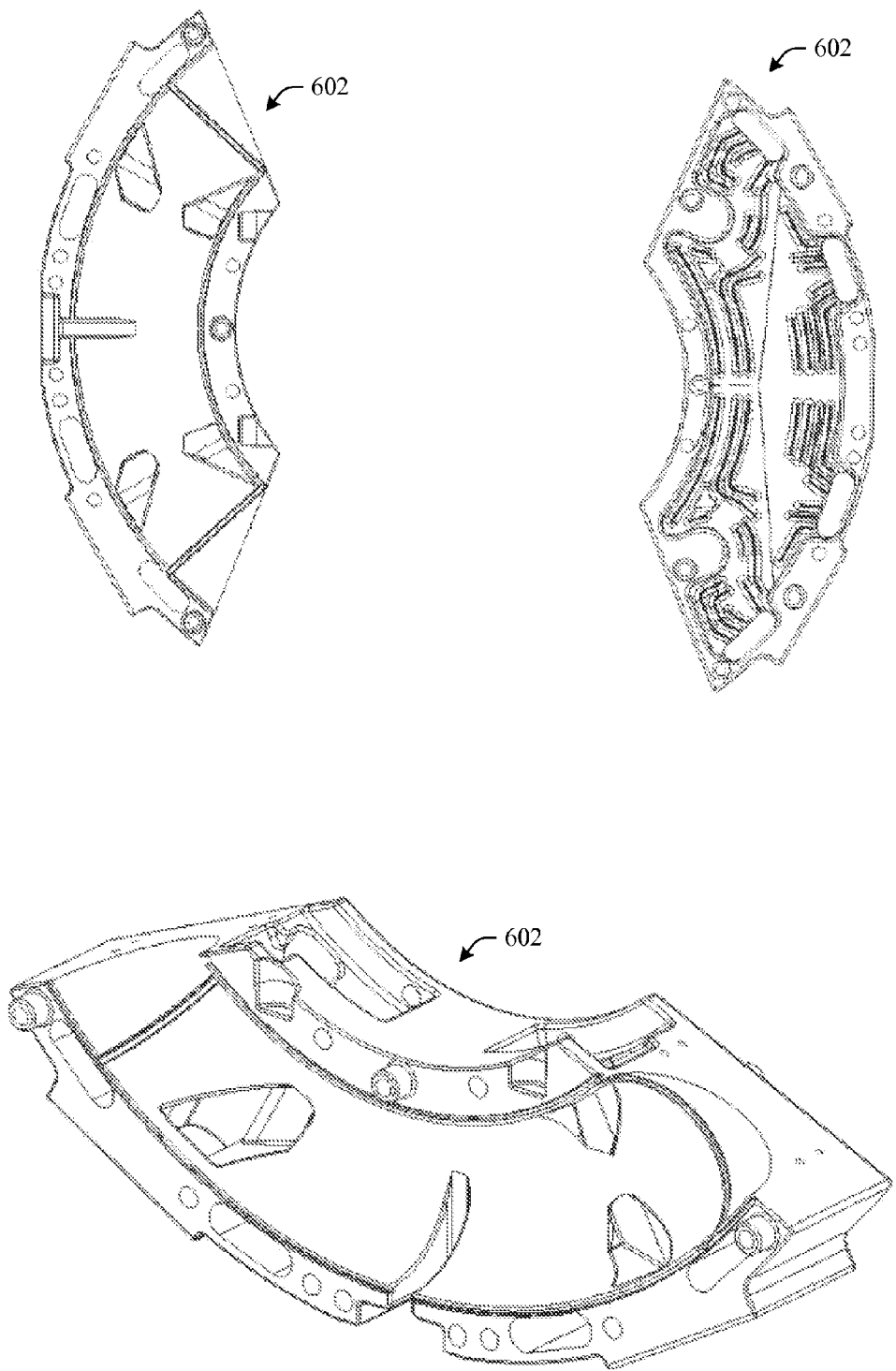
FIG. 47 illustrates front, back, and perspective views of a top cylinder liner in accordance with aspects of the subject innovation.
Figure 48:
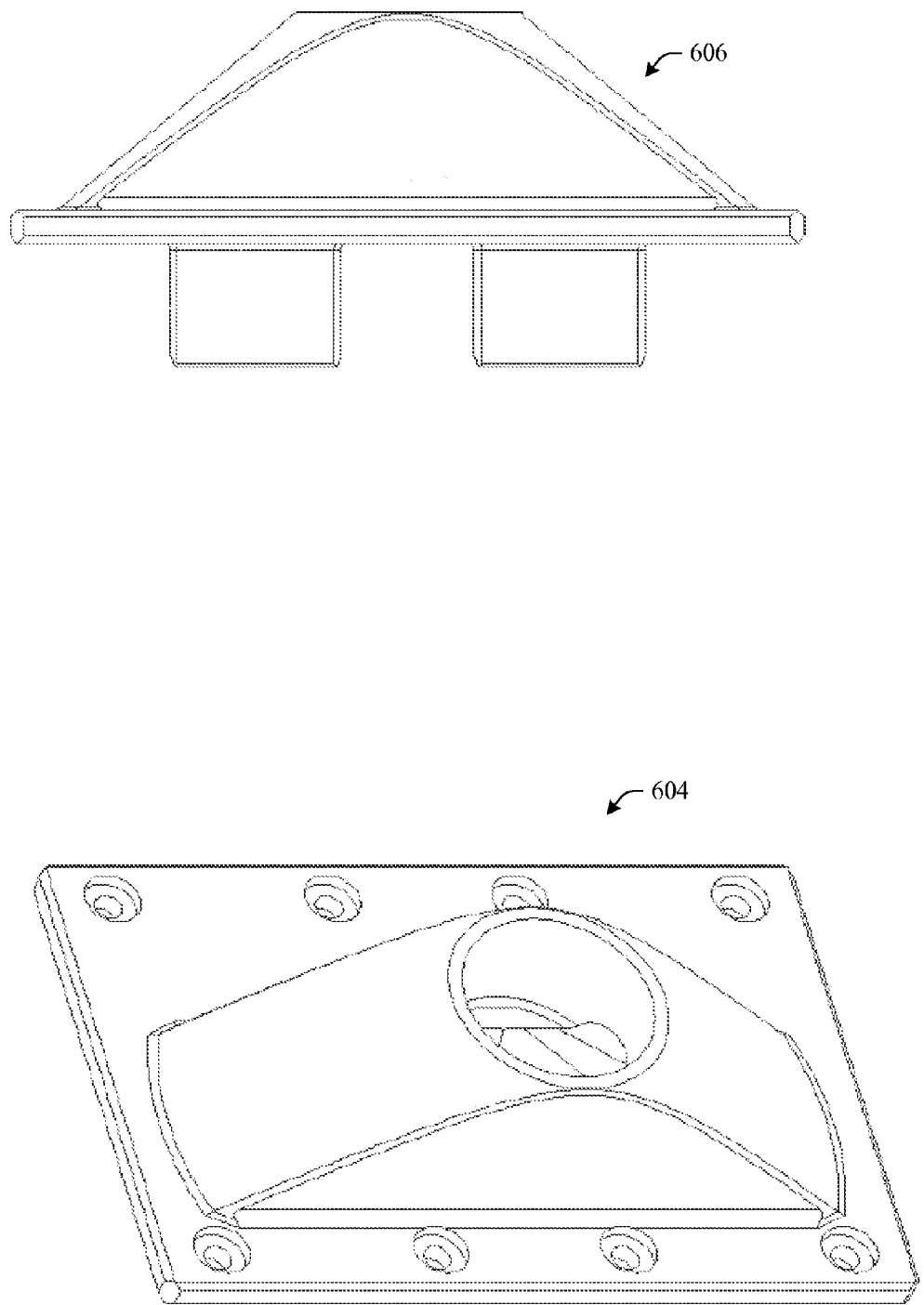
FIG. 48 illustrates a side view of an exhaust manifold and a perspective view of an intake manifold in accordance with aspects of the subject innovation.
Figure 49:
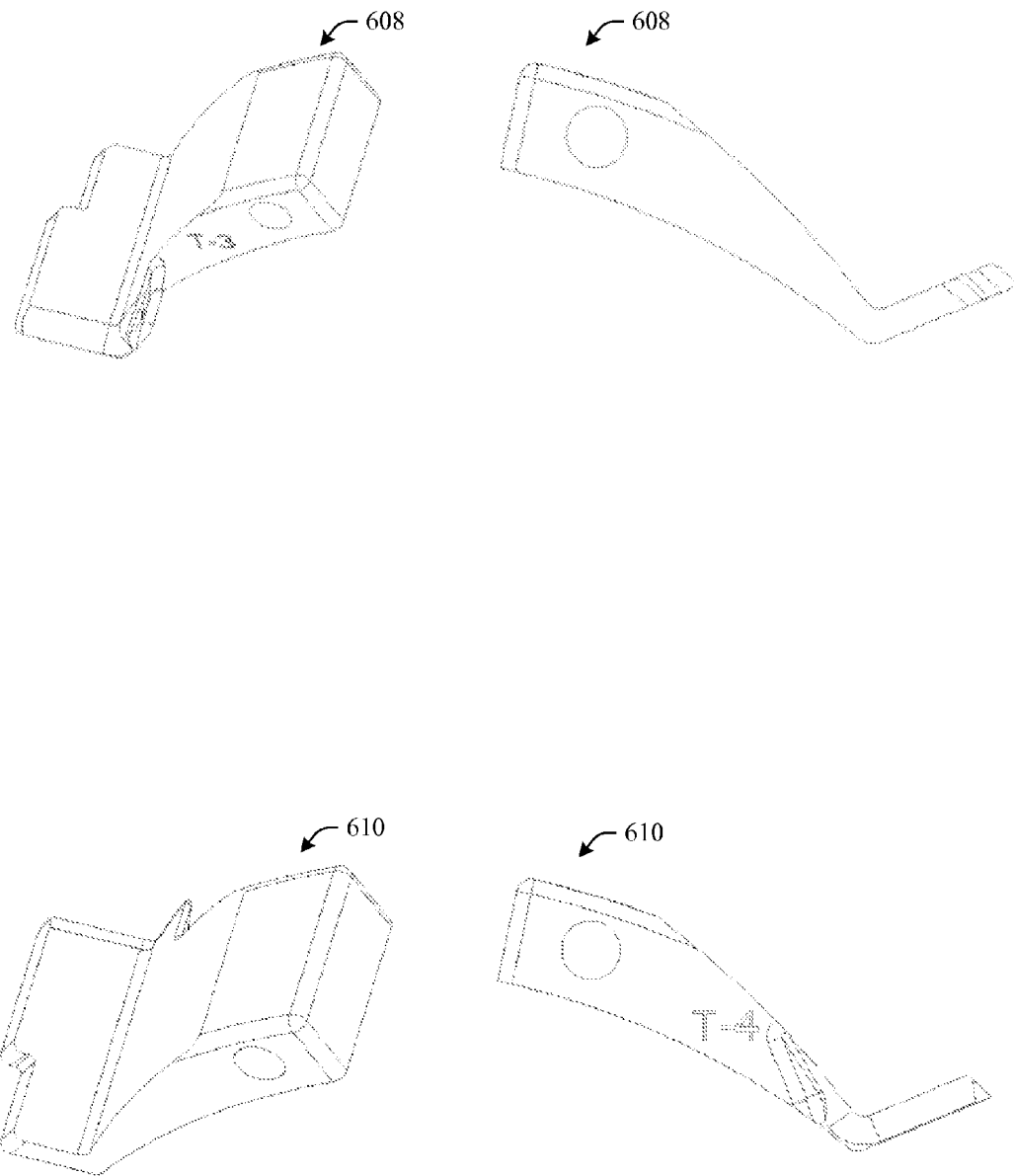
FIG. 49 illustrates perspective and side views of the third and fourth cylinder liner inserts in accordance with aspects of the subject innovation.

FIGS. 47-49 illustrate various components that can be included in or associated with a top plate sub-assembly 600 in accordance with aspects of the subject innovation. FIG. 47 illustrates front, back, and perspective views of a top cylinder liner 602 in accordance with aspects of the subject innovation. FIG. 48 illustrates a side view of an exhaust manifold 606 and a perspective view of an intake manifold 604 in accordance with aspects of the subject innovation. FIG. 49 illustrates perspective and side views of the third and fourth cylinder liner inserts 608 and 610 in accordance with aspects of the subject innovation.

Figure 50:
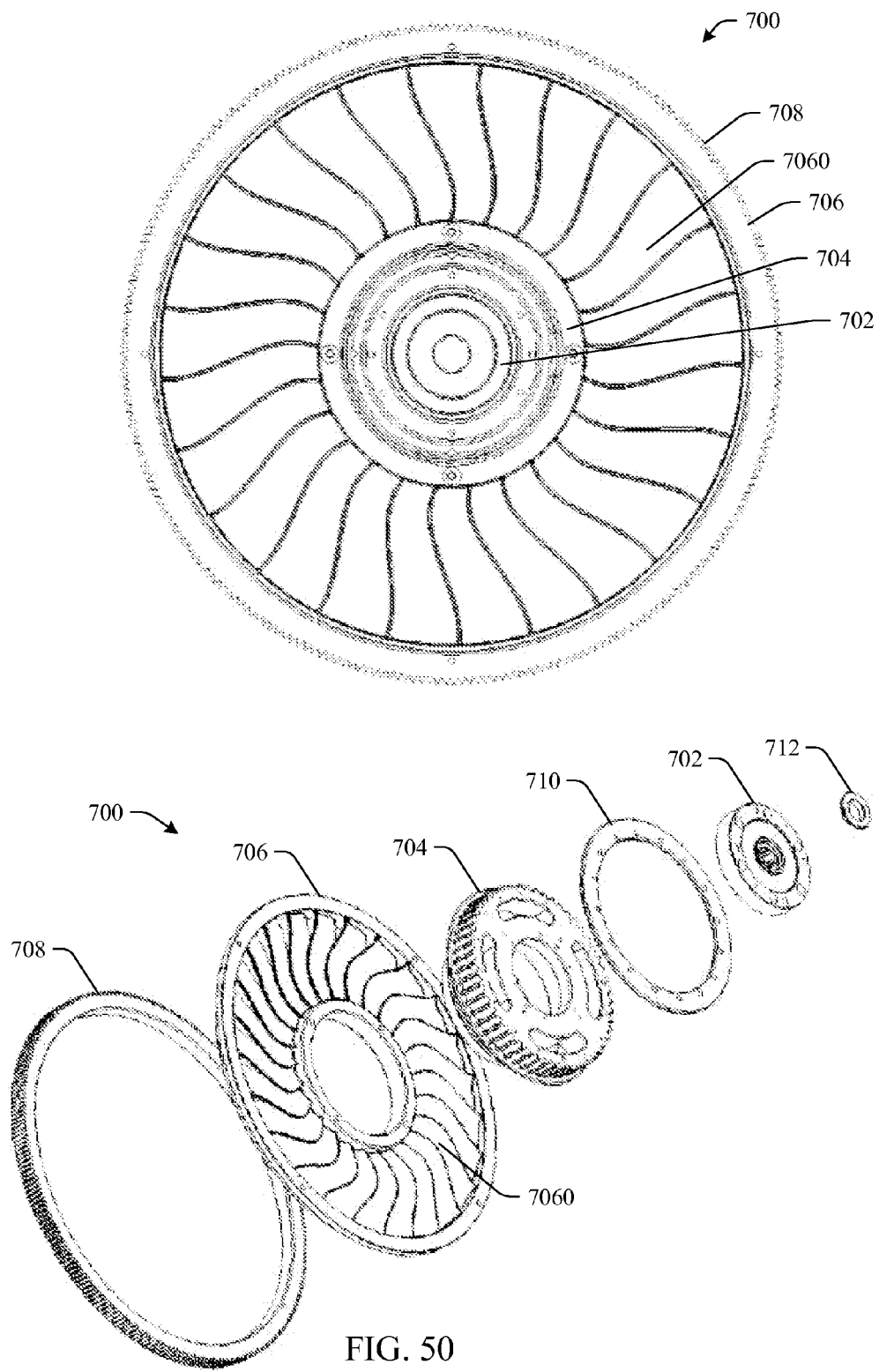
FIG. 50 illustrates front and exploded views of an example front-end sub-assembly in accordance with aspects of the subject innovation.

FIG. 50 illustrates front and exploded views of an example front-end sub-assembly 700 in accordance with aspects of the subject innovation. An example front-end sub-assembly 700 can include a ring gear 708 for starting internal combustion engine 100, a flywheel 706 (e.g., which can include a cooling impeller 7060 to transfer heat away from internal combustion engine 100, etc.), a front-end pulley 704, a front-end pulley cover 710, a front-end coupling plate 702 that can couple to a spline on an outer extension of a second crankshaft 204 (or first crankshaft 202, which has a similar spline), and a washer 712.

Figure 51:
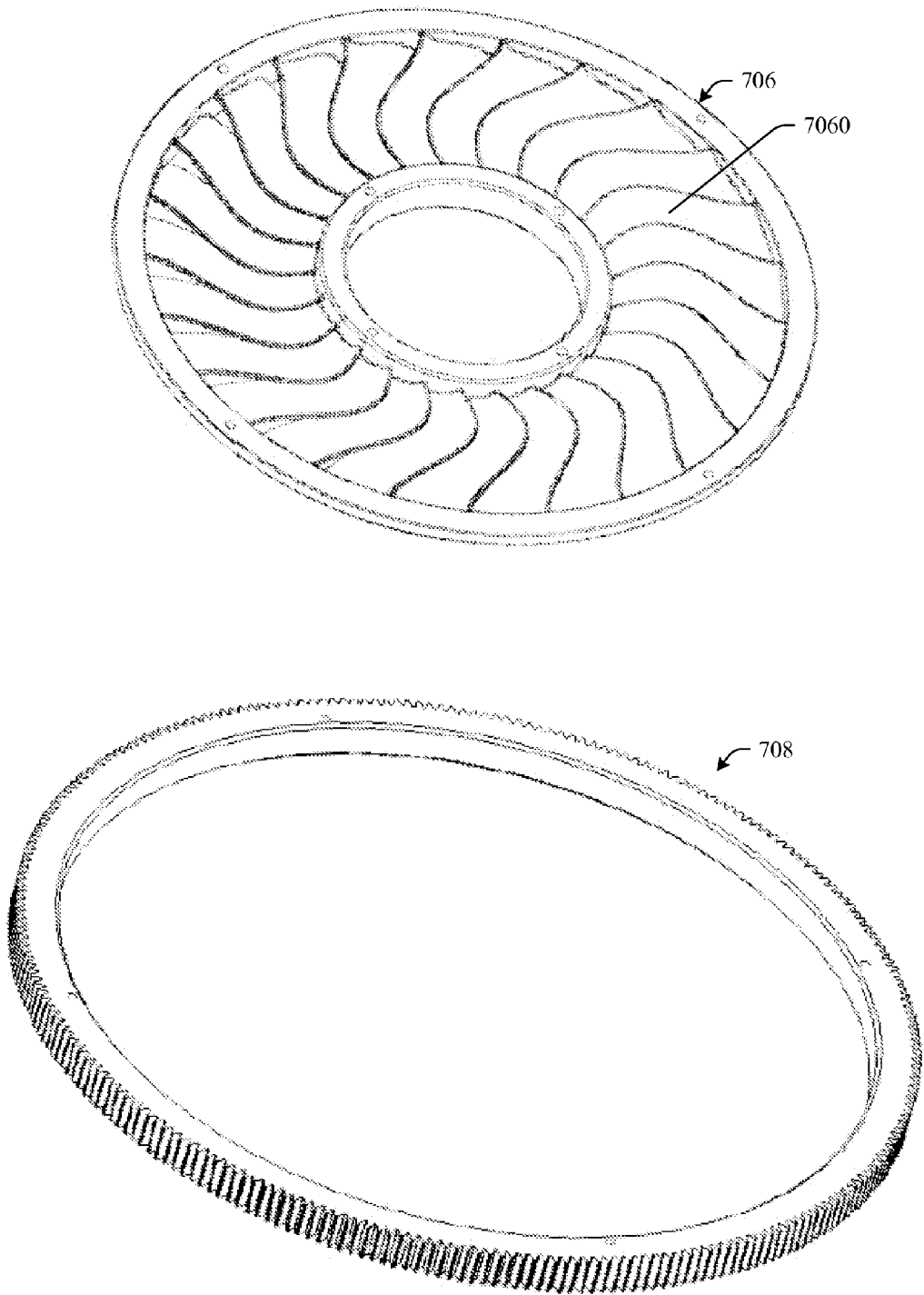
FIG. 51 illustrates perspective views of a flywheel and ring gear in accordance with aspects of the subject innovation.
Figure 52:
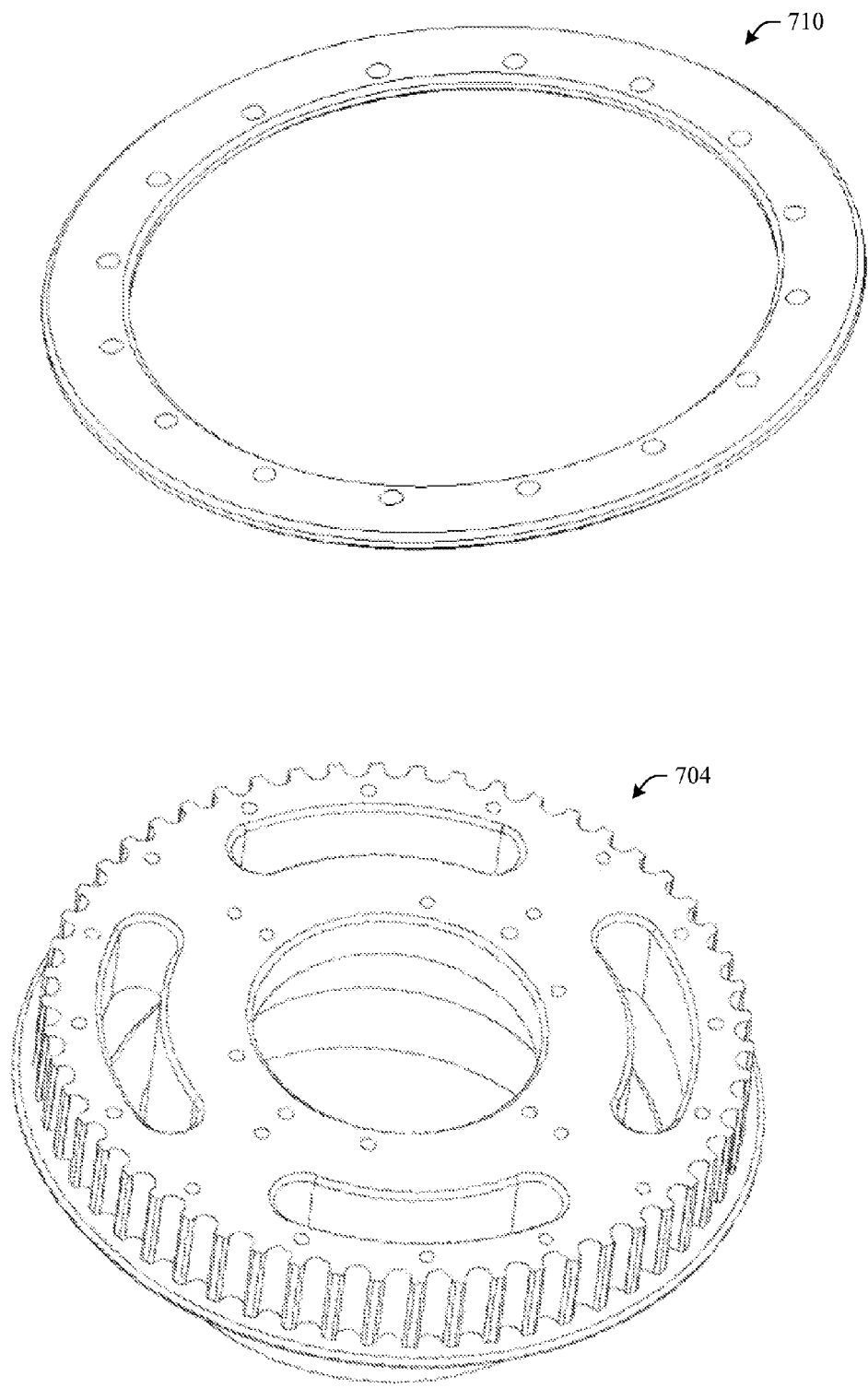
FIG. 52 illustrates perspective views of a front-end pulley cover and a front-end pulley in accordance with aspects of the subject innovation.
Figure 53:
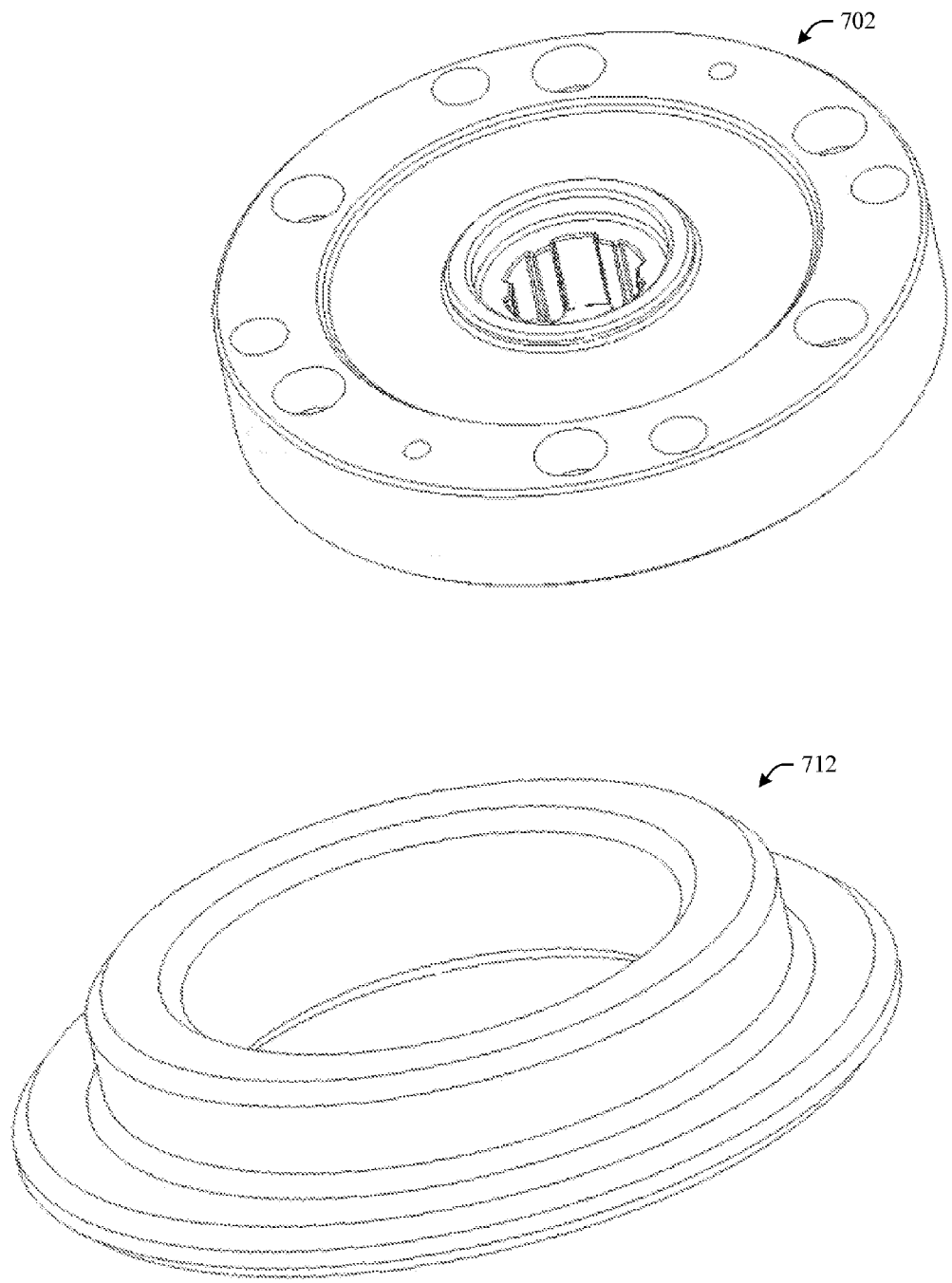
FIG. 53 illustrates perspective views of a coupling plate and a washer in accordance with aspects of the subject innovation.

FIGS. 51-53 illustrate various components that can be included in or associated with a front-end sub-assembly 700 in accordance with aspects of the subject innovation. FIG. 51 illustrates perspective views of a flywheel (and cooling impeller 7060) 706 and ring gear 708 in accordance with aspects of the subject innovation. FIG. 52 illustrates perspective views of a front-end pulley cover 710 and a front-end pulley 704 in accordance with aspects of the subject innovation. FIG. 53 illustrates perspective views of a coupling plate and a washer in accordance with aspects of the subject innovation.

Figure 54:
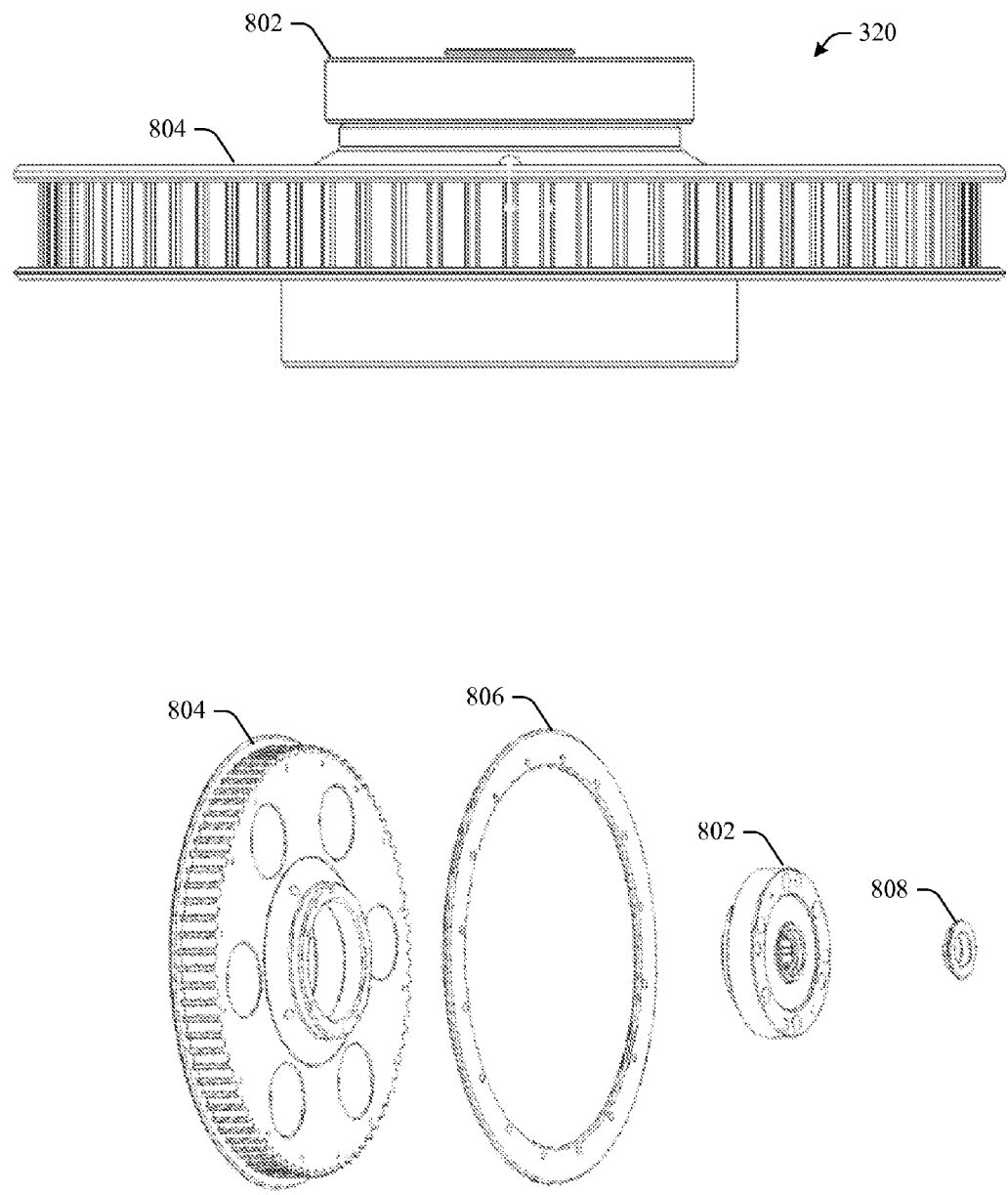
FIG. 54 illustrates side and exploded views of an example back-end sub-assembly in accordance with aspects of the subject innovation.
Figure 55:
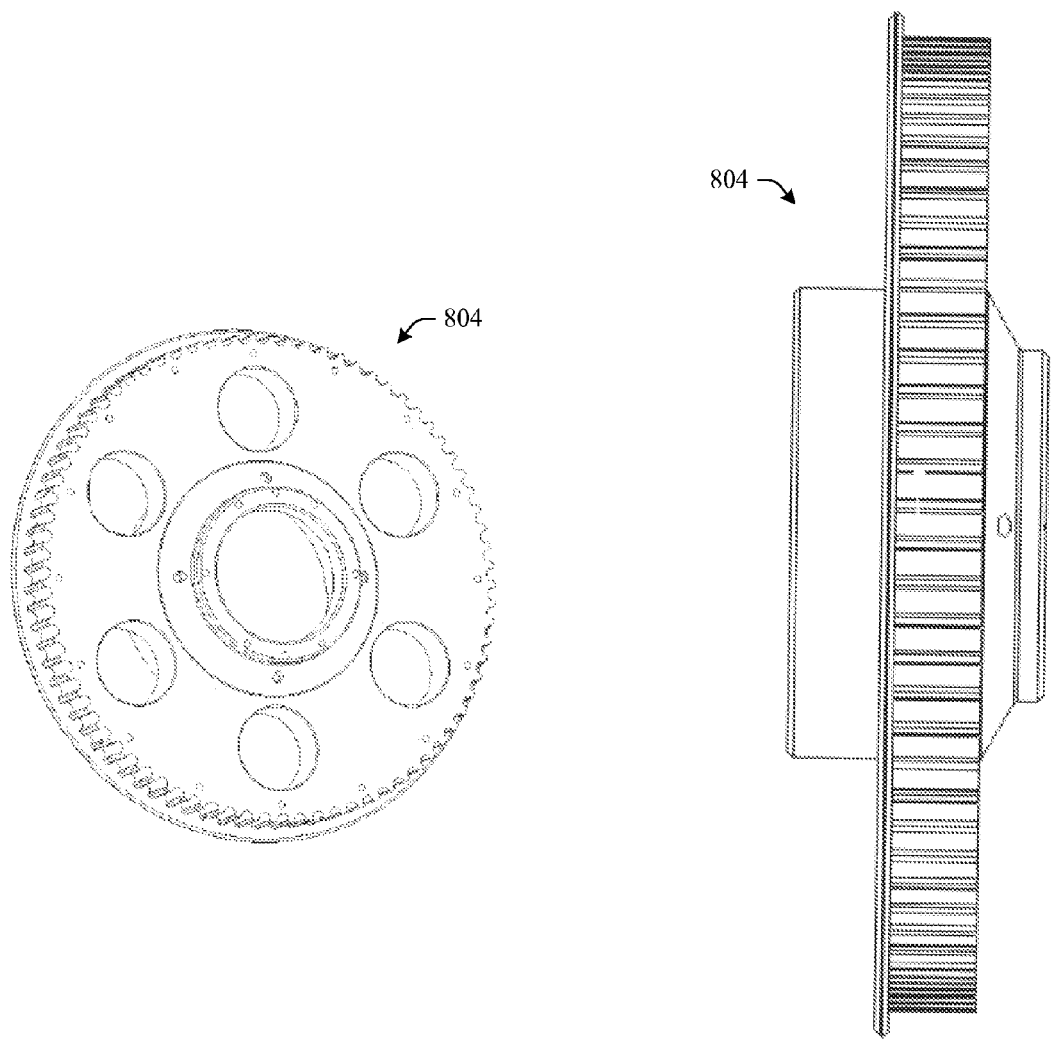
FIG. 55 illustrates perspective and side views of a back-end pulley in accordance with aspects of the subject innovation.

FIG. 54 illustrates side and exploded views of an example back-end sub-assembly 800 in accordance with aspects of the subject innovation. Example back-end sub-assembly 800 can comprise a back-end pulley 804, a back-end pulley cover 806, a back-end coupling plate 802 that can couple to a spline on an outer extension of a first crankshaft 202 (or second crankshaft 204, which has a similar spline), and a washer 808. FIG. 55 illustrates perspective and side views of a back-end pulley 804 in accordance with aspects of the subject innovation.

Figure 56:
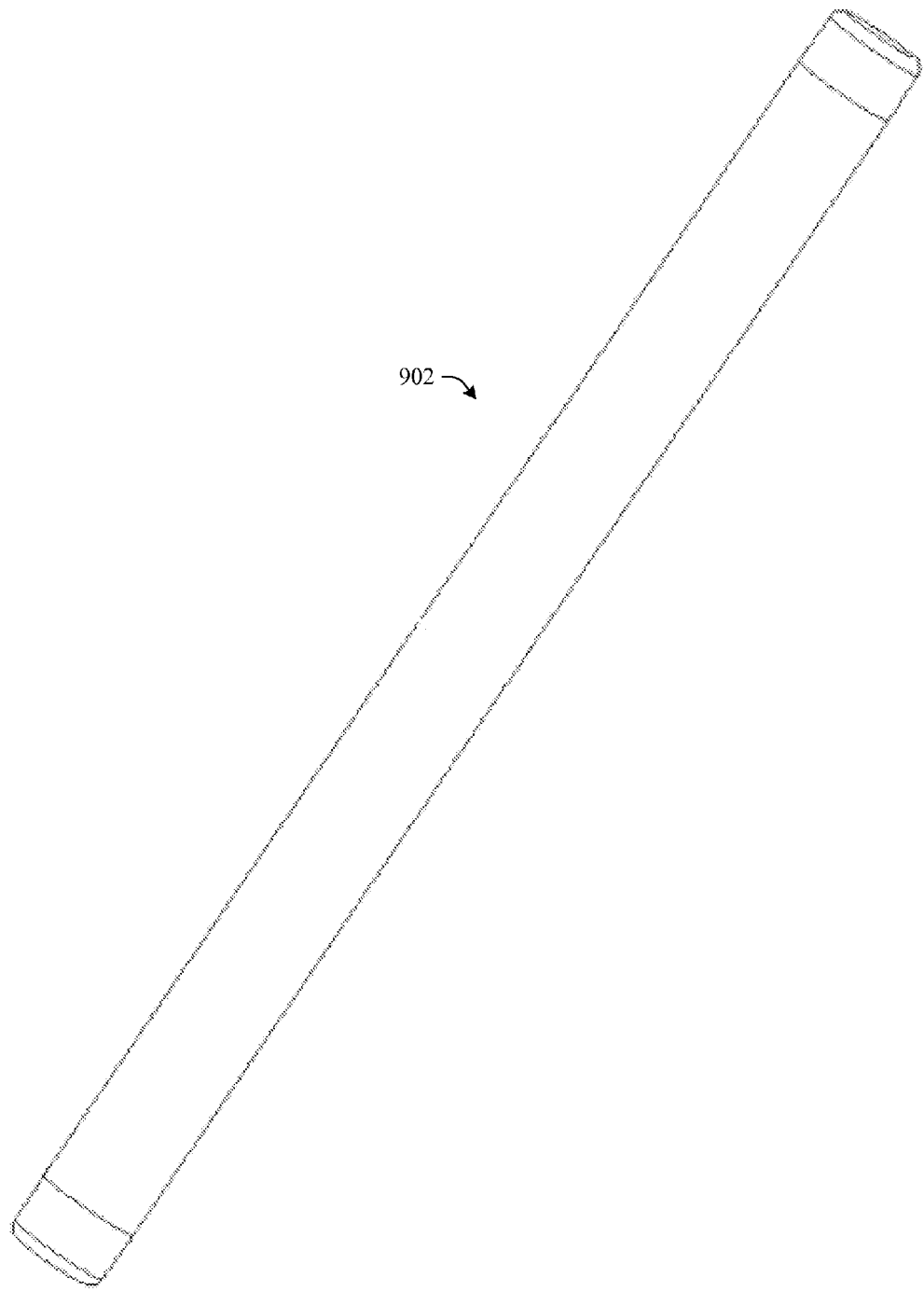
FIG. 56 illustrates a perspective view of an inner rail in accordance with aspects of the subject innovation.
Figure 57:
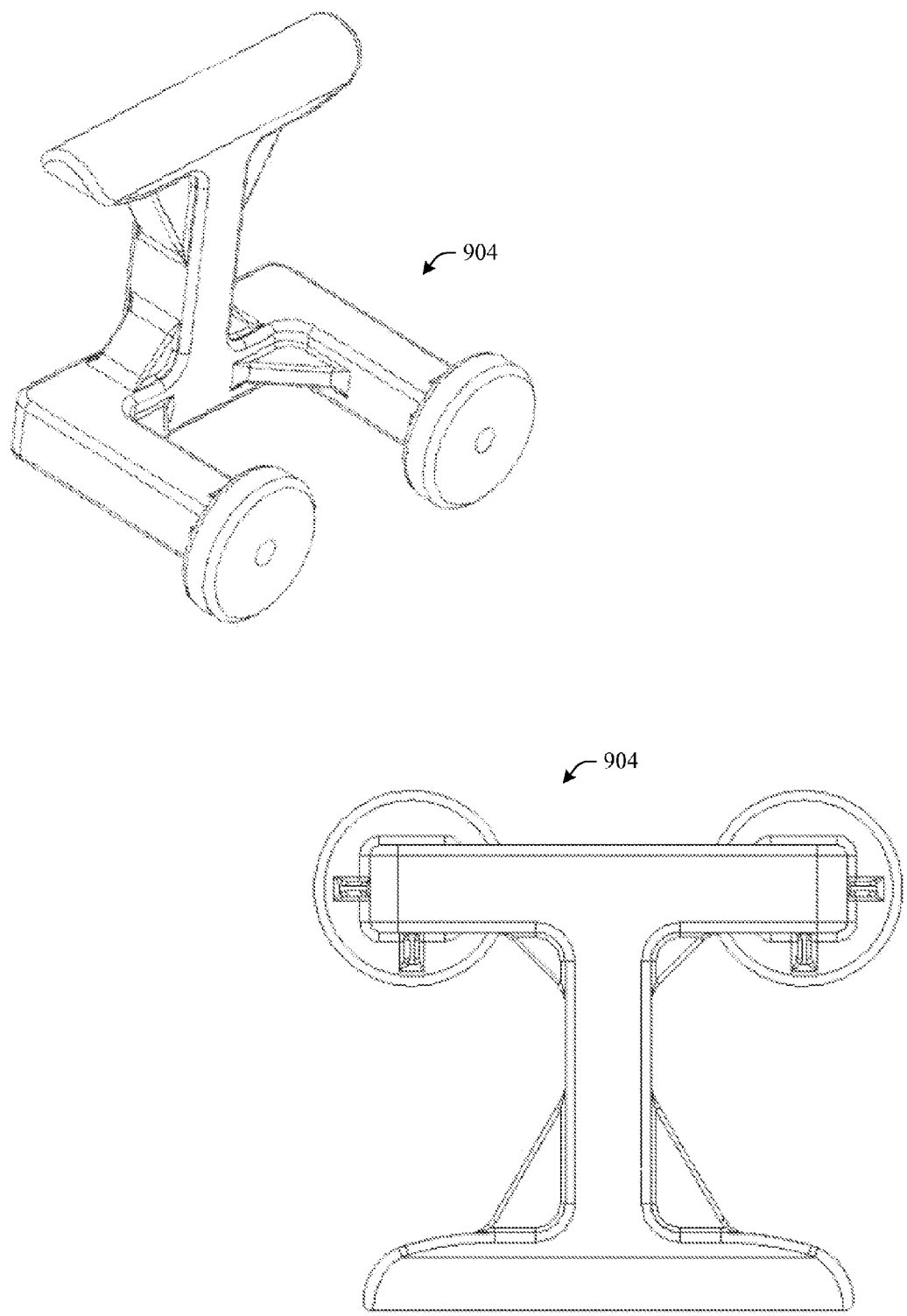
FIG. 57 illustrates perspective and back views of an outer rail in accordance with aspects of the subject innovation.

FIG. 56 illustrates a perspective view of an inner rail 902 in accordance with aspects of the subject innovation. FIG. 57 illustrates perspective and back views of an outer rail 904 in accordance with aspects of the subject innovation.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   an intermediate member sub-assembly comprising an orbiting planetary gearing system;
   at least one crankshaft coupled to the intermediate member sub-assembly; and
   one or more sliders and one or more slider rods,
   wherein the orbiting planetary gearing system couples linear motion of the intermediate member sub-assembly to rotational motion of the at least one crankshaft,
   wherein the orbiting planetary gearing system comprises a plurality of planet gears coupled to a planet carrier,
   wherein teeth of each of the plurality of planet gears engage with teeth of a ring gear and with teeth of a crank spur gear associated with the at least one crankshaft,
   wherein the planet carrier moves vertically along the one or more slider rods,
   wherein the one or more slider rods is coupled to one or more sliders, and
   wherein each of the one or more sliders move horizontally along one or more slider bearings.

2. The system of claim 1, further comprising:
   a first primary member coupled to the intermediate member sub-assembly; and
   a second primary member coupled to the intermediate member sub-assembly,
   wherein the linear motion of the intermediate member sub-assembly is coupled to rotational motion of the first primary member and the second primary member.

3. The system of claim 2, further comprising an engine housing comprising a first cylinder liner and a second cylinder liner, wherein the first primary member is coupled to a first piston, wherein the second primary member is coupled to a second piston, and wherein a combustion chamber is defined by the first piston, the second piston, the first cylinder liner, and the second cylinder liner.

4. An internal combustion engine, the engine comprising:
   an engine housing comprising a first cylinder liner and a second cylinder liner defining at least a first section of a toroid between the first cylinder liner and the second cylinder liner and delimiting a first combustion chamber;
   a first primary member coupled to a first piston, the first piston also delimiting the first combustion chamber, the first piston guided along a first curved path defined by the first section of the toroid;
   a second primary member coupled to a second piston, the second piston also delimiting the first combustion chamber, the second piston guided along a second curved path defined by the first section of the toroid;
   an intermediate member sub-assembly coupled to the first and the second primary members, the intermediate member sub-assembly comprising an orbiting planetary gearing system;
   at least one crankshaft coupled to the intermediate member sub-assembly; and
   one or more sliders and one or more slider rods,
   wherein the orbiting planetary gearing system comprises a plurality of planet gears coupled to a planet carrier,
   wherein teeth of each of the plurality of planet gears engage with teeth of a ring gear and with teeth of a crank spur gear associated with the at least one crankshaft,
   wherein the planet carrier moves vertically along the one or more slider rods,
   wherein the one or more slider rods is coupled to the one or more sliders, and
   wherein each of the one or more sliders move horizontally along one or more slider bearings.

5. The internal combustion engine of claim 4, wherein the first primary member and the second primary member rotate around the at least one crankshaft.

6. The internal combustion engine of claim 4, wherein at least one of the first cylinder liner or the second cylinder liner comprises cooling channels that facilitate heat transfer away from the internal combustion engine.

7. The internal combustion engine of claim 4, wherein at least one of the first piston or the second piston comprises contours that create vortices in the first combustion chamber.

8. The internal combustion engine of claim 4, wherein the at least one crankshaft comprises at least two crankshafts connected by a spline joint.

9. The internal combustion engine of claim 4,
   wherein the engine housing comprises a third cylinder liner and a fourth cylinder liner defining at least a second section of the toroid between the third cylinder liner and the fourth cylinder liner and delimiting a second combustion chamber;
   wherein the first primary member coupled to a third piston, the third piston also delimiting the second combustion chamber, the third piston guided along a third curved path defined by the second section of the toroid; and
   wherein the second primary member coupled to a fourth piston, the fourth piston also delimiting the second combustion chamber, the fourth piston guided along a fourth curved path defined by the second section of the toroid.

10. The internal combustion engine of claim 4, wherein the first primary member is coupled to the intermediate member sub-assembly via a first roller and the second primary member is coupled to the intermediate member sub-assembly via a second roller.

11. The internal combustion engine of claim 10, wherein the first roller couples to the first primary member via a first offset axis and the second roller couples to the second primary member via a second offset axis, whereby rotational motion of the first primary member and the second primary member is coupled to linear motion of the intermediate member sub-assembly.

12. The internal combustion engine of claim 4, wherein the intermediate member sub-assembly slides linearly along a plurality of rails.

13. The internal combustion engine of claim 4, wherein the at least one crankshaft is coupled to a flywheel and a cooling impeller.

14. The internal combustion engine of claim 4, wherein at least one of the first piston or the second piston is ceramic.

15. The internal combustion engine of claim 4, wherein the at least one crankshaft is coupled to a front-end pulley and to a back-end pulley.

16. The internal combustion engine of claim 4, wherein the first primary member comprises a first primary member component and a second primary member component, the first primary member component and the second primary member component being coupled together, and wherein the second primary member comprises third primary member component and a fourth primary member component, the third primary member component and the fourth primary member component being coupled together.

\* \* \* \* \*